(12) United States Patent
Chao et al.

(10) Patent No.: US 6,370,144 B1
(45) Date of Patent: Apr. 9, 2002

(54) METHODS AND APPARATUS FOR SHAPING QUEUED PACKETS USING A TWO-DIMENSIONAL RAM-BASED SEARCH ENGINE

(75) Inventors: Hung-Hsiang Jonathan Chao, Holmdel; Yau-Ren Jenq, Fort Lee, both of NJ (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/185,752

(22) Filed: Nov. 4, 1998

Related U.S. Application Data

(60) Provisional application No. 60/064,867, filed on Nov. 5, 1997.

(51) Int. Cl.[7] .............................................. H04L 12/56
(52) U.S. Cl. .......................... 370/395.42; 370/395.52; 370/395.7; 370/412; 370/429
(58) Field of Search ................................ 370/253, 235, 370/252, 230, 412, 429, 440, 395, 230.1, 235.1, 236, 395.1, 395.4, 395.42, 395.53, 395.52, 395.7

(56) References Cited

U.S. PATENT DOCUMENTS

| | | | | |
|---|---|---|---|---|
| 5,278,828 A | * | 1/1994 | Chao | 370/418 |
| 5,521,923 A | * | 5/1996 | Willmann et al. | 370/412 |
| 5,724,351 A | * | 3/1998 | Chao et al. | 370/395 |
| 5,850,399 A | * | 12/1998 | Ganmkhi et al. | 370/412 |
| 5,859,835 A | * | 1/1999 | Varma et al. | 370/412 |
| 5,959,993 A | * | 9/1999 | Varma et al. | 370/397 |
| 6,064,650 A | * | 5/2000 | Kappler et al. | 370/412 |
| 6,072,772 A | * | 6/2000 | Charny et al. | 370/229 |
| 6,161,193 A | * | 8/2000 | Ohba | 370/429 |

* cited by examiner

Primary Examiner—Ricky Ngo
Assistant Examiner—Phuc Tran
(74) Attorney, Agent, or Firm—Straub & Pokotylo; John C. Pokotylo

(57) ABSTRACT

A two (2) dimensional shaper uses a hierarchical searching technique to find the first memory location of the calendar queue with a validity bit of "1" (that is, the lowest time stamp). The bit string at any level l (l≠0) can be stored in a RAM of size $g_l M_{l-1}$. The string at the highest level in the hierarchy (l=0) can be stored in an $M_0$ bit register. The number of address bits needed to address any bit at a level l may be expressed as:

$$m_l = \log_2 M_l = m_{l-1} + \log_2 g_l = \sum_{i=0}^{l} \log_2 g_i, \text{ where } g_0 = M_0.$$

In this way, the search time depends on the number L of levels. Such a scheduler can schedule large numbers of flows to be placed on a high-speed data link (that is, with a small time slot).

16 Claims, 43 Drawing Sheets

METHODS AND APPARATUS FOR SHAPING QUEUED PACKETS USING A TWO-DIMENSIONAL RAM-BASED SEARCH ENGINE

§0. CLAIM TO PRIORITY

Benefit is claimed, under 35 U.S.C. §119(e)(1), to the filing date of provisional patent application Ser. No. 60/064,867 filed Nov. 5, 1997, listing Hung-Hsiang Jonathan Chao and Yau-Ren Jenq as inventors, for any inventions enclosed in the manner provided by U.S.C. §112, ¶1. This provisional application is expressly incorporated herein by reference.

§1. BACKGROUND OF THE INVENTION

§1.1 Field of the Invention

In general, the present invention concerns congestion control and traffic management in networks and internetworks operating at relatively high data rates and carrying information which may have differing quality of service (or "QoS") requirements. In particular, the present invention concerns methods and apparatus for fairly servicing queues at an output port of a switch (for switching ATM packets for example) or router (for routing TCP/IP packets for example).

§1.2 Related Art

§1.2.1 The Growth of Network and Internetwork Communications

Communications networks permit remote people or machines to communicate voice or data (also referred to as "traffic" or "network traffic"). These networks continue to evolve to meet new demands placed upon them. Different applications place different demands, often on the same network. In particular, a certain application may require that its traffic be communicated (i) with minimum delay, (ii) at a fast rate, (iii) with maximum reliability, and/or (iv) to minimize communications (service) cost. For example, people would not tolerate much delay in their voice communications during a telephone call. High definition video requires a fast rate, or a high bandwidth, as well as low jitter, or delay variations. However, video communications may be able to tolerate some data corruption or loss to the extent that such losses are imperceptible or not annoying to people. The communications of important data, on the other hand, may tolerate delay, but might not tolerate data loss or corruption. Finally, an application may request that low priority data be communicated at a minimum cost. To the extent that the network traffic of an application does not have "special" requirements, it should be communicated with normal service.

Having introduced the fact that different applications may place different requirements on a communications network, a brief history of communications networks, and the emergence of packet switching, is now presented.

The public switched telephone network (or "PSTN") was developed to carry voice communications to permit geographically remote people to communicate. Modems then came along, permitting computers to communicate data over the PSTN. Voice and modem communications over the PSTN use "circuit switching". Circuit switching inherently involves maintaining a continuous real time communication channel at the full channel bandwidth between two points to continuously permit the transport of information throughout the duration of the call. Unfortunately, due to this inherent characteristic of circuit switching, it is inefficient for carrying "bursty" data traffic. Specifically, many services have relatively low information transfer rates—information transfer occurs as periodic bursts. Bursty communications do not require full channel bandwidth at all times during the duration of the call. Thus, when circuit switched connection is used to carry bursty traffic, available communication bandwidth occurring between successive bursts is simply wasted.

Moreover, circuit switching is inflexible because the channel width is always the same. Thus, for example, a wide (e.g., 140 Mbit/second) channel would be used for all transmissions, even those requiring a very narrow bandwidth (e.g., 1 Kbit/second). In an attempt to solve the problem of wasted bandwidth occurring in circuit switching, multi-rate circuit switching was proposed. With multi-rate circuit switching, connections can have a bandwidth of a multiple of a basic channel rate (e.g., 1 Kbit/second). Although multi-rate circuit switching solves the problem of wasted bandwidth for services requiring only a narrow bandwidth, for services requiring a wide bandwidth, a number of multiple basic rate channels must be synchronized. Such synchronization becomes extremely difficult for wide bandwidth services. For example, a 140 Mbit/second channel would require synchronizing 140,000 1 Kbit/second channels. Moreover, multi-rate circuit switching includes the inherent inefficiencies of a circuit switch, discussed above, when bursty data is involved.

Multi-rate circuit switching having multiple "basic rates" has also been proposed. Unfortunately, the switch for multi-rate circuit switching is complex. Furthermore, the channel bandwidths are inflexible to meet new transmission rates. Moreover, much of the bandwidth might be idle when it is needed. Lastly, multiple basic rate circuit switching includes the inherent inefficiencies of a circuit switch, discussed above, when bursty data is involved.

In view of the above described problems with circuit switching, packet switched communications have become prevalent and are expected to be used extensively in the future. Two communications protocols—TCP/IP and ATM—are discussed in §§1.2.1.1 and 1.2.1.2 below.

§1.2.1.1 Internets

In recent decades, and in the past five to ten years in particular, computers have become interconnected by networks by an ever increasing extent; initially, via local area networks (or "LANs"), and more recently via LANs, wide area networks (or "WANs") and the Internet. In 1969, the Advanced Research Projects Agency (ARPA) of the U.S. Department of Defense (DoD) deployed Arpanet as a way to explore packet-switching technology and protocols that could be used for cooperative, distributed, computing. Early on, Arpanet was used by the TELNET application which permitted a single terminal to work with different types of computers, and by the file transfer protocol (or "FTP") which permitted different types of computers to transfer files from one another. In the early 1970s', electronic mail became the most popular application which used Arpanet.

This packet switching technology was so successful, the ARPA applied it to tactical radio communications (Packet Radio) and to satellite communications (SATNET). However, since these networks operated in very different communications environments, certain parameters such as maximum packet size, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described in §1.2.1.1.1 below for the reader's convenience.

§1.2.1.1.1 The TCP/IP Protyocol Stack

The communications task for TCP/IP can be organized into five (5) relatively independent layers—namely, (i) an application layer, (ii) a host-to-host layer, (iii) an Internet layer, (iv) a network access layer, and (v) a physical layer. The physical layer defines the interface between a data transmission device (e.g., a computer) and a transmission medium (e.g., twisted pair copper wires, optical fiber, etc.). It specifies the characteristics of the transmission medium and the nature of the signals, the data rate, etc. The network access layer defines the interface between an end system and the network to which it is attached. It concerns access to, and routing data across, a network. Frame Relay is an example of a network access layer. The internet layer (e.g., IP) defines interfaces between networks and provides routing information across multiple networks. The host-to-host layer (e.g., TCP) concerns assuring the reliability of the communication. Finally, the application layer provides an interface to support various types of end user applications (e.g., the simple mail transfer protocol (or "SMTP") for e-mail, the file transfer protocol (or "FTP"), etc.).

Basically, each of the layers encapsulates, or converts, data in a high level layer. For example, referring to FIG. 1, user data 100 as a byte stream is provided with a TCP header 102 to form a TCP segment 110. The TCP segment 110 is provided with an IP header 112 to form an IP datagram 120. The IP datagram 120 is provided with a network header 122 to define a network-level packet 130. The physical layer converts the network-level packet to radio, electrical, optical (or other) signals sent over the transmission medium at a specified rate with a specified type of modulation.

The TCP header 102, as illustrated in FIG. 2, includes at least twenty (20) octets (i.e., 160 bits). Fields 202 and 204 identify ports at the source and destination systems, respectively, that are using the connection. Values in the sequence number 206, acknowledgement number 208 and window 216 files are used to provide flow and error control. The value in the checksum field 218 is used to detect errors in the TCP segment 110.

FIGS. 3A and 3B illustrate two (2) alternative IP headers 112 and 112', respectively. Basically, FIG. 3A depicts the IP protocol (Version 4) which has been used. FIG. 3B depicts a next generation IP protocol (Version 6) which, among other things, provides for more source and destination addresses.

More specifically, referring to FIG. 3A, the four (4) bit version field 302 indicates the version number of the IP, in this case, version 4. The four (4) bit Internet header length field 304 identifies the length of the header 112 in 32-bit words. The eight (8) bit type of service field 306 indicates the service level that the IP datagram 120 should be given. The type of service (or "TOS") field 306 will be discussed in more detail in §1.2.2.1.1 below. The sixteen (16) bit total length field 308 identifies the total length of the IP datagram 120 in octets. The sixteen (16) bit identification field 310 is used to help reassemble fragmented user data carried in multiple packets. The three (3) bit flags field 312 is used to control fragmentation. The thirteen (13) bit fragment offset field 314 is used to reassemble a datagram 120 that has become fragmented. The eight (8) bit time to live field 316 defines a maximum time that the datagram is allowed to exist within the network it travels over. The eight (8) bit protocol field 318 defines the higher-level protocol to which the data portion of the datagram 120 belongs. The sixteen (16) bit header checksum field 320 permits the integrity of the IP header 112 to be checked. The 32 bit source address field 322 contains the IP address of the sender of the IP datagram 120 and the 32 bit destination address field 324 contains the IP address of the host to which the IP datagram 120 is being sent. Options and padding 326 may be used to describe special packet processing and/or to ensure that the header 112 takes up a complete set of 32 bit words.

Referring to FIG. 3B, the four (4) bit version field 302 indicates the version number of the IP, in this case, version 6. The four (4) bit priority field 328 enables a sender to prioritize packets sent by it. The 24 bit flow label field 330 is used by a source to label packets for which special handling is requested. The sixteen (16) bit payload length field 332 identifies the size of the data carried in the packet. The eight (8) bit next header field 334 is used to indicate whether another header is present and if so, to identify it. The eight (8) bit hop limit field 336 serves to discard the IP datagram 120 if a hop limit (i.e., the number of times the packet is routed) is exceeded. Also provided are 128 bit source and destination address fields 322' and 324', respectively.

Having described the TCP/IP protocol suite, the routing of a TCP/IP packet is now described in §1.2.1.1.2 below.

§1.2.1.1.2 Routing TCP/IP Packets

A TCP/IP packet is communicated over the Internet (or any internet or intranet) via routers. Basically, routers in the Internet use destination address information (Recall fields 324 and 324') to forward packets towards their destination. Routers interconnect different networks. More specifically, routers accept incoming packets from various connected networks, use a look-up table to determine a network upon which the packet should be placed, and routes the packet to the determined network. The router may buffer incoming packets if the networks are providing packets faster than it can route them. Similarly, the router may buffer outgoing packets if the router provides outgoing packets faster than the determined networks can accept them.

FIG. 4, which includes FIGS. 4A through 4C, illustrates the communication of data from a sender, to a receiver, using the TCP/IP protocol suite. Referring first to FIG. 4A, an application protocol 402 prepares a block of data (e.g., an e-mail message (SMTP) a file (FTP), user input (TELNET), etc.) 100 for transmission. Before the data 100 are sent, the sending and receiving applications agree on a format and encoding and agree to exchange data. If necessary the data are converted (character code, compression, encryption, etc.) to a form expected by the destination.

The TCP layer 404 may segment the data block 100, keeping track of the sequence of the blocks. Each TCP segment 110 includes a header 102 containing a sequence number (recall field 206) and a frame check sequence to detect errors. A copy of each TCP segment is made so that, in the event of segment loss or damage, it can be retransmitted. When an acknowledgement of safe receipt is received from the receiver, the copy of the segment is erased.

The IP layer 406 may break a TCP segment into a number of datagrams 120 to meet size requirements of networks over which the data will be communicated. Each datagram includes the IP header 112.

A network layer 408, such as frame relay for example, may apply a header and trailer 122 to frame the datagram 120. The header may include a connection identifier and the trailer may contain a frame check sequence for example. Each frame 130 is then transmitted, by the physical layer 410, over the transmission medium as a sequence of bits.

FIG. 4B illustrates the operation of TCP/IP at a router in the network. The physical layer 412 receives the incoming signal 130 from the transmission medium and interprets it as a frame of bits. The network (e.g., frame relay) layer 414 removes the header and trailer 122 and processes them. A frame check sequence may be used for error detection. A connection number may be used to identify the source. The network layer 414 then passes the IP datagram 120 to the IP layer 418.

The IP layer examines the IP header 112 and makes a routing decision (Recall the destination address 324, 324'.). A local line control (or "LLC") layer 420 uses a simple network management protocol (or "SNMP") adds a header 450 which contains a sequence number and address information. Another network layer 422 (e.g., media access control (or "MAC")) adds a header and trailer 460. The header may contain address information and the trailer may contain a frame check sequence. The physical layer 424 then transmits the frame 150 over another transmission medium.

FIG. 4C illustrates the operation of TCP/IP at a receiver. The physical layer 432 receives the signal from the transmission medium and interprets it as a frame of bits. The network layer 434 removes the header and trailer 460 and processes them. For example, the frame check sequence in the trailer may be used for error detection. The resulting packet 140 is passed to the transport layer 436 which processes the header 450 for flow and error control. The resulting IP datagram 120 is passed to the IP layer 438 which removes the header 112. Frame check sequence and other control information may be processed at this point.

The TCP segment 110 is then passed to the TCP layer 440 which removes the header 102 and may check the frame check sequence (in the event of a match, the match is acknowledged and in the event of a mismatch, the packet is discarded). The TCP layer 440 then passes the data 100 to the application layer 442. If the user data was segmented (or fragmented), the TCP layer 440 reassembles it. Finally, the application layer 442 performs any need transformations, such as decompression and decryption for example, and directs the data to an appropriate area of the receiver, for use by the receiving application.

§1.2.1.2 High Speed Networks

As discussed in §1.2.1 above, there has been a trend from circuit switched networks towards packet switched networks. For example, packet switched communications presently appear to be the preferred mode of communication over a Broadband-Integrated Services Digital Network (or "B-ISDN") service. Packet switching includes normal packet switching (e.g., X25) and fast packet switching (e.g., Asynchronous Transfer Mode or "ATM"). Normal packet switching assumes certain errors at each data link are probable enough to require complex protocols so that such errors can be controlled at each link. Link errors were a valid assumption and concern at one time. However, today data links are very reliable such that the probability of errors being introduced by data links are no longer of any concern. Hence, fast packet switching is becoming more prominent. ATM is discussed in §1.2.1.2.1 below.

§1.2.1.2.1 The Asynchronous Transfer Mode (ATM) Protocol

Since data links are very reliable and the probability of errors being introduced by data links are no longer of any great concern, ATM fast packet switching does not correct errors or control flow within the network (i.e., on a link-by-link basis). Instead, ATM is only concerned with three types of errors; namely bit errors, packet loss, and packet insertion. Bit errors are detected and/or corrected using end-to-end protocols. Regarding packet loss and insertion errors, ATM only uses prophylactic actions when allocating resources during connection set-up. That is, ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal. In this way, ATM reduces the number of overhead bits required with each cell, thereby permitting ATM to operate at high data rates.

The ATM protocol transfers data in discrete sized chunks called "cells". The use of fixed sized cells simplifies the processing required at each network node (e.g., switch) thereby permitting ATM to operate at high data rates. The structure of ATM cells is described in more detail below.

Finally, the ATM protocol permits multiple logical (or "virtual") connections to be multiplexed over a single physical interface. As shown in FIG. 5, logical connections in ATM are referred to as virtual channel connections (or "VCCs") 510. A VCC 510 is the basic unit of switching in an ATM network. A VCC 510 is established between two end users, through the network. A variable-rate, full-duplex flow of ATM cells may be exchanged over the VCC 510. VCCs 510 may also be used for control signaling, network management and routing.

A virtual path connection (or VPC) 520 is a bundle of VCCs 510 that have the same end points. Accordingly, all of the cells flowing over all VCCs 510 in a single VPC 520 may be switched along the same path through the ATM network. In this way, the VPC 520 helps contain network control costs by grouping connections sharing common paths through the network. That is, network management actions can be applied to a small number of virtual paths 520 rather than a large number of individual virtual channels 510.

Finally, FIG. 5 illustrates that multiple virtual paths 520 and virtual channels 510 (i.e., logical connections) may be multiplexed over a single physical transmission path 530.

FIG. 6 illustrates the basic architecture for an interface between a user and a network using the ATM protocol. The physical layer 610 specifies a transmission medium and a signal-encoding (e.g., data rate and modulation) scheme. Data rates specified at the physical layer 610 may be 155.52 Mbps or 622.08 Mbps, for example. The ATM layer 620 defines the transmission of data in fixed sized cells and also defines the use of logical connections, both introduced above. The ATM adaptation layer 630 supports information transfer protocols not based on ATM. It maps information between a high layer 640 and ATM cells.

Recall that the ATM layer 620 places data in fixed sized cells (also referred to as a packet). An ATM packet includes a header field (generally five (5) bytes) and a payload (or information) field (generally 48 bytes). The main function of the header is to identify a virtual connection to guarantee that the ATM packet is properly routed through the network. Switching and/or multiplexing is first performed on virtual paths and then on virtual channels. The relatively short length of the payload or information field reduces the size required for internal buffers at switching nodes thereby reducing delay and delay jitter.

More specifically, FIG. 7A illustrates an ATM cell 700 having a header 710 as formatted at a user-network interface, while FIG. 7B illustrates the ATM cell 700' having a header 710' as formatted internal to the network. Referring first to the header 710 as formatted at the user-network interface, a four(4) bit generic flow control field 712 may be used to assist an end user in controlling the flow of traffic for different qualities of service. The eight (8) bit virtual path identifier field 714 contains routing information for the network. Note that this field 714' is expanded to twelve (12) bits in header 710' as formatted in the network. In both headers 710 and 710', a sixteen (16) bit virtual channel identifier field 716 contains information for routing the cell to and from the end users. A three (3) bit payload type field 718 indicates the type of information in the 48 octet payload portion 750 of the packet. (The coding of this field is not particularly relevant for purposes of the present invention.) A one (1) bit cell loss priority field 720 contains information to let the network know what to do with the cell in the event of congestion. A value of 0 in this field 720 indicates that the cell is of relatively high priority and should not be discarded unless absolutely necessary. A value of 1 in this field indicates that the network may discard the cell. Finally, an eight (8) bit header error control field 722 contains information used for error detection and possibly error correction as well. The remaining 48 octets 750 define an information field.

Fast packet switching, such as ATM switching, has three main advantages. First ATM switching is flexible and is therefore safe for future transfer rates. Second, no resources are specialized and consequently, all resources may be optimally shared. Finally, ATM switches permit economies of scale for such a universal network.

§1.2.1.2.2 Switches

ATM packets (cells) are routed through a network by means of a series of ATM switches. An ATM switch must perform three basic functions for point-to-point switching; namely, (i) routing the ATM cell, (ii) updating the virtual channel identifier (VCI) and virtual path identifier (VPI) in the ATM cell header (Recall fields 714, 714' and 716'.), and (iii) resolving output port contention. The first two functions, namely routing and updating, are performed by a translation table belonging to the ATM switch. The translation table converts an incoming link (input port) and VCI/VPI to an outgoing link (output port) and VCI/VPI. An arbiter is used to resolve output port contention among two or more ATM cells destined for the same output port. The arbiter chooses an ATM cell which "wins" contention (i.e., which is applied to the output port). Other ATM cells contending for the output port "lose" contention (i.e., they must wait before being applied to the output port).

To prevent the ATM cells not winning contention for the output port from being lost, buffering is required. There are three basic buffering strategies; namely, pure input queuing, pure output queuing and central queuing. Pure input queuing provides a dedicated buffer at each input port. Arbitration logic is used to decide which inlet buffer will be next served. The arbitration logic may be simple (e.g., round robin in which the inlet buffers are served in order, or random in which the inlet buffers are served randomly) or complex (e.g., state dependent in which the most filled buffer is served next, or delay dependent in which the globally oldest cell is served next).

Unfortunately, with input queuing, an ATM cell in the front of the queue waiting for an occupied output channel to become available may block other ATM cells behind it which do not need to wait. This is known as head-of-line (HOL) blocking. A post office metaphor has been used to illustrate head-of-line (HOL) blocking in the book, M. dePrycker, *Asynchronous Transfer Mode: Solution for Broadband ISDN*, pp. 133–137 (Ellis Horwood Ltd., 1991). In the post office metaphor, people (representing ATM cells) are waiting in a line (representing an input buffer) for either a stamp window (a first output port) or an airmail window (a second output port). Assume that someone (an ATM cell) is already at the stamp window (the first output port) and that the first person in the line (the HOL of the input buffer) needs to go to the stamp window (the first output port). Assume further that no one is presently at the airmail window (the second output port) and that the second and third people in line (ATM cells behind the HOL cell in the input queue) want to go to the airmail window (the second output port). Although the airmail window (second output port) is available, the second and third people (ATM cells behind the HOL cell) must wait for the first person (the HOL cell) who is waiting for the stamp window (the first output port) to become free. Therefore, as the post office metaphor illustrates, the head-of-line (HOL) cell waiting for an output port to become free often blocks ATM cells behind it which would otherwise not have to wait. Simulations have shown that such head-of-line (HOL) blocking decreases switch throughput.

Pure output buffering solves the head-of-line (HOL) blocking problems of pure input buffering by providing only the output ports with buffers. Since the ATM cells buffered at an output port are output in sequence (i.e., first in, first out, or "FIFO"), no arbitration logic is required. In the post office metaphor, the stamp window (first output port) has its own line (first output buffer) and the airmail window (second output port) has its own line (second output buffer).

Although pure output buffering clearly avoids HOL blocking that may occur in pure input port buffering, it does have some disadvantages. Specifically, to avoid cell loss, assuming N input ports, the system must be able to write N ATM cells into any one of the queues (or output buffers) during one cell time (i.e., within 2.8 microseconds, where 2.8 microseconds is (53 bytes*8 bits/byte)/155.52 Mbit/second. Such a high memory write rate is necessary because it is possible that each of the ATM cells arriving at each of the input ports will require the same output port. This requirement on the memory speed of the output buffer becomes a problem as the size of the switch (i.e., as N) increases. Accordingly, for a 1024 by 1024 switch (i.e., a switch having 1024 inputs and 1024 outputs), pure output buffering is not feasible because the speed of the output port buffers would have to be fast enough to handle 1024 ATM cells. This problem is discussed in more detail in §1.2.2.3.1 below.

Central queuing includes a queue not assigned to any inlet (input port) or outlet (output port). Each outlet will select ATM cells destined for it in a first in, first out (FIFO) manner. However, the outlets must be able to know which cells are destined for them. Moreover, the read and write discipline of the central queue cannot be a simple FIFO because ATM cells destined for different outlets are all merged into a single queue. Turning again to the post office metaphor, a single line (central queue) of people (ATM cells) are waiting to visit the stamp window (a first output port) or the airmail window (a second output port). As a window opens up (i.e., as an output port becomes available), a server searches the line (central queue) for the next person (ATM cell) needing the available window (requiring the available output port). The server brings that person (ATM cell) to the open window (available output port) regardless of whether the person (the ATM cell) is at the front of the line (HOL). As the post office metaphor illustrates, the central queue requires complex memory management system given the random accessibility required. Of course, the memory management system becomes more complex and cumbersome when the number of output ports (i.e., the size of the switch) increases.

Thus, conceptually, an ATM switch may include input port controllers for accepting ATM cells from various physical (or logical) links (Recall FIG. 5.), a switching fabric for forwarding cells to another link towards their destination, and output port controllers for buffering ATM cells to be accepted by various physical (or logical) links. An exemplary, scalable, ATM switch is disclosed in U.S. Pat. Nos. 5,724,351 and 5,790,539 (incorporated herein by reference).

§1.2.2 The Need to Consider Different Types of Traffic

As discussed in §1.2.1 above, different applications place different demands on communications networks. In particular, a certain application may require that its traffic be communicated (i) with minimum delay, (ii) at a fast rate, (iii) with maximum reliability, and/or (iv) to minimize communications (service) cost. For example, people would not tolerate much delay in their voice communications during a telephone call. High definition video requires a fast rate, or a high bandwidth, as well as low jitter, or delay variations. However, video communications may be able to tolerate some data corruption or loss to the extent that such losses are imperceptible or not annoying to people. The communications of important data, on the other hand, may tolerate delay, but might not tolerate data loss or corruption. Finally, an application may request that low priority data be communicated at a minimum cost. To the extent that the network traffic of an application does not have "special" requirements, it should be communicated with normal service.

Thus, many applications require a guaranteed quality of service (or "QoS") from a network provider. The network provider, in turn, may see guaranteeing QoS as a means to add value to their network and increase revenues. Although quality of service issues are important, at least to some extent, in all communications networks, the invention will be described in the context of packet switched networks in general, and TCP/IP and ATM networks in particular. This is because TCP/IP and ATM networks are envisioned as carrying many different types of data for many different applications which have different needs.

The ways in which the TCP/IP and ATM protocols permit supporting networks to help guarantee quality of service are introduced in §§1.2.2.1 and 1.2.2.2, respectively, below. Then, the ways in which output port queues of TCP/IP routers or ATM switches may be managed to manage traffic and meet congestion goals are discussed in §1.2.2.3 below. The challenges to scheduling and managing packets in the output port queues, which the present invention addresses, will also be discussed in that section.

§1.2.2.1 Internet Protocol

The fourth and six versions of the internet protocol ("IP"), discussed in §1.2.1.1.1 above, include fields which may be used to manage traffic over an internetwork. Although these fields are known to those skilled in the art, they are described in §§1.2.2.1.1. and 1.2.2.1.2 below for the reader's convenience.

§1.2.2.1.1 Type of Service Field

Recall from FIG. 3A above that version 4 of the internet protocol includes an eight (8) bit type of service field 306. As shown in FIG. 8, this field 306 includes a three (3) bit precedence sub-field 810 and a four (4) bit type of service sub-field 820. The type of service sub-field 820 guides an IP entity, in a source or a router, in selecting a next hop for the IP datagram. The precedence sub-field 810 guides the relative allocation of router resources for the datagram.

The eight (8) precedence levels encoded by the three (3) bit sub-field 810, in order of decreasing importance, are:

| | |
|---|---|
| 111 | Network control; |
| 110 | Internetwork control; |
| 101 | Critical; |
| 100 | Flash override; |
| 011 | Flash; |
| 010 | Intermediate; |
| 001 | Priority; and |
| 000 | Routine. |

Routers may ignore this sub-field 810. If, on the other hand, a router supports the precedence sub-field 810, it may base route selection, subnetwork service, and/or queuing discipline on this sub-field 810. The present invention concerns the transmission of packets in the output port queues.

At present, the five (5) types of services encoded by the four (4) bit sub-field 820 are:

| | |
|---|---|
| 1000 | Minimize delay; |
| 0100 | Maximize throughput; |
| 0010 | Maximize reliability; |
| 0001 | Minimize network charge costs; and |
| 0000 | Normal service. |

As was the case with the precedence sub-field 810, routers may ignore this sub-field 820. If, on the other hand, a router supports the type of service sub-field 820, it may base route selection, subnetwork service, and/or queuing discipline on this sub-field 820. To reiterate, the present invention is concerned with queuing discipline. For example, a router may preferentially treat queues to datagrams requesting minimized delay. A router may attempt to avoid discarding (or dropping) datagrams requesting maximized reliability.

§1.2.2.1.2 Priority Field

Recall from FIG. 3B above that version 6 of the internet protocol includes a four (4) bit priority field 328. This field 328 allows a source to identify desired transmit and delivery priorities of a packet relative to other packets from the same source. First, packets are classified as being part of traffic with the source either providing or not providing congestion control. Second, packets are assigned to one (1) of eight (8) levels or relative priority within each classification.

Congestion controlled traffic can, to differing extents, be delayed or be received out of order. Thus, the source can slow its transmission of congestion controlled traffic in response to network congestion. Version 6 of the internet protocol defines eight (8) categories of congestion controlled traffic. They are, in order of increasing priority:

| | |
|---|---|
| 0 | Uncharacterized traffic; |
| 1 | "Filler" traffic; |
| 2 | Unattended data transfer (e.g., e-mail); |
| 3 | (Reserved); |
| 4 | Attended bulk transfer (e.g., ETP, HTTP); |
| 5 | (Reserved); |
| 6 | Interactive traffic (e.g., TELNET); and |
| 7 | Internet control traffic. |

Non-congestion controlled traffic is traffic for which a constant (or at least relatively smooth) data rate and a constant (or at least relatively smooth) delivery delay are desired. For example, real time audio or video may be characterized as non-congestion controlled traffic. However, some packet loss (dropped packets) is acceptable. This traffic has eight (8) levels of priority, from the lowest priority (8) to the highest priority (15). For example, high definition video has a fair amount of redundancy and the loss of a few packets would likely be imperceptible, while with low fidelity audio, the loss of a few packets would be readily perceived as annoying clicks and buzzes. Thus, low fidelity audio would have a higher priority than high definition video.

§1.2.2.1.3 Integrated Services Architecture ("ISA")

Historically, internets based on the IP protocol provided a simple "best effort" delivery service. The fields discussed above concerning priority and type of service have generally been ignored by routers. Basically, the routers merely (i) used routing algorithms to select routes to minimize delay, and (ii) discarded most recently received packets in the event of a buffer overflow. These mechanisms are quickly becoming unsatisfactory. Given the need to support a variety of traffic having a variety of quality of service ("QoS") requirements within TCP/IP networks, the Integrated Services Architecture (or "ISA") was developed to provide QoS transport over IP-based internets. Basically, the ISA decides how to share available network capacity in times of congestion.

Basically, the ISA manages congestion and provides QoS transport via (i) admission control, which requires that a reservation be made for new flows (Recall fields 310 and 330 of FIGS. 3A and 3B, respectively.), (ii) routing algorithms which consider QoS parameters, (iii) queuing policies which consider QoS parameters, and (iv) a discard policy based on QoS parameters.

FIG. 9 is a high level block diagram of the ISA architecture 900. The routing protocol(s) 914 maintains a routing database 912 that provides a "next hop" to be taken for each destination address and each flow. The classifier and route selection means 910 determines the next hop address for a packet, based on the packet's class and destination address (recall field 324 or 324'). A class corresponds to flow(s) having the same QoS requirements.

A reservation protocol is used, among routers and between routers and end users, to reserve resources for a new flow at a given level of QoS. It updates the traffic control database 922 used by the packet scheduler 920 to determine the service provided for the packets of each flow. An admission control means 926 determines if sufficient resources are available for a flow requesting a reservation at a given QoS, and is invoked by the reservation protocol 924. The management agent 928 can modify the traffic control database 922 and set admission control policies in the admission control means 926. To reiterate, the packet scheduler 920 manages one or more queues (930, 940) for each output port of a router. More specifically, it determines the order in which queued packets are transmitted and, if necessary, which packets to discard (or drop). To reiterate, the present invention concerns the transmission of packets from output port queues.

In this way, ISA provides three (3) categories of service; namely, guaranteed, controlled load, and best effort. Guaranteed service (i) assures capacity level or data rate, (ii) bounds queuing delays through the network, and (iii) eliminates queuing losses. Controlled load service (i) approximates best effort service under unloaded conditions, (ii) does not bound queuing delays (though a very high percentage of packets do not experience delays, and (iii) has almost no queuing losses. Best effort service is just as its name suggests, with no special priorities.

§1.2.2.2 ATM Protocol

ATM networks also have the challenge of providing various qualities of service to various types of traffic. Basically, ATM networks need a control scheme for delay sensitive traffic, such as real time voice and video, and for bursty traffic (i.e., irregular traffic having intermittent "bursts" of transmitted data). The aspects of ATM that provided the benefits discussed in §1.2.1.2.1 above, present challenges when it comes to controlling traffic. For example, traffic not amenable to flow control, such as voice and video sources, will continue transmitting even when the network is congested. Further, their high speed switching and transmission make ATM networks more volatile in terms of congestion and traffic control. That is, transmission and switching are so fast that, during the time between the detection of a problem (e.g., a dropped cell) and its indication at the transmission source, a lot of unnecessary data will have already been transmitted. In other words, feedback is slow relative to propagation delays of the network.

The ATM forum has defined five (5) service categories; namely, (i) constant bit rate (or "CBR"), (ii) real-time variable bit rate (or "rt-VBR"), (iii) non-real-time variable bit rate (or "nrt-VBR"), (iv) unspecified bit rate (or "UBR") and (v) available bit rate (or "ABR"). Constant bit rate (CBR) service requires that the network support a fixed data rate. Real-time variable bit rate (rt-VBR) is defined in terms of a sustained rate for normal use and a faster burst rate for occasional use at peak periods. The faster rate is guaranteed but the user will not continuously require this rate. Bounds on cell transfer delay and delay variation are also specified. Non-real-time variable bit rate (nrt-VBR) is similar to rt-VBR except there is no delay variation bound specified. Further, a certain low cell loss ratio is allowed. Unspecified bit rate (UBR) is a best effort service. That is, no amount of capacity is guaranteed and any cells may be discarded. ABR provides a user with a guaranteed minimum capacity. When additional capacity is available, the user may burst above the minimum rate, though with a minimized risk of cell loss.

The service categories defined by the ATM forum are characterized by a number of ATM attributes. These attributes all into three (3) basic categories; namely, (i) traffic descriptors, (ii) QoS parameters, and (iii) other. Traffic descriptors characterize the traffic pattern of a flow of cells over an ATM connection. Such a traffic pattern is defined by (i) source traffic descriptors and connection traffic descriptors. Source traffic descriptors include (i) peak cell rate (or "PCR"), (ii) sustainable cell rate (or "SCR"), (iii) maximum burst size (or "MBS"), and (iv) minimum cell rate (or "MCR"). Connection traffic descriptors include (i) cell delay variation tolerance (or "CDVT") and (ii) a conformance definition. Quality of service ("QoS") parameters may include (i) peak-to-peak cell delay variation, (ii) maximum cell transfer delay, (iii) cell loss ratio, (iv) cell error ratio, (v) severely errored cell block ratio, (vi) cell misinsertion rate, and (vii) cell transfer delay. FIG. 10 is a plot of probability versus cell transfer delay and illustrates peak-to-peak cell delay variation and maximum cell transfer delay.

An ATM network may control traffic via (i) resource management using virtual paths, (ii) connection admission control, (iii) usage parameter control, (iv) traffic shaping, (v) selective cell discard, and (vi) cell scheduling. Selective cell discard and cell scheduling are performed at output ports of switches. The present invention concerns cell (in the context of ATM switches for example) or packet (in the context of routers for example) scheduling.

§1.2.2.3 Servicing Output Port Queues to Aid Traffic Management and Congestion Goals As mentioned above, TCP/IP internets and ATM networks (as well as other types of networks) may manage queues at output ports of routers or switches to facilitate QoS goals. Although various queuing disciplines are known to those skilled in the art, they are described here for the reader's convenience.

§1.2.2.3.1 FIFO Queue

Routers and switches have traditionally used first-in, first-out (or "FIFO") output port queues. FIG. 11 illustrates a FIFO queue 1110 which services a number of flows 1130 destined for the same transmission medium server 1120. However, FIFO queues have some disadvantages (such as those introduced in §1.2.1.2.2 above). First, packets from higher priority flows or flows which are more delay sensitive receive no special treatment. Second, a "greedy" transmission source (i.e., one that does not back off when network congestion exists), can crowd out other connections. Finally, in the context of TCP/IP, shorter packets can become "stuck" behind longer packets. (Recall that in ATM, all packets are fixed sized (53 octets) cells). Accordingly, a better queuing discipline is needed.

§1.2.2.3.2 Queues for Each "Flow"

Rather than providing a single queue 1110 for all flows 1130, as shown in FIG. 12, a separate queue 1210 may be provided for each flow 1130. Various ways of servicing these queues 1210 are discussed in §§1.2.2.3.2.1 through 1.2.2.3.2.4 below. The first two (2) methods of servicing queues (i.e., fair queue and processor sharing) do not consider QoS parameters. Only the third and fourth methods (i.e., generalized processor sharing and weighted fair queuing) considers such QoS parameters.

§1.2.2.3.2.1 Fair Queuing

In the "fair queuing" technique, multiple queues 1210 (e.g., one per source or flow) are provided at each output port as shown in FIG. 12. These queues are serviced in a round robin manner. Thus, with the fair queuing technique, the problem of "greedy" connections crowding out other connection is solved. However, in the context of TCP/IP (or any other protocol that does not fix the size of packets), shorter packets are penalized. That is, in terms of the amount of data transmitted, flows having large packets will have much more data transmitted than flows having smaller packets. To reiterate, this method does not consider QoS parameters.

§1.2.2.3.2.2 Processor Sharing

Like the fair queuing method discussed in §1.2.2.3.2.1 above, bit round robin fair queuing (or "BRFQ") considers flow ID (Recall, e.g., fields 310 and 330.) when queuing packets. However, BRFQ also considers packet length. In the ideal case, referred to as processor sharing, multiple queues would be serviced, round robin, where only one bit is taken from each queue per round. Naturally, since packets may have various sizes in the TCP/IP protocol, this ideal case cannot be performed. The BRFQ method approximates processor sharing by determining a virtual time, which records the rate of service seen by a packet at the head of a queue. The virtual time v(t) is defined as the number of rounds that have occurred up to time t, normalized to the output data rate. The rate of the virtual time v(t)' may be expressed as:

$$v'(t) = \frac{\partial v(t)}{\partial t} = \frac{1}{\max[1, N(t)]} \tag{1}$$

where N(t)=the number of non-empty queues at time t. When a $k^{th}$ packet arrives at a queue for flow i time $a_i^k$, it is stamped with a "virtual finish time" or "time stamp" ($F_i^k$) which may be expressed as:

$$F_i^k = S_i^k + P_i^k \tag{2}$$

where $S_i^k$ is referred to as "virtual starting time" or "starting potential"; and $P_i^k$=the transmission time for the $k^{th}$ packet in queue i, normalized to the output data rate.

The "virtual starting time" or "starting potential" $S_i^k$ may be expressed as:

$$S_i^k = \max[F_i^{k-1}, v(a_i^k)] \tag{3}$$

where $a_i^k$=the arrival time of the $k^{th}$ packet in queue i.

Using the forgoing equations, a packet's virtual finishing time (or time stamp) can be determined the moment it arrives at a queue i. However, in practice, a packet's virtual finishing time (or time stamp) is determined when the packet becomes a head-of-line packet. Under the BRFQ method, whenever a packet finishes transmission, the next packet sent is the one with the smallest value of $F_i^k$ (or time stamp or virtual finish time). It has been proven that throughput and average delay of each flow under BRFQ converges to processor sharing as time increases.

§1.2.2.3.2.3 Generalized Processor Sharing

Recall the fair queuing and bit round robin fair queuing methods do not provide different amounts of capacity to different flow types. The generalized processor sharing method is generalized to bits, and does not consider the various packet sizes that may be present on a TCP/IP internetwork (or other networks supporting packets of various sizes). In the generalized processor sharing method, each flow i has a weight $\phi_i$ that determines a number of bits to be transmitted from the queue i during each round. Thus, equation 2 above becomes:

$$F_i^k = S_i^k + \frac{P_i^k}{\phi_i} \tag{4}$$

$S_i^k$ is determined as set forth in equation 3 above. A service rate $g_i$ for non-empty flow i can be defined as:

$$g_i = \frac{C\phi_i}{\sum_j \phi_j} \quad (5)$$

where C=the data rate of the outgoing link.

The generalized processor sharing method provides a way to guarantee that delays for a well behaved flow do not exceed a bound. In the "leaky bucket" traffic shaping model (discussed in §1.2.2.3.2.5 below), if the weight assigned to each flow is the token rate ($\phi_i = R_i$), then the maximum delay $D_i$ experienced by flow i is bound (i.e., less than or equal to) $B_i/R_i$, where $B_i$ is the bucket size for flow i and $R_i$ is the token rate for flow i.

To summarize, the generalized processor sharing method permits different capacity to be assigned to different flows. However, it is generalized to bits, and does not consider packets which may have differing lengths.

§1.2.2.3.2.4 Weighted Fair Queuing

Weighted fair queuing emulates the bit-by-bit generalized processor sharing (just as bit round robin fair queuing emulated fair queuing), but considers packets rather than bits. Under the weighted fair queuing method, whenever the transmission of a packet is finished, the next packet transmitted is the one with the smallest $F_i^k$ (or time stamp or virtual finish time). The weighted fair queuing method allows a router to set parameters to guarantee a given rate of service. The bound delay can be expressed as:

$$D_i = \frac{B_i}{R_i} + \frac{(K_i - 1)L_i}{R_i} + \sum_{m=1}^{K_i} \frac{L_{max}}{C_m} \quad (6)$$

where $K_i$=the number of nodes in the path through the internet for flow i;

$L_i$=the maximum packet size for flow i;

$L_{max}$=the maximum packet length for all flows through all nodes of the path of flow i; and $C_m$=the data rate of the outgoing link at node M.

Thus, the weighted fair queuing method permits different capacity to be assigned to different flows and considers packets which may have differing lengths.

§1.2.2.3.2.5 Challenges

To reiterate, using the weighted fair queuing method, different capacity can be assigned to different flows which may have packets of different lengths. A global function is used to compute a "virtual finishing time" or "time stamp" (that is $F_i^k$) for each packet or each head-of-line packet for each queued flow. Basically, the "virtual finishing time" is the sum of its "virtual starting time" or "starting potential" (that is, $S_i^k$) and the time needed to transmit the packet at its reserved bandwidth. The queued head-of-line packets are served in the order of their time stamps.

Referring back to FIG. 12, when the number N of queued flows is relatively small, and/or the data rate is relatively low, known sorting or searching methods may be used to determine the head-of-line packet with the lowest time stamp. However, as the number N of queue flows increases (and higher data rates are used), these known methods become unsatisfactory. That is, one packet is selected per time interval, and as the line rate increases, the time interval decreases. For example, at a line rate of 155 Mbps, a 53 byte ATM cell occupies a 2.8 μs time slot.

Recently a worst-case fairness index (or "WFI") has been introduced to measure how closely a packet-by-packet scheduler emulates the generalized processor sharing method. Shaper schedulers have been proposed to minimize WFI. In the shaper schedulers, all arriving packets are first linked in a shaper queue based on their starting potentials. Only packets whose stating potentials are less than or equal to the virtual time or system potential are deemed "eligible" to join the scheduler. In the schedulers, packets are transmitted as usual, by increasing order of their time stamps.

Basically, traffic shaping is used to smooth traffic flow, thereby reducing packet or cell "clumping". Shaping may be implemented with a token bucket algorithm to control flow of cells. FIG. 13 illustrates a shaper 1300 employing the token bucket algorithm. Arriving packets are queued at packet queue 1320 having a capacity K. The server 1310 will accept the next packet only if a token is available from the token bucket 1330 (i.e., if the token bucket is not empty). The token bucket has a capacity B and is filled with tokens from a token generator 1340 at a predetermined rate. Thus, if a burst of packets arrive at a rate faster that the rate at which tokens are generated, once the token bucket is emptied, the packets at queue 1320 will be served by server 1310 at the predetermined rate at which tokens are generated by the token generator 1340.

Returning now to the challenge of scheduling the service of queued packets, a binary tree of comparators is a straight forward way to determine the next packet to be transmitted. Such a tree would have $\log_2 N$ levels where N is the number of queued flows at the output port. Unfortunately, as alluded to above, such a search engine would be expensive to implement.

The article: H. J. Chao et al., "A VLSI Sequencer Chip for ATM Traffic Shaper and Queue Manager," *IEEE J. Solid State Circuits*, Vol. 27, No. 11, pp. 1634–43 (November 1992) discusses an application specific integrated circuit (or "ASIC") sequencer chip which facilitates a priority queue with a constant time complexity (that is, independent of the number of queued flows N at the output port). This sequencer is disclosed in U.S. Pat. No. 5,278,828 (incorporated herein by reference). However, each of these chips can only handle 256 sessions (or flows). For a practical application, there could be thousands of flows. In such applications, the number of required sequencer chips would simply be too large to be cost effective.

The article: A. Lyengar et al., "Switched Prioritized Packets," *Proc. IEEE GLOBECOM*, pp. 1181–6 (November 1989) discusses a searching method where a number of timing queues are maintained for distinct time stamp values, thus defining a "calendar queue". More specifically, the head-of-line packets from different queued flows that have the same time stamp value are linked together forming a timing queue. A priority queue then selects a packet with the smallest time stamp. Unfortunately, this method can become too slow when the number of distinct time stamp values is large.

For example, FIG. 14 is a block diagram which illustrates a "calendar queue" method. A number N (e.g., 1024) of packet queues 1410 are provided, one for each flow. The time stamp of the hand-of-line packets are shown. In this example, the time stamps range from 1 to 16,000. A storage means 1420 is provided with a number of locations, one for each of the time slots. In each of the locations 1424 has a validity bit. If any head-of-line packets have the time stamp, the validity bit will be "1"; otherwise it will be "0". Validity bits of "1" point to a linked list of flow queues having a head-of-line packet with a corresponding time stamp. For example, since the head-of-line packets of the flows at the 14$^{th}$ and 200$^{th}$ queues each have a time stamp 10, a validity bit is set to "1" at the 10$^{th}$ location of the storage means 1420 and points to a linked list. Thus, the calendar queue searches through the validity bits 1422 of storage means 1420 for the first valid bit. The head-of-line packet at the flow queue associated with the first stored queue identifier of the linked list pointed to by the first valid bit will then be serviced. As mentioned above, the worst case search time is equal to the number of time stamps—16,000 in this case.

The article: H. J. Chao, et al., "Design of a Generalized Priority Queue Manager for ATM Switches," *IEEE J. Select. Areas in Commun.*, Vol. 14, No. 5, pp. 867–880 (June 1997) discusses a priority content addressable memory (or "PCAM") ASIC which can search for the minimum time stamp at a very high speed, can accommodate any number of sessions and any size buffer, and resolves time stamp overflow (discussed below). However, a sizable on-chip memory requirement makes the PCAM too expensive to implement. It would be desirable to use off-chip memory.

Thus, a scheduling method(s) and apparatus are needed. They should (i) have a total time complexity independent of the number of sessions in the system and (ii) use commercial (off-chip) memory. The scheduling method(s) and apparatus may also advantageously perform traffic shaping (i.e., they should achieve minimum WFI). Finally, the scheduling/shaping methods and apparatus should handle potential overflows of values represented by a finite number of bits. The present invention provides methods and apparatus to meet these goals.

§2. SUMMARY OF THE INVENTION

The present invention uses a hierarchical searching technique to find the first memory location of a calendar queue with a validity bit of "1" (that is, the lowest time stamp). A number M of bits at level lowest level of the hierarchy correspond to an array of validity bits. M is the largest time stamp. The M bits are grouped into groups of $g_{(L-1)}$ bits (Where L is the number of levels in the hierarchy.). The validity bits in each groups are logically ORed, and then concatenated to define a next level L−2 of bits. That next level of $M/g_{(L-1)}$ bits is further grouped into groups of $g_{(L-2)}$ bits. The process of grouping bits, ORing bits of a group, and concatenating the results is repeated until the resulting string of bits having a predetermined number of bits (e.g., a number of bits that can be placed in a register) is obtained. The number of bits in each groups may be the same at each level, or may differ.

The number of bits at any level (l) can therefore be expressed as:

$$M_l = g_l \times M_{l-1}, \text{ where } M_{L-1} = M \tag{7}$$

The $M_1$ bit string at level l may be denoted as:

$$<b_0{}^l b_1{}^l \ldots b_{M_{l-1}}{}^l>, \text{ where } b_i{}^l = \{0,1\}, i=0,1,\ldots, M_{l-1} \tag{8}$$

The $g_l$ bit string of the k$^{th}$ group may be denoted as:

$$<b_{kg_l}{}^l b_{kg_l+1}{}^l \ldots b_{(k+1)g_l-1}{}^l> \tag{9}$$

Thus:

$$b_k{}^{l-1} = b_{kg_l}{}^l \oplus b_{kg_l+1}{}^l \oplus \ldots \oplus b_{(k+1)g_l-1}{}^l, \text{ where } k=0,1,\ldots, M_{l-1}-1 \tag{10}$$

The bit string at any level l (l≠0) can be stored in a RAM of size $g_l M_{l-1}$. The string at the highest level in the hierarchy (l=0) can be stored in an $M_0$ bit register. If $m=\log_2 M$, then an m-bit address to the M time stamps may be denoted as $<a_0 a_1 \ldots a_{m-1}>$. Further, the address to locate any of the $M_l$ bits at level l may be denoted as $<a_0 a_1 \ldots a_{m_{l-1}}>$, where $m_l = \log_2 M_l$. Thus, the number of address bits need to address any bit at a level l may be expressed as:

$$m_l = \log_2 M_l = m_{l-1} + \log_2 g_l = \sum_{i=0}^{l} \log_2 g_i, \text{ where } g_0 = M_0. \tag{11}$$

Equation (11) illustrates a method of the present invention for addressing in a hierarchical search. That is, $m_0$ most significant bits of the time stamp address should be used at level 0. Then, at level l, the complete address used at upper level (l−1) will be used to locate the proper $g_l$ bit word in its $g_l M_{l-1}$ memory. Another $\log_2 g_l$ bits following the previous $m_{l-1}$ bits is extracted from the time stamp address and used to locate the proper bit in the $g_l$ bit word that has just been identified. In this way, the search time depends on the number L of levels. Thus, a scheduler based on the present invention can schedule large numbers of flows to be placed on a high speed data link (i.e., with a small time slot).

The present invention may also provide a shaper to minimize worst-case fairness index (or "WFI"). More specifically, a shaper minimizes the burstiness of the output packet stream from the scheduler. In the shaper-schedulers, all arriving packets are first linked in a shaper queue based on their starting potentials. Only packets whose starting potentials (S) are less than or equal to a system potential (v(t)) are deemed "eligible" to join the scheduler. That is, a packet is eligible if:

$$S_i^k < v(t) \tag{12}$$

In the schedulers, packets are transmitted as usual, by increasing order of their time stamps.

To alleviate the complexity of transferring multiple eligible packets from a shaper queue to a scheduler in a short period of time, the shaper queue is implemented as a multitude of priority lists. Each priority list is associated with a distinct value of starting potential S common to all queued packets in the list. Thus, a two-dimensional calendar queue can be constructed based on the starting potential S of the queued packets. W is the maximum value of S. In the calendar queue, all packets with the same starting potential are placed in the same column addressed by the value of S. Further, in each of the columns, the packets are sorted according to their time stamps F. As with the calendar queue of the scheduler of the present invention, if the validity bit is "1", a linked list of flow queues having head-of-line packets with virtual time stamps corresponding to the virtual finish time F (and the same starting potential) is present.

Every validity bit, or V-bit, in a column can be located by its unique address (S,F). However, it has not been proven feasible to implement a large number of priority lists (large W). The hierarchical searching method and RAM-based architecture of the present invention is extended to the shaper queue.

Finally, the present invention provides techniques for addressing a time stamp aging problem. In any scheduler, when an k$^{th}$ packet of session i is served (i.e., transmitted), the time stamp $F_i^k$ may be stored in a look-up table for later use (as $F_i^{k-1}$) The look-up table can be placed in memory for supporting a large number (N) of sessions (or flows), with the entry of $F_i^k$ addressed by i (where i=0,1, ..., N−1). Besides the time stamp $F_i^k$, other information related to session (or flow) i can also be stored at (or pointed to from)

the same location. Later, when a new packet k of the session (or flow) i arrives at the head of the session queue, and thus becomes the head-of-line (or "HOL") packet, the stored time stamp $F_i^{k-1}$ is needed so that it may be compared with the system potential $v(a_i^k)$ for determining a new starting potential $S_i^k$ for the $k^{th}$ packet as discussed above.

A potential time stamp aging problem exists when updating the starting potential $S_i^k$. Recall from equation 3 that a component of the starting potential Sik is the larger of the virtual finish time (or time stamp) of the last sent packet ($F_i^{k-1}$) and the system potential $v(a_i^k)$. Since the system potential $v(a_i^k)$ is represented by a finite number of bits in practice, it can "overflow". Given the possibility of system potential "overflow" it is impossible to decide, with certainty, which of the finish time potential (or time stamp) of the previous $(k-1)^{th}$ packet $F_i^{k-1}$ or the system potential $v(a_i^k)$ is greater without any previous history or certain constraints.

In accordance with the present invention, a previous time stamp $F_i^{k-1}$ may be considered to be obsolete if the system potential $v(a_i^k)$ exceeds it. That is, once the system potential $v(a_i^k)$ is larger than $F_i^{k-1}$, it will remain so. (Naturally, updating will occur when the next packet of the $i^{th}$ session or flow is served.) In the present invention, a number of bits can be used to record (i) a number of overflow events of the system potential $v(a_i^k)$, and (ii) a time zone where the system potential $v(a_i^k)$ and the stored finish potential $F_i^{k-1}$, respectively, belong. A purging means may be used to purge all stored time stamps $F_i^{k-1}$ that have become obsolete. The purging means should run fast enough to check each of the stored time stamps and purge all obsolete ones before the history of the system potential $v(a_i^k)$ overflows due to its representation by a finite number of bits.

Each purging operation has one, and perhaps two, memory accesses. The first is to read the time stamp $F_i^{k-1}$ of the last departed packet. If that time stamp $F_i^{k-1}$ is obsolete (i.e., less than the current system potential $v(a_i^k)$), the second memory access is a write operation to mark the time stamp as obsolete. Due to the limited speed of memory accesses, it might not be possible to complete all purging operations during a time slot, particularly when N is large. Since it might not be possible to perform all N purging operations during a time slot (i.e., it might take a number of time slots to perform all N purging operations), the present invention may track any time stamp or system potential overflow while all purging operations are performed. For example, in the present invention, a first counter variable $C_v(t)$ may be used to track system potential overflow, while another counter variable $C_i$ may be used to track time stamp (or virtual finish time) overflow.

§3. BRIEF DESCRIPTION OF THE DRAWINGS

§4. DETAILED DESCRIPTION

The present invention concerns novel methods and apparatus for scheduling, or shaping and scheduling, the service of head-of-line packets in queued flows. The present invention also concerns novel methods and apparatus for considering the aging of time stamps used by schedulers for servicing queued flows. The following description is presented to enable one skilled in the art to make and use the invention, and is provided in the context of particular applications and their requirements. Various modifications to the disclosed embodiment will be apparent to those skilled in the art, and the general principles set forth below may be applied to other embodiments and applications. Thus, the present invention is not intended to be limited to the embodiments and methods shown.

In the following, the basic concept or function(s) performed by the present invention is described in §4.1. Then, two exemplary methodologies and embodiments of the present invention and more specifically, scheduling and a shaping-scheduling, are described in §§4.2 and 4.3, respectively. Finally, methods and apparatus for considering time stamp aging in the present invention is described in §4.4.

§4.1 Functions(s) of the Present Invention

Figure 14:
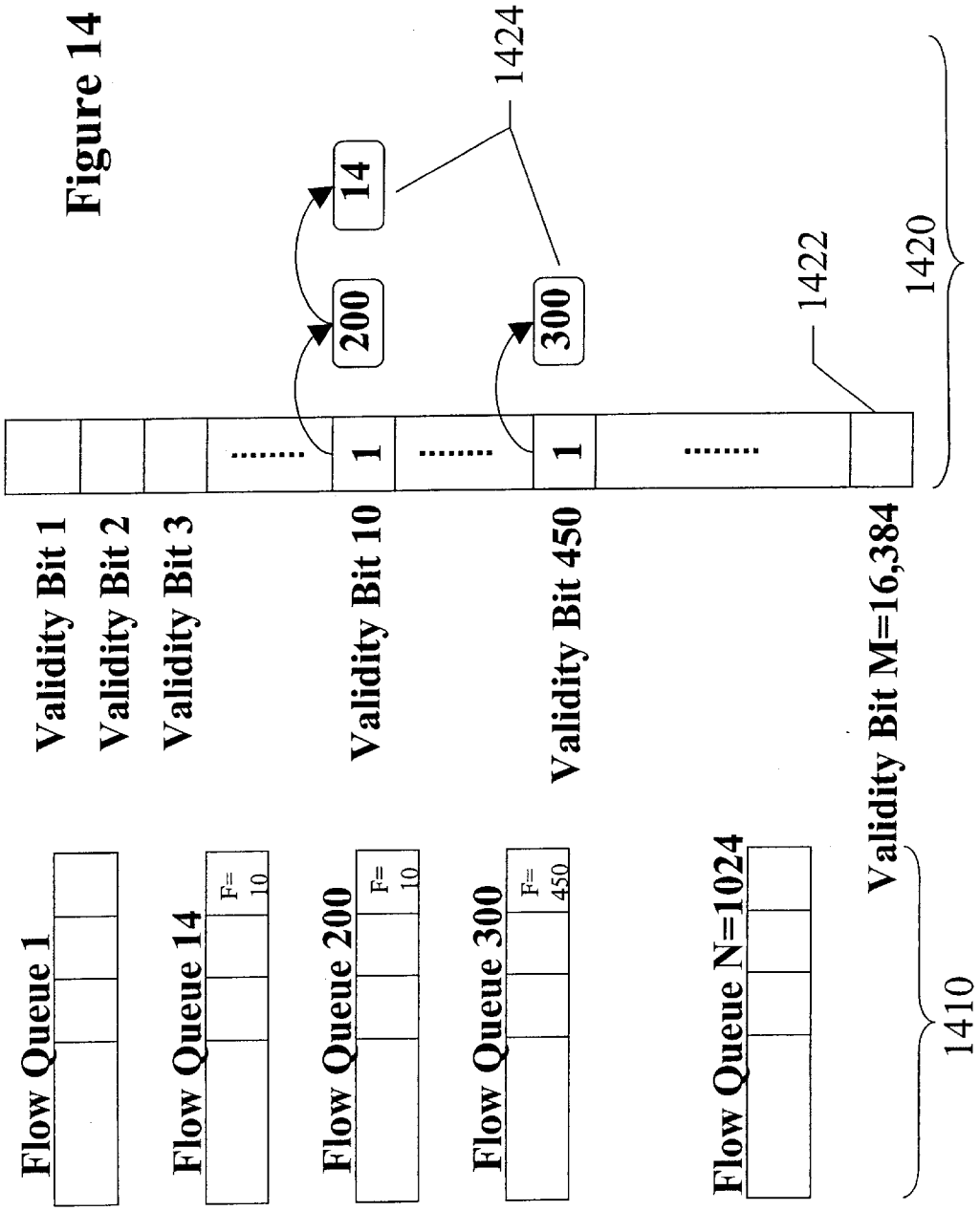
FIG. 14 is a block diagram which illustrates a calendar queue and its limitations.

Recall, from FIG. 14, that in a "calendar queue" method, a number N of packet queues is provided, one for each flow. A storage means 1420 is provided with a number M of locations 1422, one for each of a number (e.g., 16,000) of time stamps. In each of the locations 1422 a validity bit is stored. If the validity bit is "1", it will include a pointer to a linked list of identifiers of flow queues having a head-of-line packet with a corresponding time stamp. Recall that the worst case search time is equal to the number M of time stamps.

Figure 15:
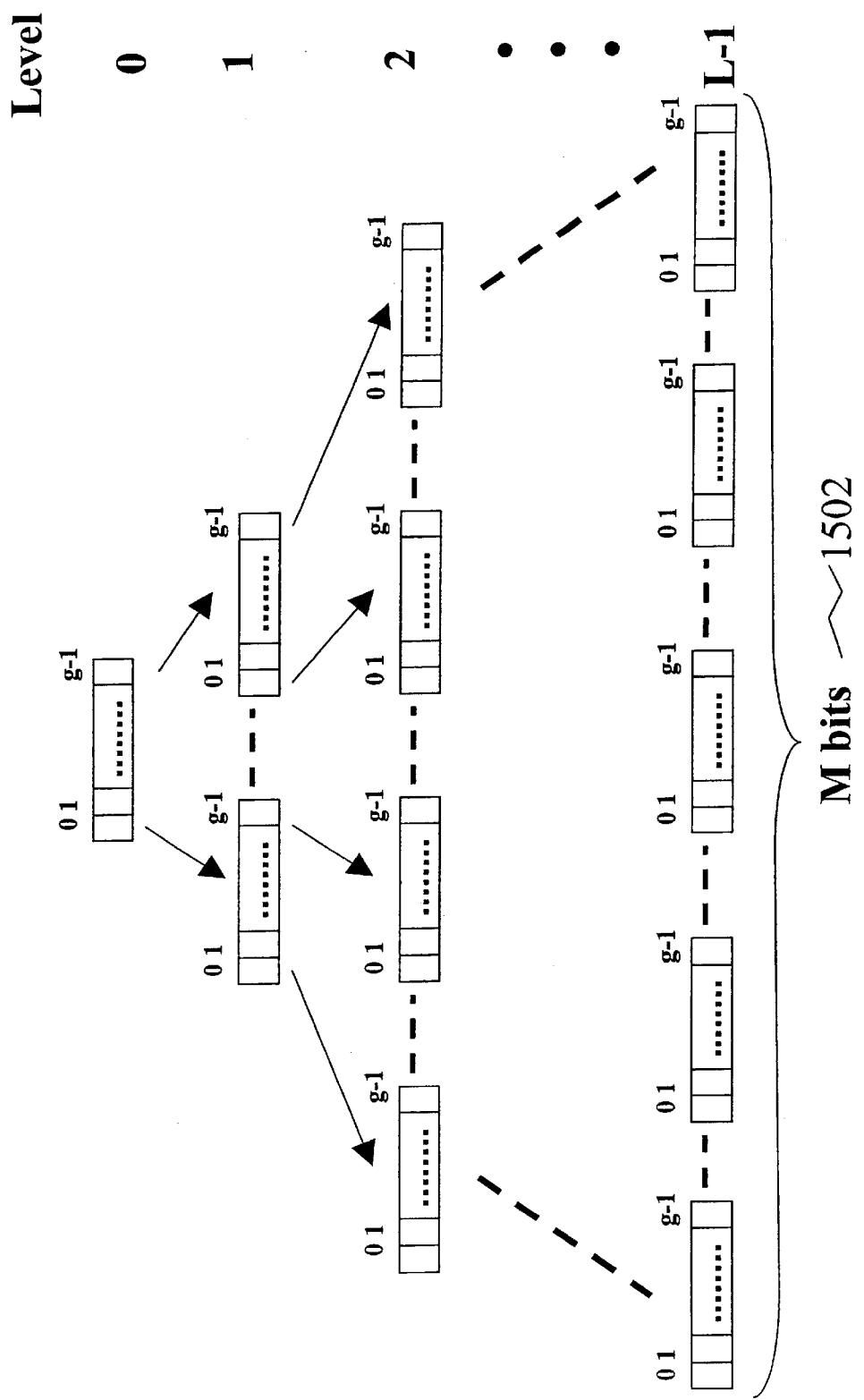
FIG. 15 is a diagram which illustrates the logical structure of the hierarchical searching method of the present invention.

The present invention uses a hierarchical searching technique to find the first memory location 1422 with a validity bit of "1" (that is, the lowest time stamp). FIG. 15 illustrates a logical structure of the hierarchical searching employed by the present invention. Referring to both FIGS. 14 and 15, the M bits 1502 at level L−1 correspond to the array of validity bits 1422. M is the largest time stamp. The M bits are grouped into groups of $g_{(L-1)}$ bits. The validity bits in each groups are logically ORed, and then concatenated to define a next level L−2 of bits. That next level of $M/g_{(L-1)}$ bits is further grouped into groups of $g_{(L-2)}$ bits. The process of grouping bits, ORing bits of a group, and concatenating the results is repeated until the resulting string of bits having a predetermined number of bits (e.g., a number of bits that can be placed in a register) is obtained. The number of bits in each groups may be the same at each level, or may differ.

The number of bits at any level (l) can therefore be expressed as:

$$M_l = g_l \times M_{l-1}, \text{ where } M_{L-1} = M \quad (7)$$

The $M_l$ bit string at level l may be denoted as:

$$<b_0{}^l b_1{}^l \ldots b_{m_{l-1}}{}^l>, \text{ where } b_i{}^l = \{0,1\}, i = 0,1, \ldots, M_{l-1} \quad (8)$$

The $g_l$ bit string of the $k^{th}$ group may be denoted as:

$$<b_{kg_l}{}^l b_{kg_l+1}{}^l \ldots b_{(k+1)g_l-1}{}^l> \quad (9)$$

Thus:

$$b_k{}^{l-1} = b_{kg_l}{}^l \oplus b_{kg_l+1}{}^l \oplus \ldots \oplus b_{(k+1)g_l-1}{}^l, \text{ where } k=0,1,\ldots, M_{l-1}-1 \quad (10)$$

The foregoing processes is illustrated with the following examples. Suppose there are M=32,786 validity bits (i.e., there are 32,786 time stamps). If these validity bits are segmented into $g_{(L-1)}$=32 bit groups, there will be 1024 groups of 32 bits. In each group, the validity bits are logically ORed together, and the resulting bits are concatenated resulting in a 1024 bit string at the L−2 level. If this string is then segmented into $g_{(L-2)}$=32 bit groups again, there will be 32 groups of 32 bits. In each group, the validity bits are logically ORed together, and the resulting bits are concatenated resulting in a 32 bit string. The 32 bit string may be stored in a register at the L−3 level. Thus, there are three levels, one (l=L−3=0) with a 32 bit string, a second (l=L−2=1) with a 1024 bit string, and a third (l=L−1=2) with a 32,786 bit string. In this example, the bit strings at both the third and second levels were divided into groups of 32 bits (i.e., $g_2=g_1$=32). In this case, the worst case search time is the time to check 96 (i.e., 32+32+32) bits rather than the time to check 36,768 bits. As described below, since the groups of bits are used as addresses, the worst case search time is actually related to the number of levels—in this case three (3).

The number of bits/group need not be the same for each level. For example, if $g_3=g_2$=8 and $g_1$=32, then there are 36,768 bits at a fourth (l=L−1=3) level, 4096 bits at a third (l=L−2=2) level, 512 bits at a second (l=L−3=1) level, and 16 bits at a first (l=L−4=0) level. In this case, the worst case search time is the time to check 64 (i.e., 16+32+8+9) bits. Thus, as the number of levels L increases, and the grouping size can be decreased. However, as mentioned above, and as will be described in more detail below, since the groups of bits are used as addresses, the worst case search time is actually related to the number of levels—in this case four (4).

Note that the bit string at any level l (l≠0) can be stored in a RAM of size $g_l M_{l-1}$. The string at the first level (l≠0) can be stored in an $M_0$ bit register. If m=$\log_2 M$, then an m-bit address to the M time stamps may be denoted as $<a_0 a_1 \ldots a_{m-1}>$. Further, the address to locate any of the $M_l$ bits at level l may be denoted as $<a_0 a_1 \ldots a_{m_l-1}>$, where $m_l = \log_2 M_l$. Thus, the number of address bits need to address any bit at a level l may be expressed as:

$$m_l = \log_2 M_l = m_{l-1} + \log_2 g_l = \sum_{i=0}^{l} \log_2 g_i, \text{ where } g_0 = M_0. \quad (11)$$

Equation (11) illustrates a method of the present invention for addressing in a hierarchical search. That is, $m_0$ most significant bits of the time stamp address should be used at level 0. Then, at level 1, the complete address used at upper level (l−1) will be used to locate the proper $g_l$ bit word in its $g_l M_{l-1}$ memory. Another $\log_2 g_l$ bits following the previous $m_{l-1}$ bits is extracted from the time stamp address and used to locate the proper bit in the $g_l$ bit word that has just been identified. In this way, the search time depends on the number L of levels. Thus, a scheduler based on the present invention can schedule large numbers of flows to be placed on a high speed data link (i.e., with a small time slot).

§4.2 Ram-Based Schedular

Figure 16:
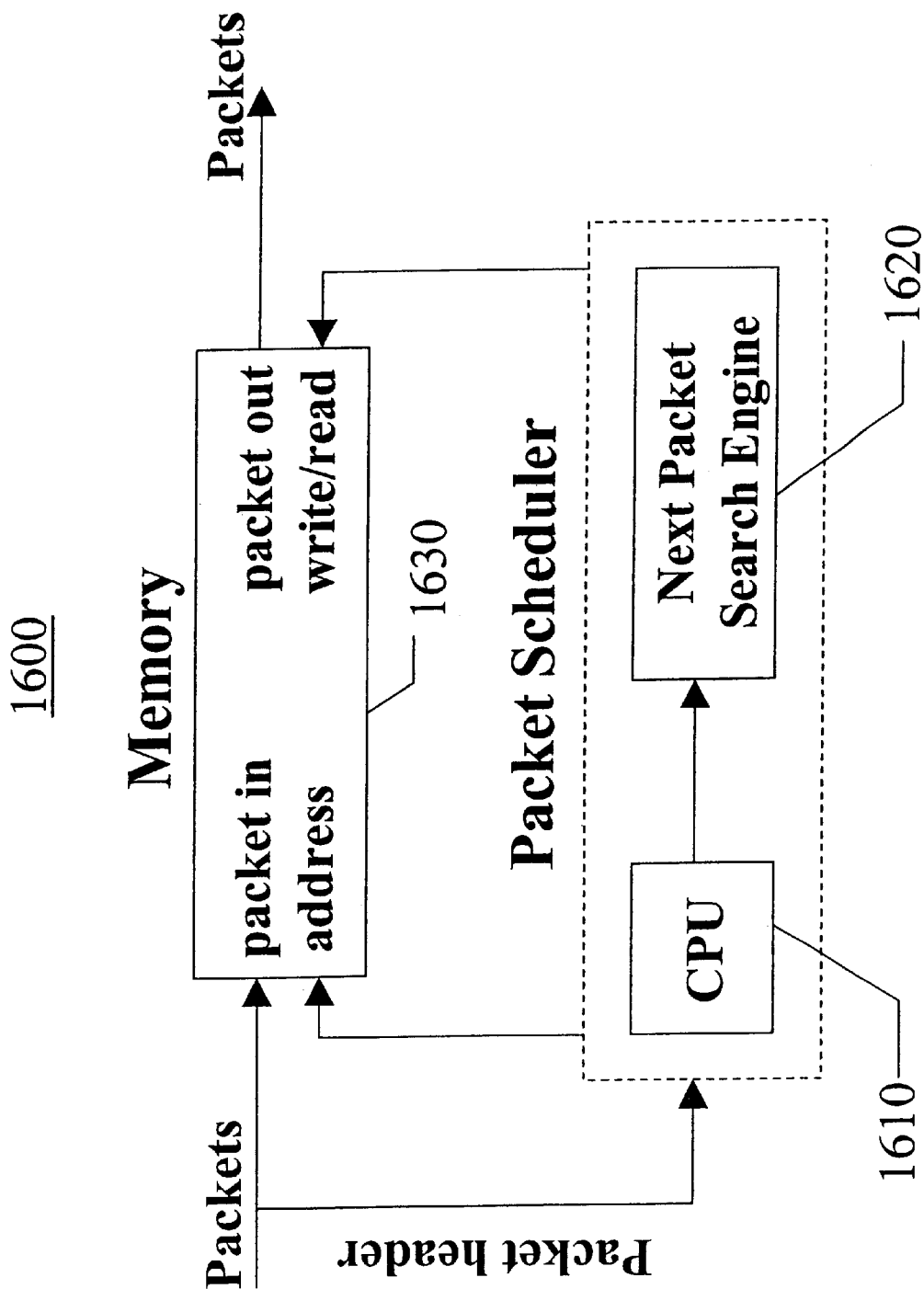
FIG. 16 is a high level block diagram of a packet scheduler.

FIG. 16 is a high level block diagram of a RAM-based packet scheduler 1600. This RAM-based packet scheduler 1600 may be located at each of the output ports of a switch or router. The CPU 1610 computes time stamps, as described above, and other system control. Packets are associated with addresses defined by their time stamps and may be stored in memory 1630. The next packet search engine 1620 selects the next head-of-line packet to be transmitted over the transmission medium coupled at the output port. Again, the present invention concerns the next packet search engine 1620.

§4.2.1 Exemplary Method for Ram-Based Scheduler

Figure 17:
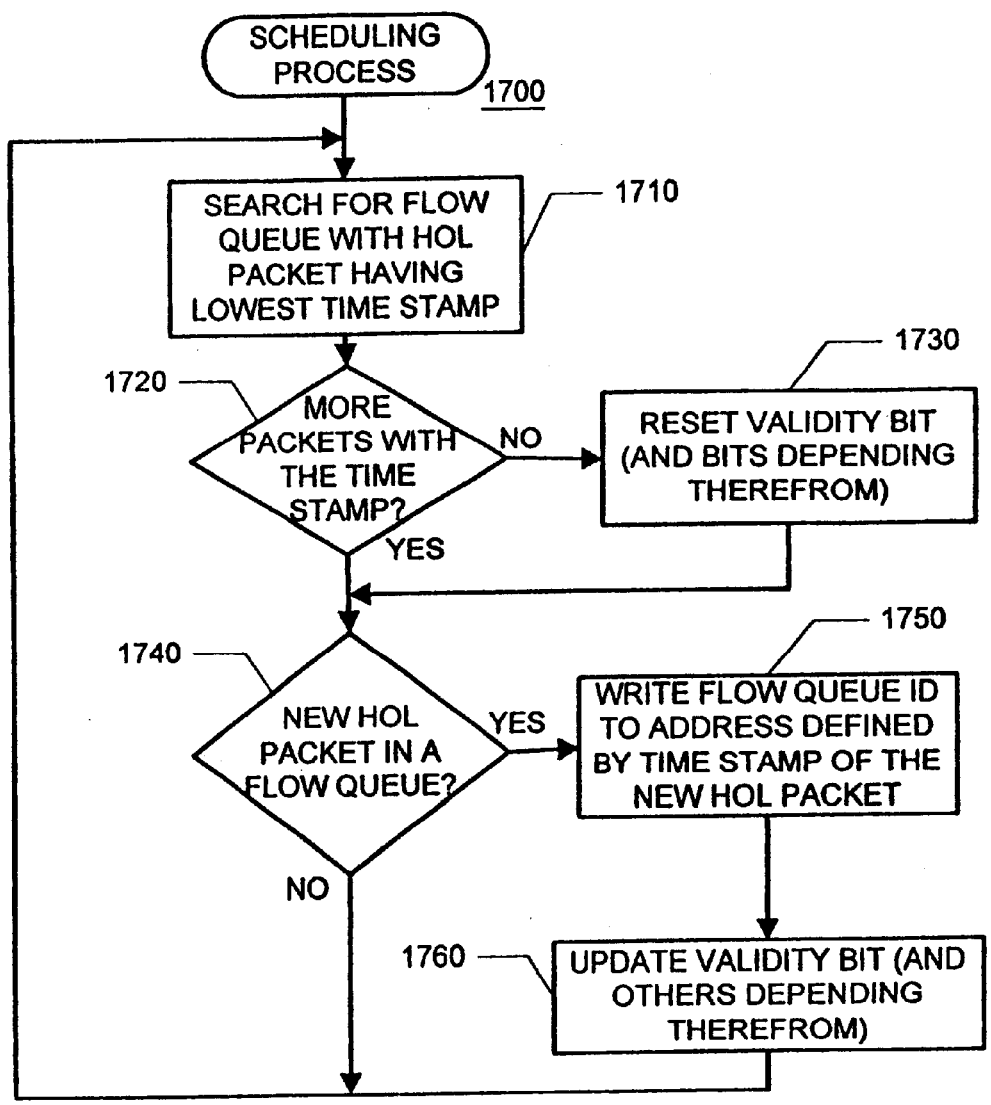
FIG. 17 is a high level flow diagram of an exemplary scheduling method.

FIG. 17 is a high level flow diagram of an exemplary method 1700 for scheduling the service of head-of-line packets in a number of flow queues. First, as shown in step 1710, a search is performed to find the flow queue with a head-of-line packet having a lowest time stamp. (Recall from FIG. 14 that a memory having storage locations based on the time stamps, stores corresponding flow queue identifiers.) An exemplary method for performing this step is described with reference to FIG. 18 below. Next, as shown in decision step 1720, it is determined whether any more head-of-line packets have the same time stamp. (Recall from FIG. 14 that there may be a linked list of flow queue identifiers pointed to from a storage location corresponding to a given time stamp.) If not, the validity bit is reset (to "0") as shown in step 1730. Further, since bits in strings at higher levels in the hierarchy may be affected by the change of the validity bit, these bits are also reset, if necessary. An exemplary method for performing this step is described with reference to FIG. 20. Processing then continues to decision step 1740.

Returning to decision step 1720, if there are more packets with the time stamp, then the validity bit should remain "1" and therefore, no changes are needed. Thus, in this case, processing may continue directly to decision step 1740. At decision step 1740, it is determined whether there is a new head-of-line packet in a flow queue. This will occur in a flow queue, having more than one packet, in which the head-of-line packet is serviced. This will also occur if a previously empty flow queue receives a packet(s). In any event, if a flow queue has a new head-of-line packet processing branches to step 1740 where the identification of the flow queue is pointed to from the address defined by the time stamp of the new head-of-line packet. Next, as shown in step 1760, the validity bit, as well as bits in other strings higher in the hierarchy, may be updated if necessary. An exemplary method for performing steps 1740 and 1760 is described with reference to FIG. 19. Processing then continues to step 1710. Returning to step 1740, if a new head-of-line packet is not in a flow queue (which will only happen in the event that all flow queues are empty), processing continues directly to step 1710.

Figure 18:
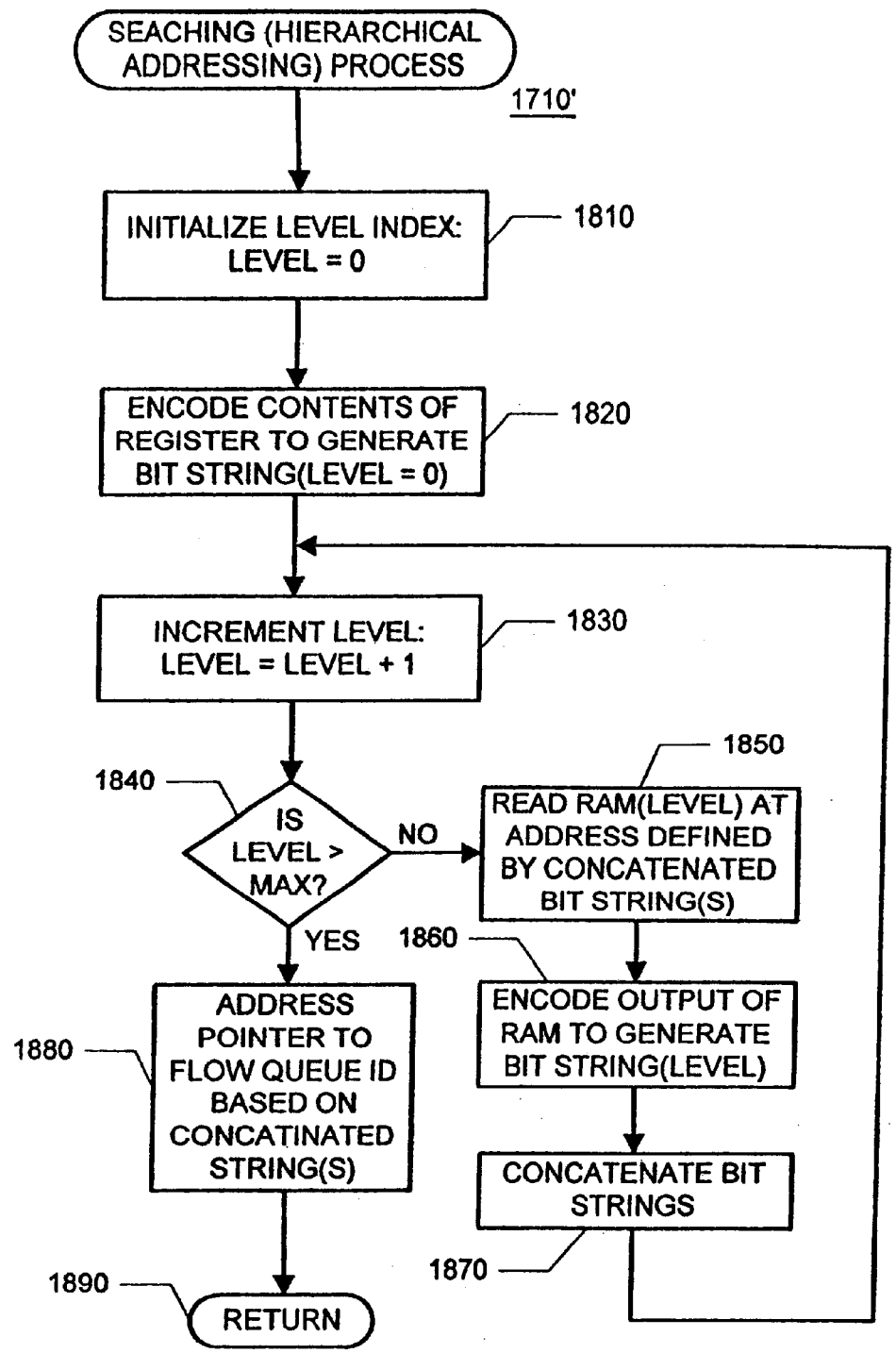
FIG. 18 is a high level flow diagram of an exemplary searching process which may be used by the scheduling method of FIG. 17.

FIG. 18 is a flow diagram of an exemplary method 1710' for searching for the flow queue with a head-of-line packet having the lowest time stamp. First, as shown in step 1810, the hierarchical level (See, e.g., FIG. 15.) is set to zero (0). Next, as shown in step 1820, the contents of the register are encoded to generate a bit string (STRING(0)). More specifically, the $M_o$ bits are encoded as a $\log_2 g_0$ length string by a priority encoder (described below). Next, the hierarchical level is incremented as shown in step 1830. As shown in decision step 1840, if the level is greater than a maximum level, the calendar queue may be addressed in step 1880 and the processes 1710' is left via return node 1890. Returning to decision step 1840, if the level is not greater than a maximum level, a RAM at the current level is read, using an address defined by (concatenated) encoded bit string(s) as shown in step 1850. Next, as shown in step 1860, the read contents of the RAM are encoded, as discussed above with reference to step 1820, to generate a bit string (STRING (level)). Next, as shown in step 1870, the bit strings are concatenated (i.e., <STRING(0)-STRING(1)- . . . STRING (max level)>) and processing continues to step 1830.

Figure 19A:
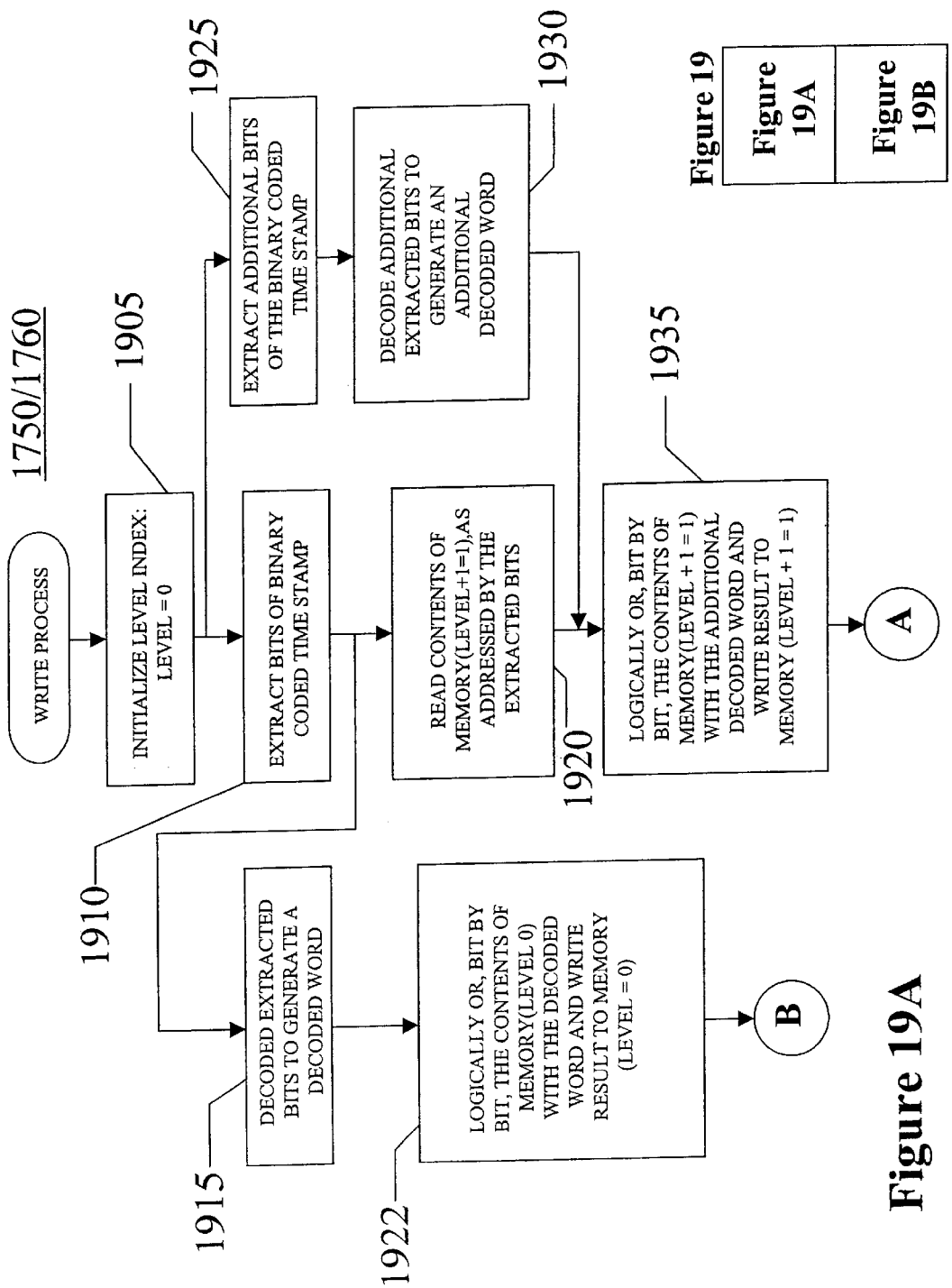
FIG. 19 is a high level flow diagram of an exemplary writing process which may be used by the scheduling method of FIG. 17.
Figure 19B:
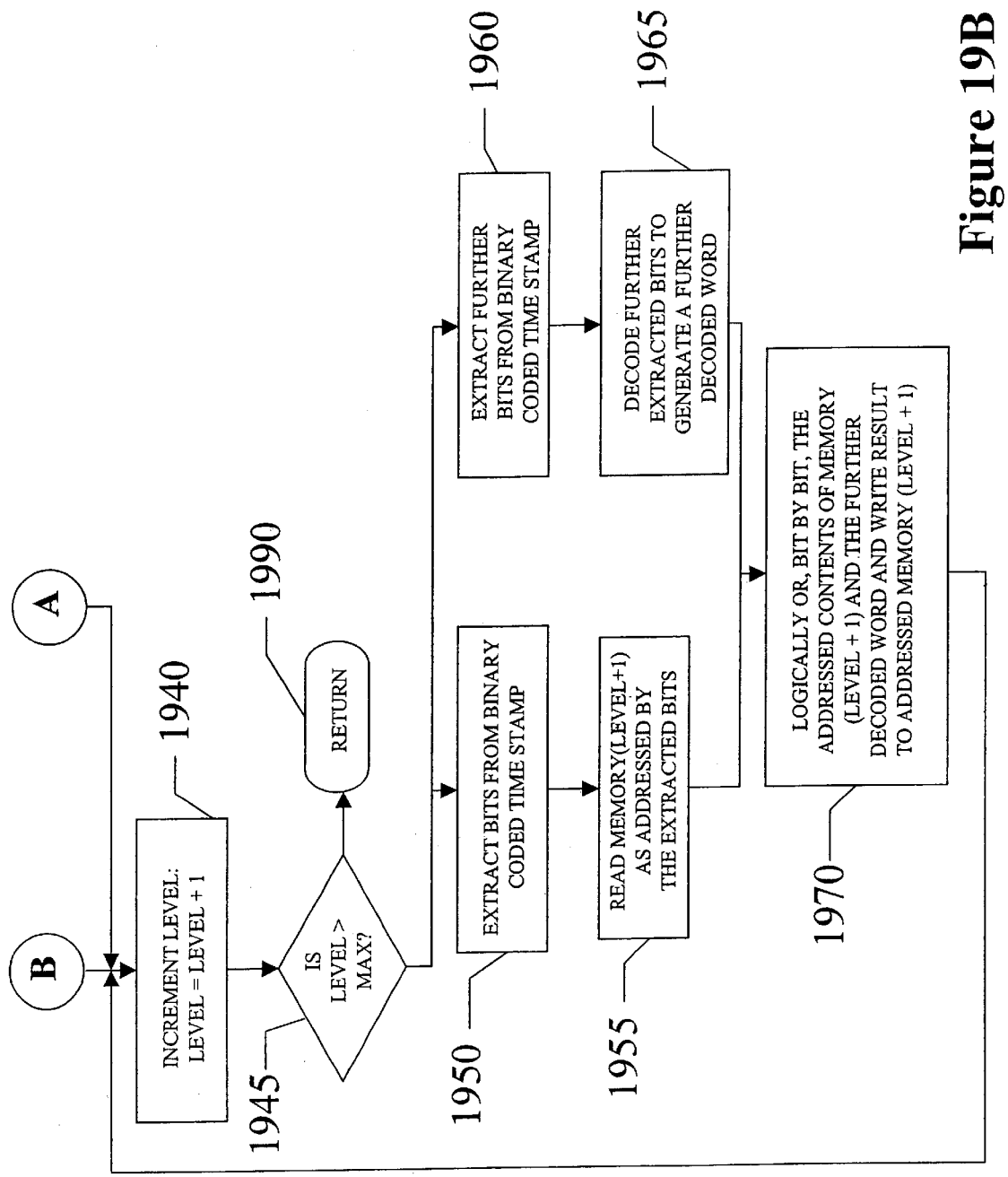

FIG. 19 is a flow diagram of an exemplary method 1750/1760' for, in the event that any of the flow queues has a new head-of-line packet, (i) providing a flow queue identification pointed to by an address defined by the time stamp of the new head-of-line packet and (ii) updating the corresponding validity bit and any bits derived therefrom.

First, as shown in step 1905, the hierarchical level (See, e.g., FIG. 15.) is set to zero (0). Next, as shown in step 1910, the $\log_2(M_1/g_l) = \log_2 M_0$ most significant bits of the binary coded time stamp are extracted. Next, as shown in step 1920, the contents of memory at the next level, addressed using the extracted bits, are READ. In addition, as shown in step 1922, the decoded word of the extracted bits and the contents of the memory at level 0 are logically ORed and the result is written back to the memory at level 0. Before, after, or concurrently with steps 1910, 1915, and 1920, as shown in steps 1925 and 1930, (i) additional bits (the next $\log_2 g_1$ most significant bits) are extracted from the binary coded time stamp and (ii) these additional extracted bits are decoded to generate an additional ($g_1$) bit decoded word. Next as shown in step 1935, the additional decoded word and the content of the memory at level (l+1=1) are logically ORed, bit by bit, to generate a result which is WRITEN to the memory at the next level, addressed by the decoded word.

The exemplary write process 1750/1760' has now been described for the first level. The processing of subsequent levels is performed, iteratively, as follows. More specifically, as shown in step 1940, the level (index) is incremented. If, as shown in decision step 1945, the level (index) exceeds a maximum, the process 1750/1760' is left via return node 1990. If, on the other hand, the level (index) does not exceed a maximum, processing continues at step 1950.

As shown in step 1950, the $\log_2 (M_l/g_l) - \log_2 M_{l-1}$ most significant bits of the time stamp are extracted. Next, as shown in step 1955, the memory at the next level, as addressed by the extracted bits, is READ. Before, after, or concurrently with steps 1950 and 1955, as shown in steps 1960 and 1965, (i) the next $\log_2 g_{l+1}$ most significant bits of the time stamp are extracted and (ii) these further extracted bits are decoded to form a $g_{l+1}$ bit word. Finally, as shown in step 1970, the READ $g_{l+1}$ bit word from step 1955 and the decoded $g_{l+1}$ bit word from step 1965 are logically ORed, bit by bit and the result is stored in the memory of the next level as addressed by the extracted bits. Processing of the next level (if it exists) is carried out via step 1940.

Figure 20A:
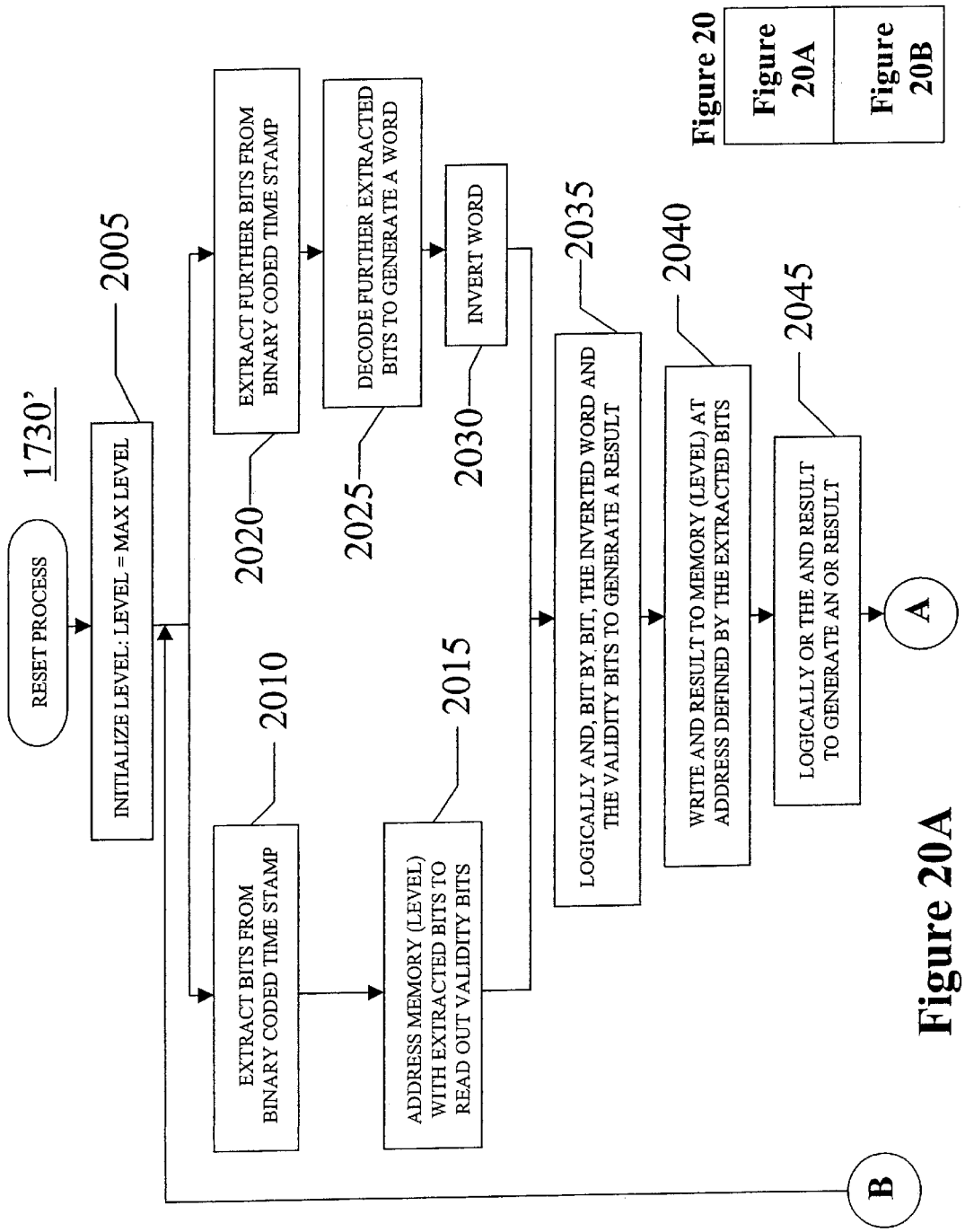
FIG. 20 is a high level flow diagram of an exemplary resetting process which may be used by the scheduling method of FIG. 17.
Figure 20B:
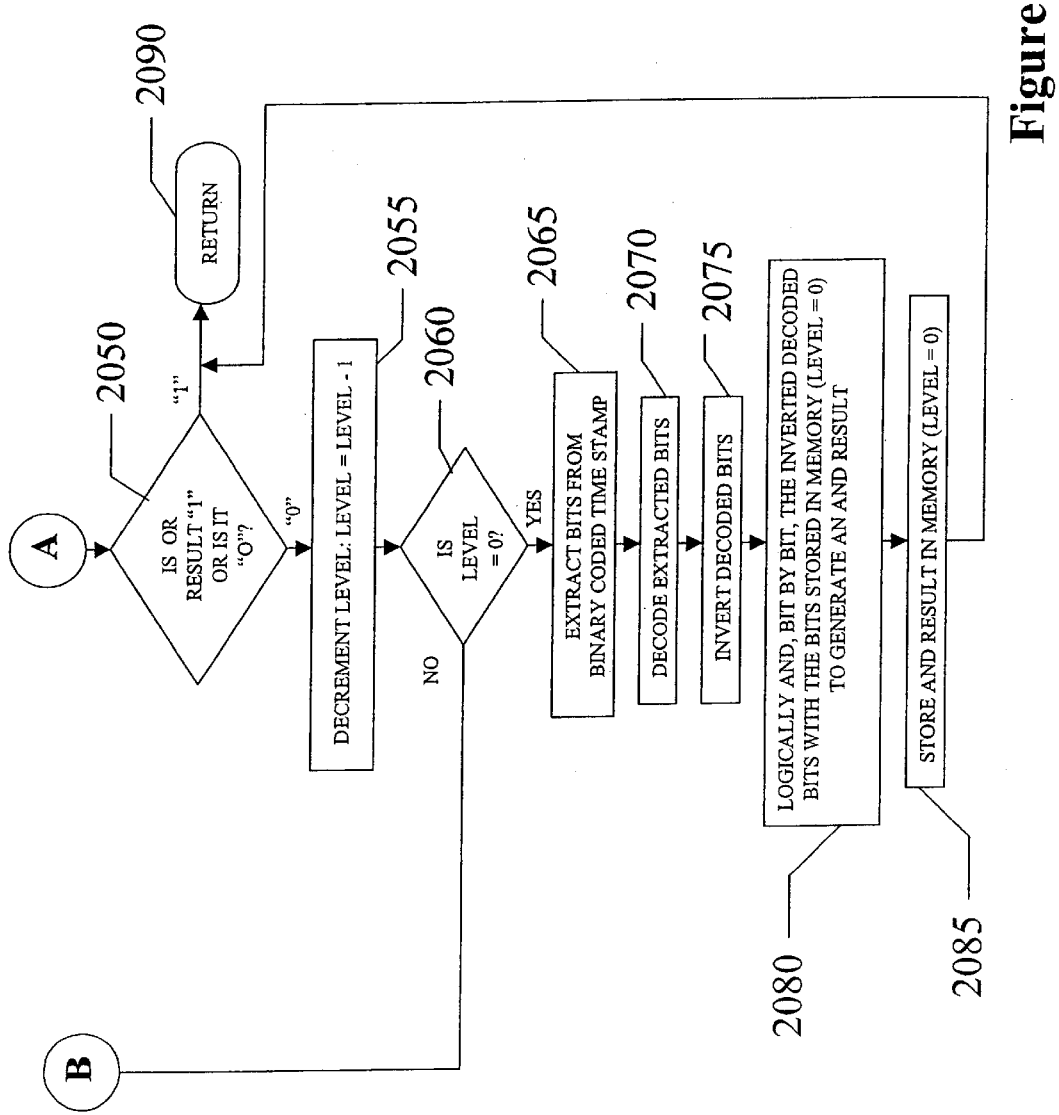

FIG. 20 is a flow diagram of an exemplary method 1730' for resetting the validity bits and any bits derived therefrom when a head-of-line packet is served. First, as shown in step 2005, a level (index) is set to a maximum level. Next, as shown in step 2010, the $\log_2(M_l/g_l)$ most significant bits of the binary coded time stamp are extracted. Next, as shown in step 2015, the memory at the current level is addressed using the extracted bits and its contents are read out. Processing then continues to step 2035. Before, after, or concurrently with steps 2010 and 2015, steps 2020, 2025, and 2030 are performed. More specifically, in step 2020 the next $\log_2 g_l$ bits of the binary coded time stamp are extracted. These further extracted bits are decoded to generate a $g_l$ bit word as shown in step 2025. Finally, the decoded word is inverted as shown in step 2030. Processing then continues to step 2035.

Referring to step 2035, the inverted decoded word and the validity bits read out from the memory of the current level are logically ANDed, bit by bit, to generate an AND result. The AND result is then written to the memory of the current level at the address defined by the extracted bits as shown in step 2040. Also, as shown in step 2045 the bits of the AND result are logically ORed. As shown in decision step 2050, if the OR result is "1" (denoting that the change in the validity bit will not "ripple up" to the higher hierarchical levels), the reset process 1730' is ended via return node 2090. If on the other hand, the OR result is 0, the change to the validity bit will change a bit on at least the next hierarchical level and processing continues at step 2055. The processing of the higher levels in this event is now described.

As shown in step 2055, the level (index) is decremented. If the level is not 0, processing branches to step 2010 which was already discussed above. Otherwise, if the level is 0, processing branches to step 2065 where the $\log_2 M_0$ most significant bits are extracted from the binary coded time stamp. Next, as shown in step 2070, the extracted bits are decoded to generate an $M_0$ bit word. This decoded word is inverted, as shown in step 2075. The inverted, decoded word is then logically ANDed, bit by bit, with the $M_0$ bits stored in the memory (e.g., register) of the current level (l=0), as shown in step 2080, to generate an AND result. This AND result is then stored in the memory (e.g., register) of the current level (l=0) as shown in step 2085 and the reset process 1730' is ended via the return node 2090.

§4.2.2 Exemplary Apparatus for Implementing Ram-Based Scheduler

Figure 21:
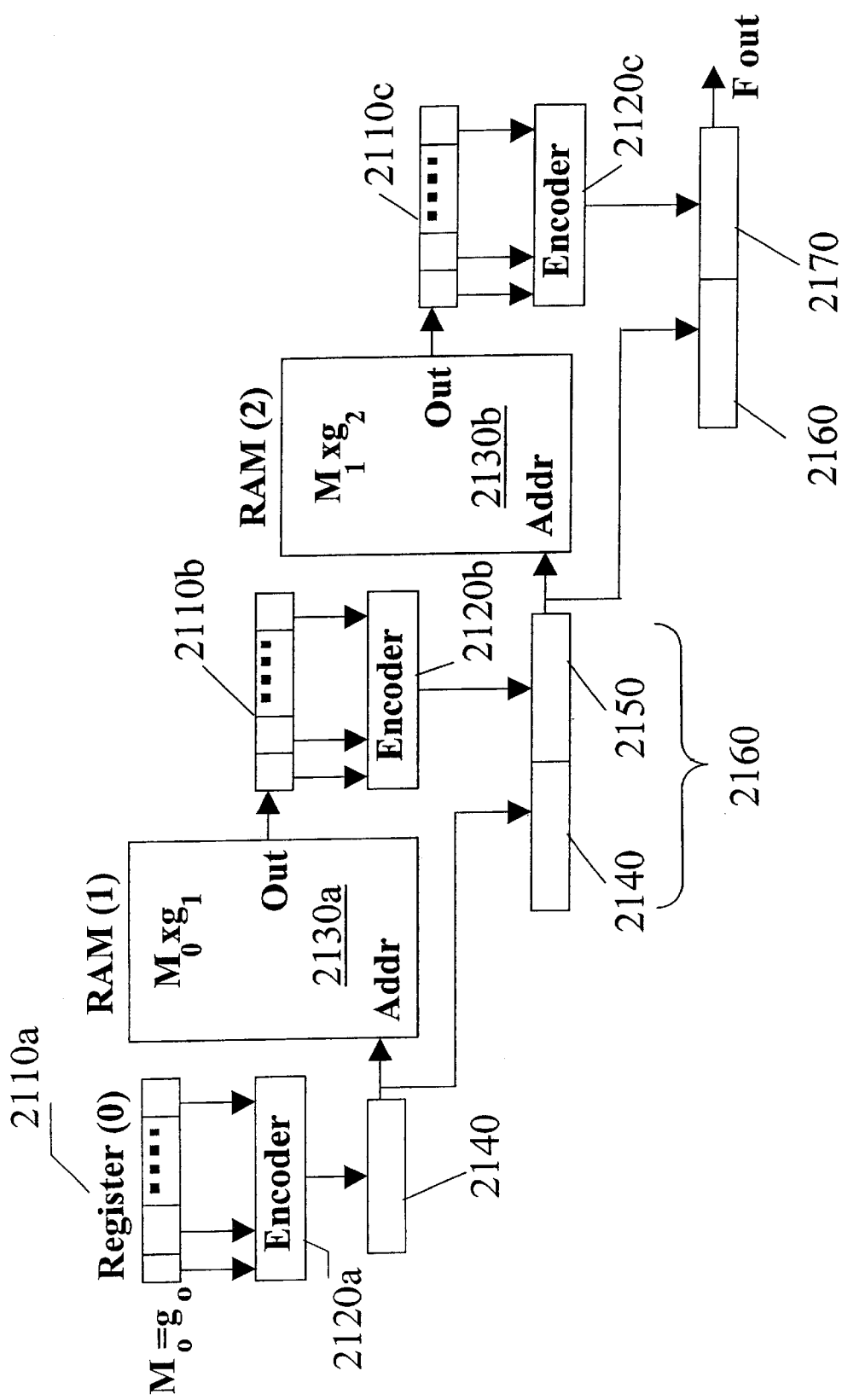
FIG. 21 is a block diagram of a first exemplary embodiment of the present invention.

FIG. 21 is a high level block diagram of an exemplary embodiment of the present invention. A register 2110a is provided at the highest level (l=0) of the hierarchy. Addressable storage devices, such as RAMs, 2130 are provided at lower levels of the hierarchy. Each level of the hierarchy also includes an associated encoder 2120. Thus, referring to FIG. 21 and recalling the steps of FIG. 18 described above, to find the lowest time stamp, the contents of the register 2110a are encoded by encoder 2120a and stored as string 2140. The string 2140 is used to address RAM 2130a, the addressed contents of which are provided to register 2110b. The contents of the register 2110b are encoded by encoder 2120 to produce a second string 2150 which is concatenated with the first 2140 to produced a string 2160. The string 2160 is used to address the RAM 2130b, the contents of which are provided to register 2110c. The contents of the register 2110c are then encoded by encoder 2120c to generate a third bit string 2170. The third bit string 2170 is concatenated with the first two 2160 to generate an address, which corresponds to a minimum time stamp, for addressing a RAM-based calendar queue.

In addition to having an encoder, each level also has an associated decoder (not shown) which is used to write and/or reset the $\log_2 g_l^{th}$ bit on any $g_l$ word. In a write operation (Recall steps 1740 and 1760 of FIG. 17.), the $g_l$ bit outputs from both the decoder and the $g_l M_{l-1}$ RAM are ORed. In a reset operation (Recall step 1730 of FIG. 17.), the $g_l$ bit output for the decoder is inverted and ANDed with the output of the $g_l M_{l-1}$ RAM.

Having discussed the search, write and reset operations of the present invention with reference to a high level block diagram, a way to deal with time stamp overflow is now described.

The maximum time stamp value (e.g., M−1) may be determined by the maximum packet length over the minimum allocated bandwidth supported in a real system. Since the value of the time stamp increases monotonically with time, and since the memory has finite memory (addressed by m bits), the calculated time stamp may exceed (or "overflow") a maximum value M. (Recall that $M=2^m$.)

Figure 22A:
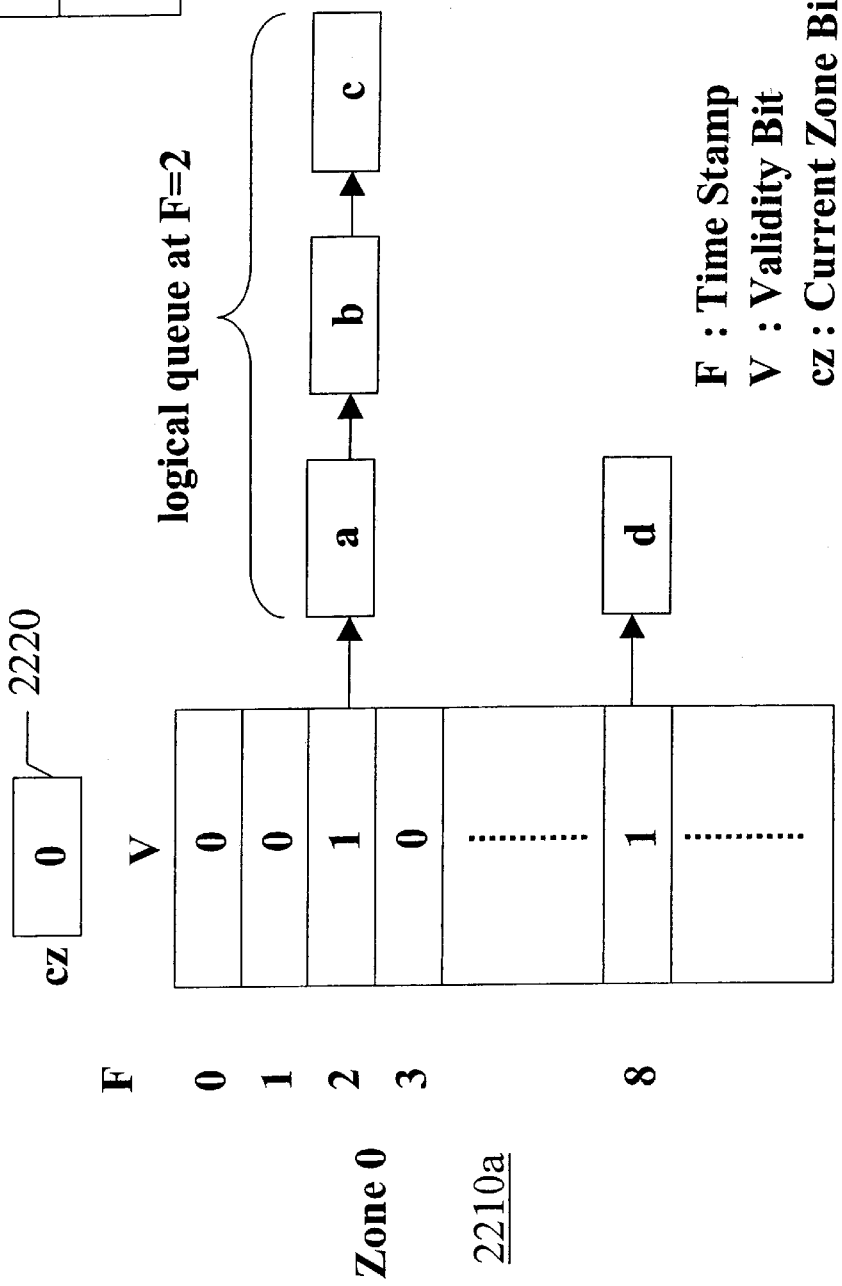
FIG. 22 is a block diagram which illustrates a zoning feature which may be used by the present invention to handle time stamp overflow.
Figure 22B:
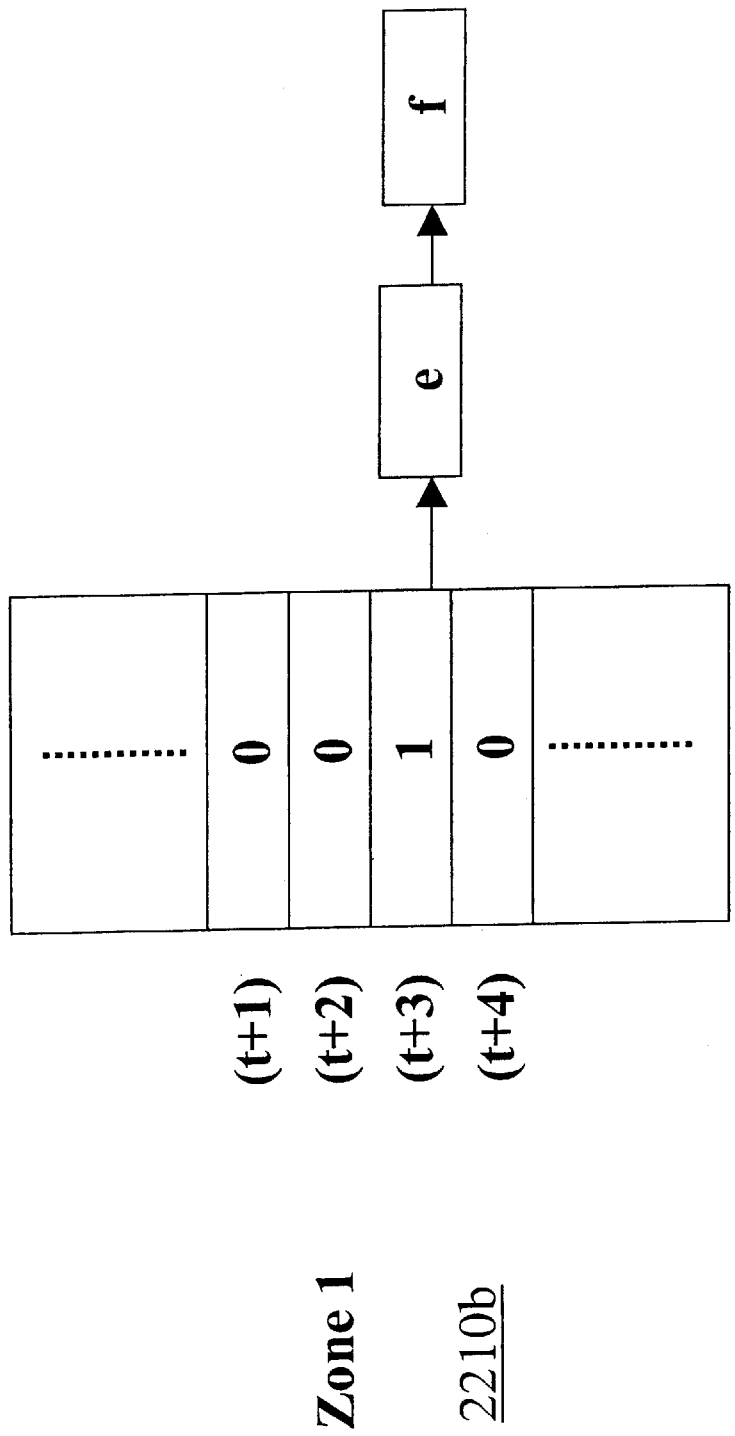

Referring to FIG. 22, to address the problem of time stamp overflow, two (2) memory banks 2210a and 2210b may be used to store the validity bits of the non-overflow (i.e., those less than or equal to (M−1)) and the overflow (i.e., those greater than (M−1)) time stamps, respectively. Each of the memory banks have M−1 time slots which may be addressed with m+1 bits.

A separate "zone indication bit" (Z) indicates the zone (i.e., the memory bank 2210a or 2210b) in which the time stamp of a newly arriving head-of-line packet is to be stored. This bit (Z) is actually the MSB of the time stamp value, and is used to indicate overflow. A "current zone" bit (CZ) 2220 is used to indicate the zone of the packets that are currently being served. If the MSB of a calculated time stamp is the same as the CZ bit 2220, then the time stamp is defined as non-overflow; otherwise, it is defined as overflow. Accordingly, when searching the validity bits, the invention uses the CZ bit 2220 to choose the first validity bit from an appropriate zone. When all of the validity bits in the current zone are zero (0), and there is at least one non-zero validity bit in the other zone, the CZ bit 2220 will be toggled after servicing a packet from the other zone, thereby indicating that the other memory bank is now in service.

The time stamp is non-decreasing within each zone. The system potential, which is constantly updated, is at least equal to the minimum starting potential of the head-of-line packet among all currently queued sessions and is therefore also non-decreasing. Accordingly, the time stamps of new head-of-line packets are stored in either a current zone (as defined by CZ bit 2220), or in the other zone in the event of a time stamp overflow. In this way, the correct sequence of packet transmission is ensured.

In the example depicted in FIG. 22, the CZ bit 2220 (=0) indicates that the zone 0 (or memory 2210a) is the current zone. After packets a, b, c, and d are transmitted (and the validity bits reset to 0), assuming that there are no other packets stored in memory 2210a of zone 0, since there is a validity bit set in zone 1 (at time stamp location (t+3)), the CZ bit is toggled from zero (0) to one (1). From that point, until the CZ bit is again toggled, packets in the memory 2210b of zone 1 will be serviced before those in memory 2210a of zone 0. As long at the MSB of the calculated time stamp does not change more than once when serving the current zone, no packet out-of-sequence problem will occur.

Figure 23:
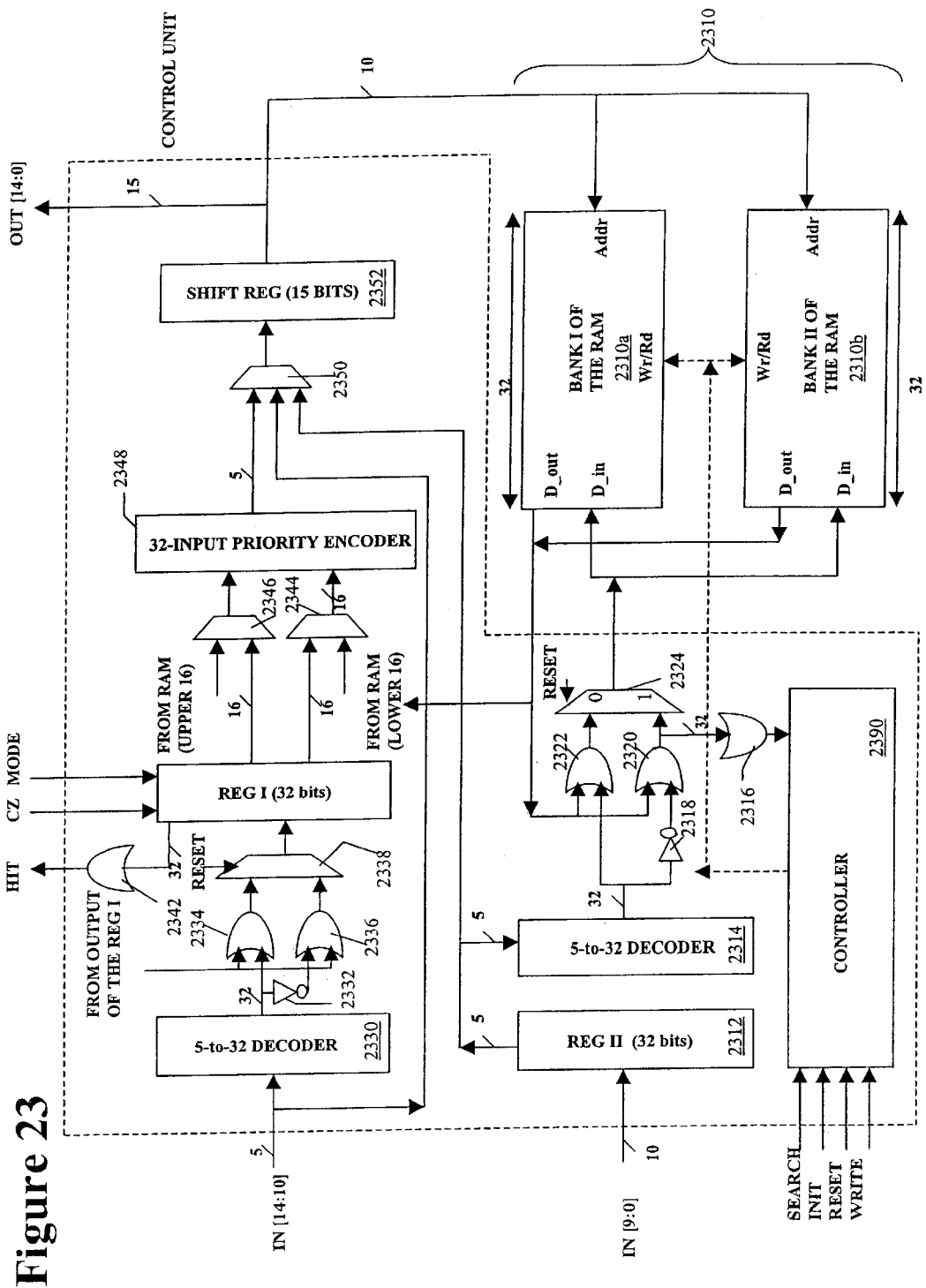
FIG. 23 is a block diagram of an exemplary embodiment of the present invention.

FIG. 23 is a block diagram of a first embodiment 2300 of the present invention. This embodiment can handle M=32,768 time stamps, which may be addressed with a m=15 bit address. This embodiment 2300 includes a controller 2390 which accepts SEARCH, INITialize, RESET, and WRITE signals and provides a WRite/ReaD signal to the memory 2310. The controller 2390 may be an application specific integrated circuit (or "ASIC") or may be a processor for executing instructions and a storage device for storing instructions. The memory 2310 is 32 bits wide and is divided into two banks 2310a and 2310b (for two levels). If the WRITE signal is asserted, the 15 bit input data IN[14:0] are written to the system 2300 to set the validity bit. If the SEARCH signal is asserted, if a validity bit set to "1" is found, the HIT signal is asserted and its corresponding time stamp value appears at the output bus OUT [14:0].

The MODE signal is used to define whether the system 2300 is configures to one 32,768 bit zone, or two 16,384 bit zones (to address time stamp overflow as discussed above). To reiterate, the current zone (CZ) signal is used to indicate the zone of validity bits that is currently being searched. At system initialization, the INIT signal is asserted and all of the data in the registers (e.g., 2340) and memory (e.g., 2310) are set to zero (0). The input/output signals of the system 2300 are:

| Signal Name | Signal Type | Signal Description |
| --- | --- | --- |
| IN[14;0] | IN | Data input (e.g., time stamp) |
| INIT | IN | Initialization |
| WRITE | IN | Write enable |
| SEARCH | IN | Search enable |
| RESET | IN | Reset enable |
| MODE | IN | Mode select |
| CZ | IN | Current zone bit |
| HIT | OUT | Pattern found indication |
| OUT[14:0] | OUT | Data output (e.g., time stamp) |

The five (=$\log_2 32$) most significant bits of the data input signal IN are applied to the 5-to-32 decoder 2330. The 32 bit output of the decoder is applied to one input of (bit-by-bit) OR gate 2334 and, via inverter 2332, to one input of (bit-by-bit) AND gate 2336. The output of register 1 2340 is fed back to the second inputs of the (bit-by-bit) OR gate 2334 and the (bit-by-bit) AND gate 2336. The outputs of the (bit-by-bit) OR gate 2334 and the (bit-by-bit) AND gate 2336 are applied to a multiplexer (or switch) 2338. The 32 bit output of the multiplexer is applied to the 32 bit register 1 2340. The 32 bits of the register 2340 are logically ORed by OR gate 2342 to generate the HIT signal. Under control of the CZ and MODE control inputs, the register 2340 applies 16 bits to a first input of a multiplexer (or switch) 2344 and another 16 bits to a first input of another multiplexer (or switch) 2346. The 16 LSBs from the D__out of the RAM 2310a or 2310b is applied to the other input of the multiplexer (or switch) 2344, while the 16 MSBs from the D__out of the RAM 2310a or 2310b is applied to the other input of the multiplexer (or switch) 2346. The 16 bit outputs of multiplexers (or switches) 2344 and 2346 are applied to a 32-to-5 input priority encoder 2348. Five bits from the encoder 2348, five (=$\log_2 32$) bits IN[14:10] from the input signal, and five (=($\log_2 1024$)-5) bits from the ten (10) bit register 2312 are applied to inputs of a multiplexer (or switch) 2350, the output of which is applied to a 15 bit shift register 2352. The multiplexer 2350 outputs five (5) bits at a time. Its output is written to different five (5) bit portions of the register 2352 at different times under the control of the controller 2390. The output of the shift register 2352 defines the output signal OUT[14:0], and the 5(=$\log_2 32$) or 10 (=$\log_2 1024$) LSBs are used to address the banks 2310a and 2310b, respectively, of the RAM 2310.

The 10 LSBs of the input IN[9:0] are applied to the 10 bit register 2312. Each of five (5) bits of the register 2312 are applied to a 5-to-32 decoder 2314 at a time (depending on the level of the hierarchy being processed and under the control of the controller 2390). The 32 bit output of the decoder 2314 is applied to one input of (bit-by-bit) OR 2322 and, via an inverter 2318, to one input of (bit-by-bit) AND gate 2316. The 32 bit data output D__out of the RAM 2310 is applied to the second inputs of the (bit-by-bit) OR gate 2322 and the (bit-by-bit) AND gate 2320. The 32 bit output of the (bit-by-bit) AND gate is logically ORed (all bits), with OR gate 2316 and applied to the controller 2390. This OR result is used to determine whether the RESET process needs to consider higher levels of bits in the hierarchy. (Recall, step 2050 of FIG. 20.) The outputs of the (bit-by-bit) OR 2322 and (bit-by-bit) AND 2320 gates are applied to a multiplexer (or switch) 2324. The 32 bit output of the multiplexer (or switch) 2324 is applied to the data input pins D__in of the banks 2310a and 2310b of the RAM 2310.

Naturally, a larger time stamp value could be supported by increasing the group size (or the number of hierarchical levels) which, in turn, could increase the width of the registers 2312 and 2340 and/or the size of the memory banks 2310a and 2310b.

Having described the architecture of the system 2300 of the first embodiment of the present invention, WRITE, RESET, and SEARCH operations are now described in §4.2.3 below.

§4.2.3 Operating Example of Exemplary Ram-Based Scheduler

In the following description, it is assumed that the system 2300 of FIG. 23 is configured to accommodate up to M=32,768 time stamp values. The group ($g_l$) size at all levels is set to 32 bits. Thus, the number of total hierarchical levels is three (3) (=$\log_g M$ or $\log_{32} 32{,}768$). The validity-based bits of the highest hierarchical level (l=0) are stored in register 2340, while those of the lower levels (l=1 and 2) are stored in the two banks of the RAM 2310, bank I (32 (=1024/32) by 32 bits) and bank II (1024 (=32,768/32) by 32 bits), respectively. The WRITE operation is described in §4.2.3.1, the SEARCH operation is described in §4.2.3.2, and the RESET operation is described in §4.2.3.3 below.

§4.2.3.1 Write

Recall from step 1740 and 1760 of FIG. 17, that when there is a new HOL packet in a flow queue, based on the time stamp of that new packet, the validity bit at the address defined by the time stamp, and bits at higher levels in the hierarchy which are determined, in part, by this validity bit, may have to be updated. Naturally, if the validity bit is already "1", the WRITE operation will not change any bits at an level of the hierarchy. Recall that the bits (at highest level l=0) are stored in register 2340, while the bits at the lower hierarchical level (l=1) and the validity bits at the lowest hierarchical level (l=2) are stored in the RAM bank I 2310a and RAM bank II 2310b, respectively.

The WRITE operation discussed here occurs in two phases. In the first phase, the bits at levels l=0 and 1 are set. Note that these bits can be set at the same time since they are stored in different places (i.e., different RAMS 2310a and 2310b). In the second phase, the validity bits (at level l=2) are set.

Figure 24A:
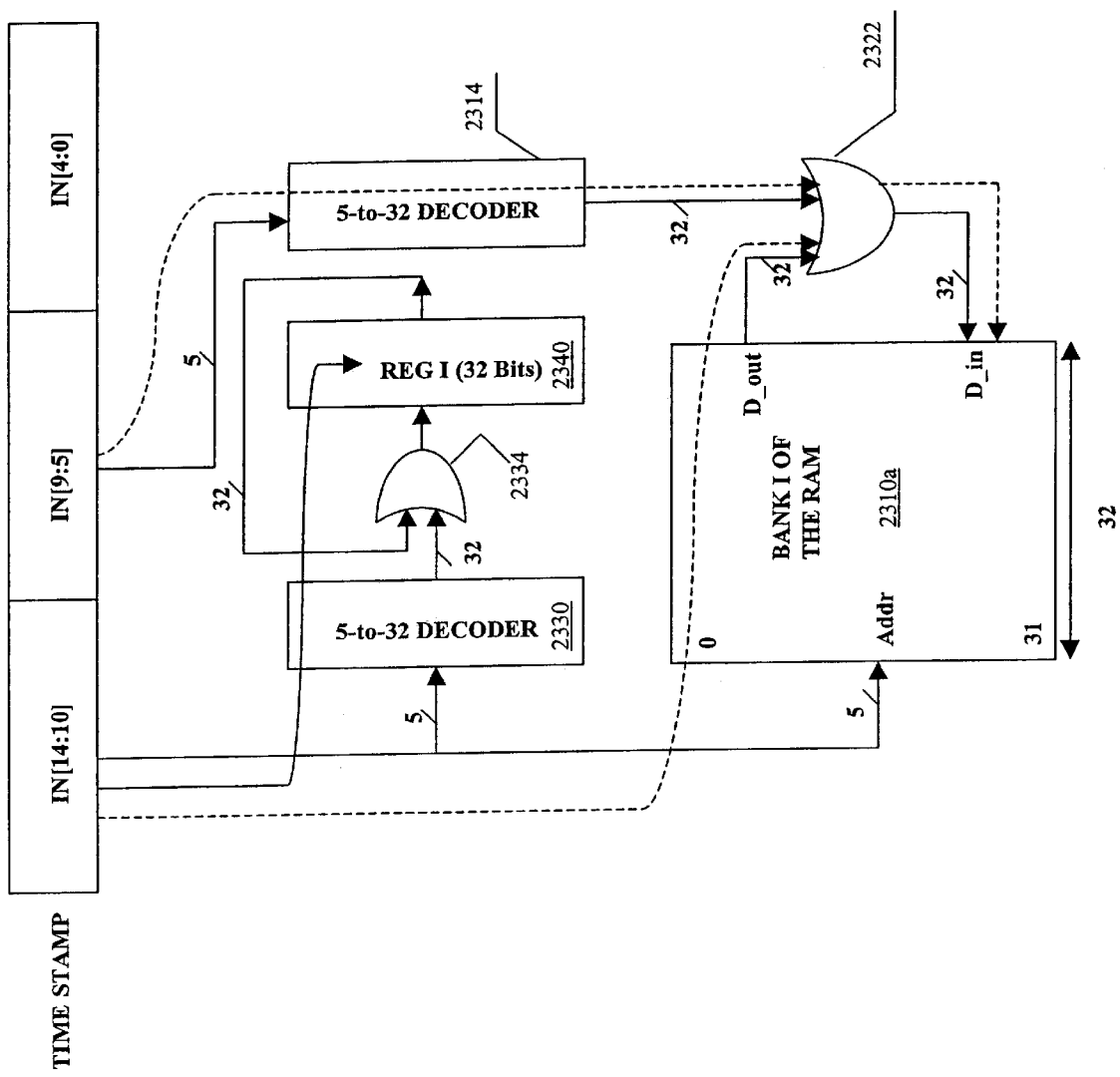
FIGS. 24A and 24B illustrate a write operation in the exemplary embodiment of the present invention shown in FIG. 23.

FIG. 24A illustrates the first phase of the WRITE operation in the first embodiment of system 2300. The solid line depicts a data path for setting the validity-based bits (at level l=0). The first five bits of the binary coded time stamp IN[14:10] are extracted and decoded at decoder 2330 to generate a 32 bit string. (Recall step 1915 of FIG. 19.) The 32 bit string is then logically ORed (bit-by-bit), at OR gate 2334, with the previously stored validity-based bits. The result is stored in the 32 bit register 2340. (Recall step 1920 of FIG. 19.) The dashed line depicts a data path for setting the bit at the next, lower, hierarchical level (i.e., at level l=1). The first five bits of the binary coded time stamp IN[14:10] are used as an address to read the old bit string from RAM bank I 2310a. (Recall steps 1910 and 1920 of FIG. 19.) At the same time, the middle five bits of the binary coded time stamp input IN[9:5] are provided to the decoder 2314. (Recall steps 1925 and 1930 of FIG. 19.) The 32 bit outputs of the RAM bank I 2310a and the decoder 2314 are logically ORed, bit-by-bit, using OR gate 2322. The result is written back to the RAM bank I 2310a at the same address (i.e., as defined by IN[14:10]). (Recall step 1935 of FIG. 19.) Thus, a read access and a write access to the RAM bank I 2310a are needed.

Figure 24B:
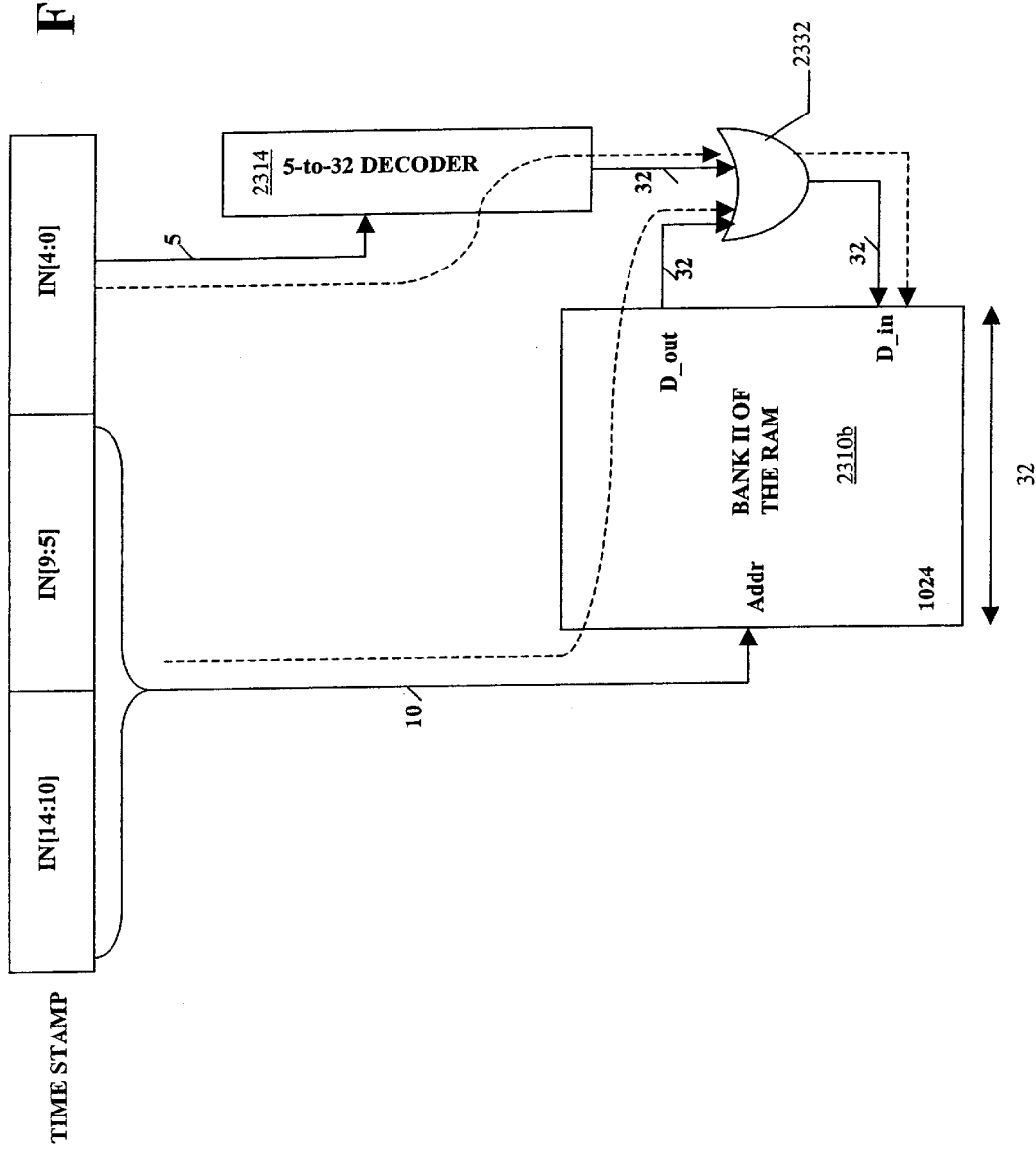

FIG. 24B illustrates the second phase of the WRITE operation, in which the validity bits at the lowest hierarchical level (l=2) are written. As shown by the dashed line, the 10 MSBs of the binary coded time stamp input IN[14:5] are extracted and used to address the validity bit information stored in RAM bank II 2310b. (Recall steps 1950 and 1955 of FIG. 19.) At the same time, the five LSBs of the binary coded time stamp input IN[4:0] are provided to the decoder 2314. (Recall steps 1960 and 1965 of FIG. 19.) The 32 bit outputs of the RAM bank II 2310b and the decoder 2314 are logically ORed, bit-by-bit, using OR gate 2322. The result is written back to the RAM bank II 2310b at the same address (i.e., as defined by IN[14:5]). (Recall step 1970 of FIG. 19.) Thus, a read access and a write access to the RAM bank I 2310a are needed.

The WRITE operation can be collapsed into one phase if an extra decoder is added for decoding the five LBSs IN[4:0] of the binary coded time stamp input and if an extra OR gate, for logically ORing, bit by bit, the 32 bit output of the RAM bank II 2310b and the 32 bit output of the extra decoder.

§4.2.3.2 Search

Recall from FIG. 18 that the search operation of the present invention includes a step (1820) of encoding bits of a register, and then repeated steps of reading (1850) memory based on a bit string, encoding (1860) the data read to form a bit string, and concatenating (1870) the bit strings. Recall that the bits (at highest level l=0) are stored in register 2340, while the bits at the lower hierarchical level (l=1) and the validity bits at the lowest hierarchical level (l=2) are stored in the RAM bank I 2310a and RAM bank II 2310b, respectively.

If there are any head-of-line packets in any of the flow queues, there will be at least one bit set to one in the register storing the highest level (l=0) of the hierarchy. Thus, referring to FIG. 23, if there are any head-of-line packets in any of the flow queues, the HIT signal from the OR gate 2342 will be asserted ("1"). If so, the output signal OUT[14:0] will be valid.

Figure 25:
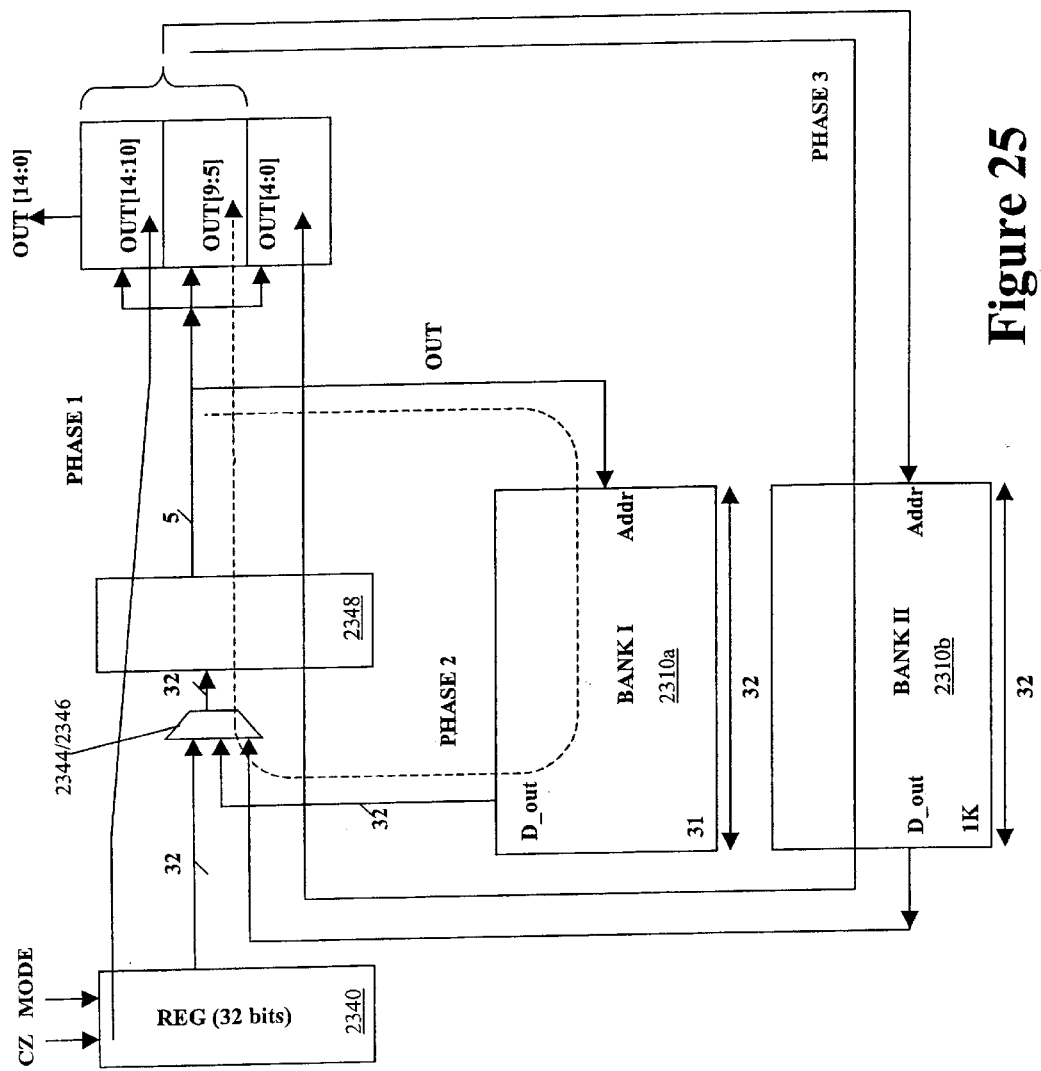
FIG. 25 illustrates a search operation in the exemplary embodiment of the present invention shown in FIG. 23.

In the exemplary system 2300 of the first embodiment of the present invention, the search operation has three phases, each of which is described below with reference to FIG. 25.

In the first phase of the search operation, depicted as a solid line, the 32 bit data (i.e., the highest level bit string from level l=0) from the register 2340 is provided to 32-to-5 encoder 2348. The output of the encoder 2348 is stored as the five MSB of output register OUT[14:10]. (Recall steps 1810 and 1820 of FIG. 18.)

In the second phase of the search operation, depicted as a dashed line, the five MSBs of the output signal OUT[14:10] are used to address RAM bank I 2310a. (Recall first iteration of step 1850 of FIG. 18.) The 32 bit word read out from the RAM bank I 2310a is provided to the 32-to-5 encoder 2348. (Recall first iteration of step 1860 of FIG. 18.) The output of the encoder 2348 is concatenated to the 5 MSBs of the output signal OUT[14:10] as five adjacent bits OUT[9:5]. (Recall first iteration of step 1870 of FIG. 18.)

In the third phase of the search operation, depicted as a solid line, the ten MSBs of the output signal OUT[14:5] is used to address RAM bank II 2310b. (Recall second iteration of step 1850 of FIG. 18.) The 32 bit word read out from the RAM bank II 2310b is provided to the 32-to-5 encoder 2348. (Recall second iteration of step 1860 of FIG. 18.) The output of the encoder 2348 is concatenated to the 10 MSBs of the output signal OUT[14:5] as five adjacent bits OUT[4:0]. Recall second iteration of step 1870 of FIG. 18.)

At this point, since the lowest hierarchical level (l=2) has been addressed, the 15 bit address defined by OUT[14:0], which defines the minimum time stamp, is used to address a memory storing flow queue identifier(s) corresponding to the lowest time stamp.

§4.2.3.3 Reset

Recall from steps 1720 and 1730 of FIG. 17, that when a packet is serviced, assuming that there are no linked packets having the same time stamp, the validity bit must be reset (to "0"). This may necessitate the resetting of bits in groups at higher hierarchical levels. Recall that the validity-based bits (at highest level l=0) are stored in register 2340, while the validity-based bits at the lower hierarchical level (l=1) and the validity bits at the lowest hierarchical level (l=2) are stored in the RAM bank I 2310a and RAM bank II 2310b, respectively.

The RESET operation described here occurs in three (3) phases. In the first phase, the validity bit (at the lowest hierarchical level, l=2) is reset. In the second phase, the validity-based bit in a group at the next higher level is reset (if necessary). Finally, in the third phase, the bit in the group at the highest level (l=0) is reset (if necessary).

Figure 26A:
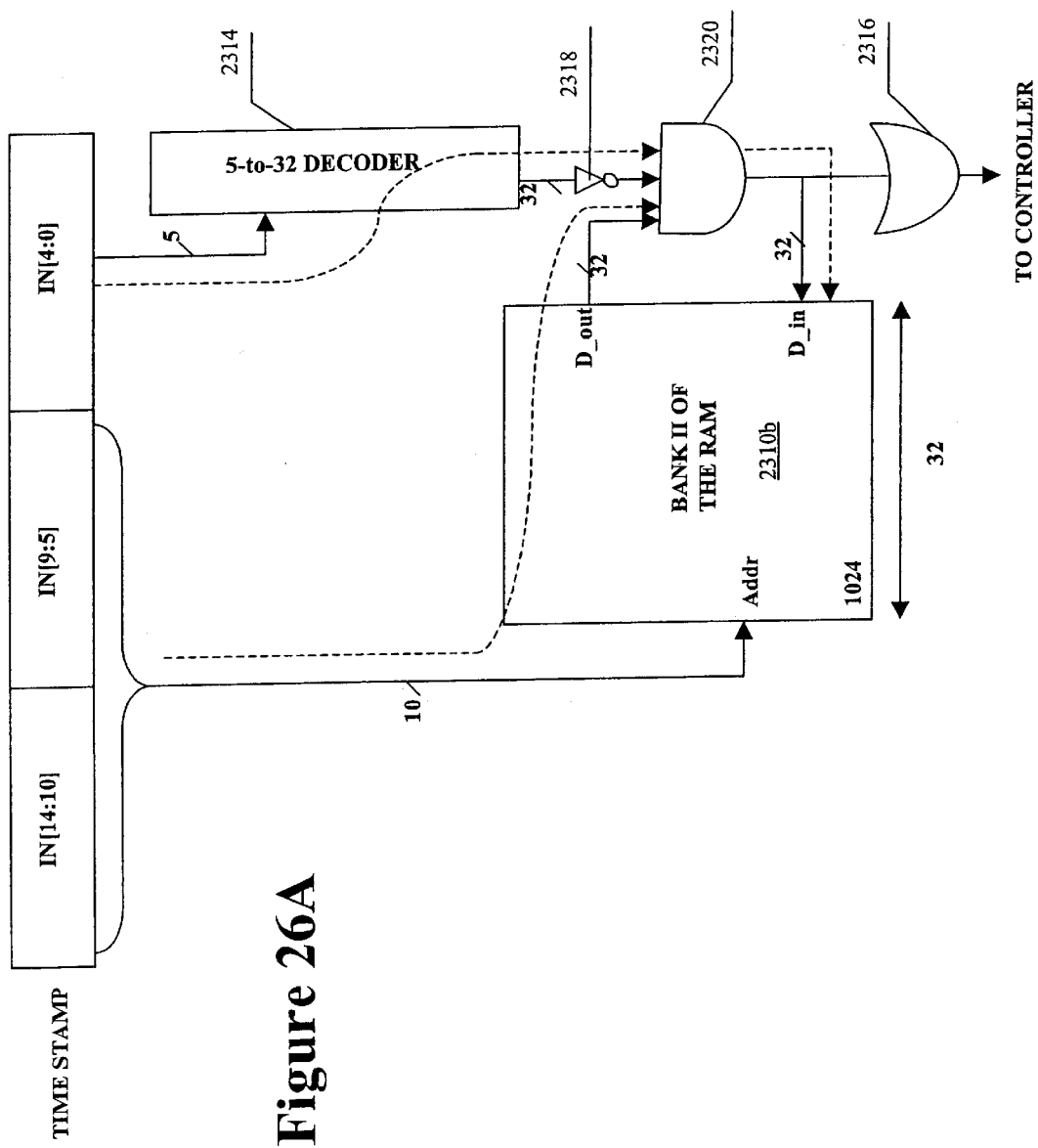
FIGS. 26A through 26C illustrate a reset operation in the exemplary embodiment of the present invention shown in FIG. 23.

FIG. 26A illustrates the first phase of the RESET operation in the first embodiment of system 2300. The dashed line depicts a path from the 10 MSBs of the binary coded time stamp IN[14:5] which are used to address the validity bit information from RAM bank II 2310 during a read operation. (Recall steps 2010 and 2015 of FIG. 20.) At the same time, the 5 LSBs of the binary coded time stamp IN[4:0] are provided to 5-to-32 decoder 2314 which generates a 32 bit string. (Recall steps 2020 and 2025 of FIG. 20.) That string is inverted by inverter 2318. (Recall step 2030 of FIG. 20.) The read 32 bit string from the RAM bank II 2310b and the inverted 32 bit string from the inverter 2318 are logically ANDed, bit by bit, using AND gate 2320. (Recall step 2035 of FIG. 20.) The output of the AND gate 2320 is then written to the RAM bank II 2310b at the same address. (Recall step 2040 of FIG. 20.) Hence the contents of the RAM bank II 2310b are replaced using a read and write access.

Figure 26B:
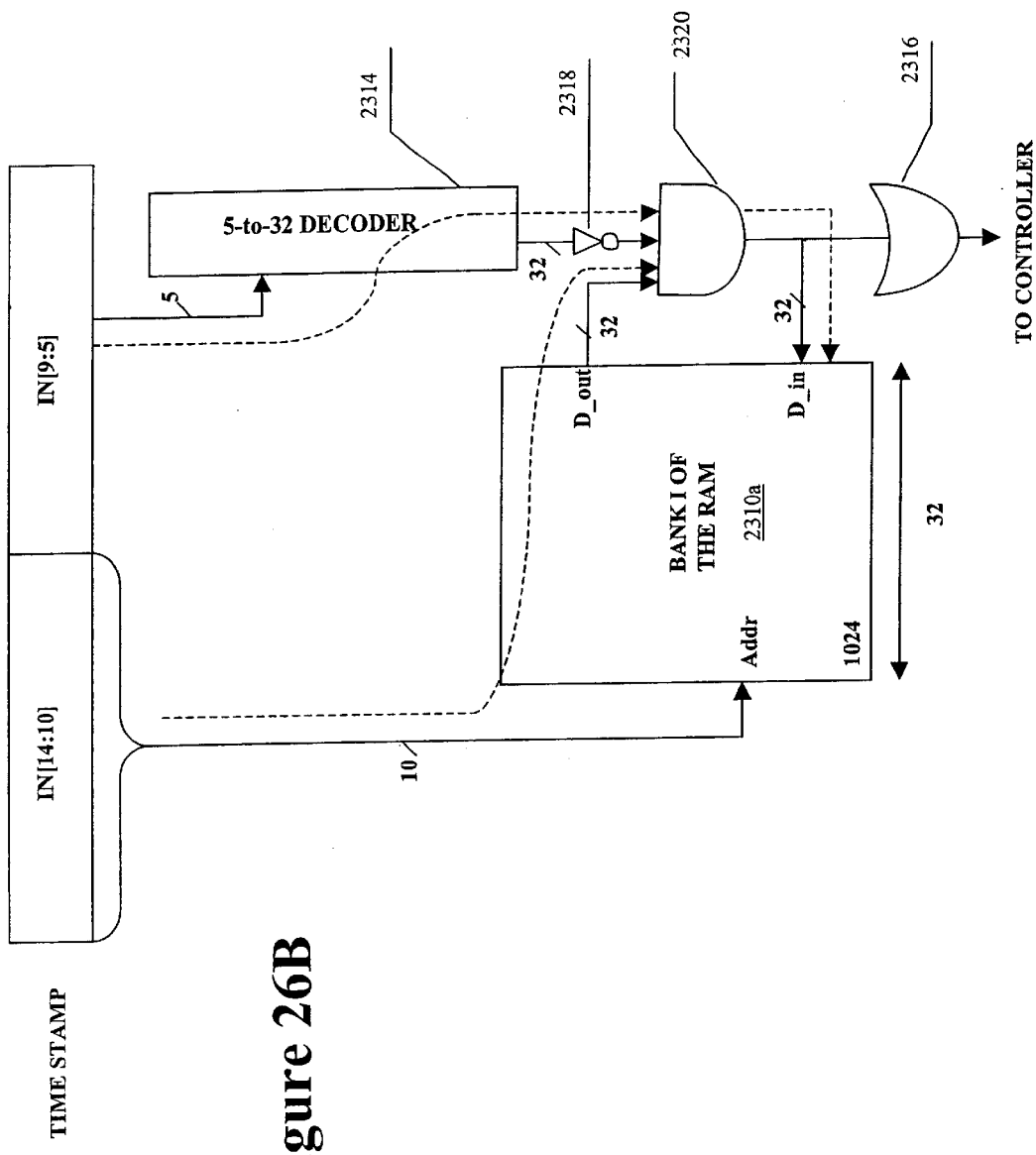

Further in the first phase, the new 32 validity bits are logically ORed by OR gate 2316 and the result is provided to the controller 2390. (Recall step 2045 of FIG. 20.) If the result is zero, meaning all validity bits are zero, then processing proceeds to the second phase of the reset operation. (Recall steps 2050 and 2055 of FIG. 20.) If, on the other hand, the result is one, this indicates that at least one other validity bit, from the group to which the reset validity bit belongs, is also one and that the reset operation will not "ripple" up and cause changes at bits at higher levels in the hierarchy. (Recall steps 2050 and 2090 of FIG. 20.) FIG. 26B illustrates the second phase of the RESET operation in the first embodiment of system 2300. The dashed line depicts a path from the 5 MSBs of the binary coded time stamp which are used to address the relevant group of bits in RAM bank I 2310a. (Recall second iteration of steps 2010 and 2015 of FIG. 20.) This group of bits is read out and applied to the (bit-by-bit) AND gate 2320. At the same time, 5 bits IN[9:5] of the binary coded time stamp are provided to the 5-to-32 decoder 2314. The 32 bit output of the decoder 2314 is inverted by the inverter 2318 and applied to the (bit-by-bit) AND gate 2320. (Recall second iteration of steps 2020, 2025, and 2030 of FIG. 20.) The read 32 bit string from the RAM bank I 2310a and the inverted 32 bit string from the inverter 2318 are logically ANDed, bit by bit, using AND gate 2320. (Recall second iteration of step 2035 of FIG. 20.) The output of the AND gate 2320 is then written to the RAM bank I 2310a at the same address. (Recall second iteration of step 2040 of FIG. 20.) Hence the contents of the RAM bank I 2310a are replaced using a read and write access.

Figure 26C:
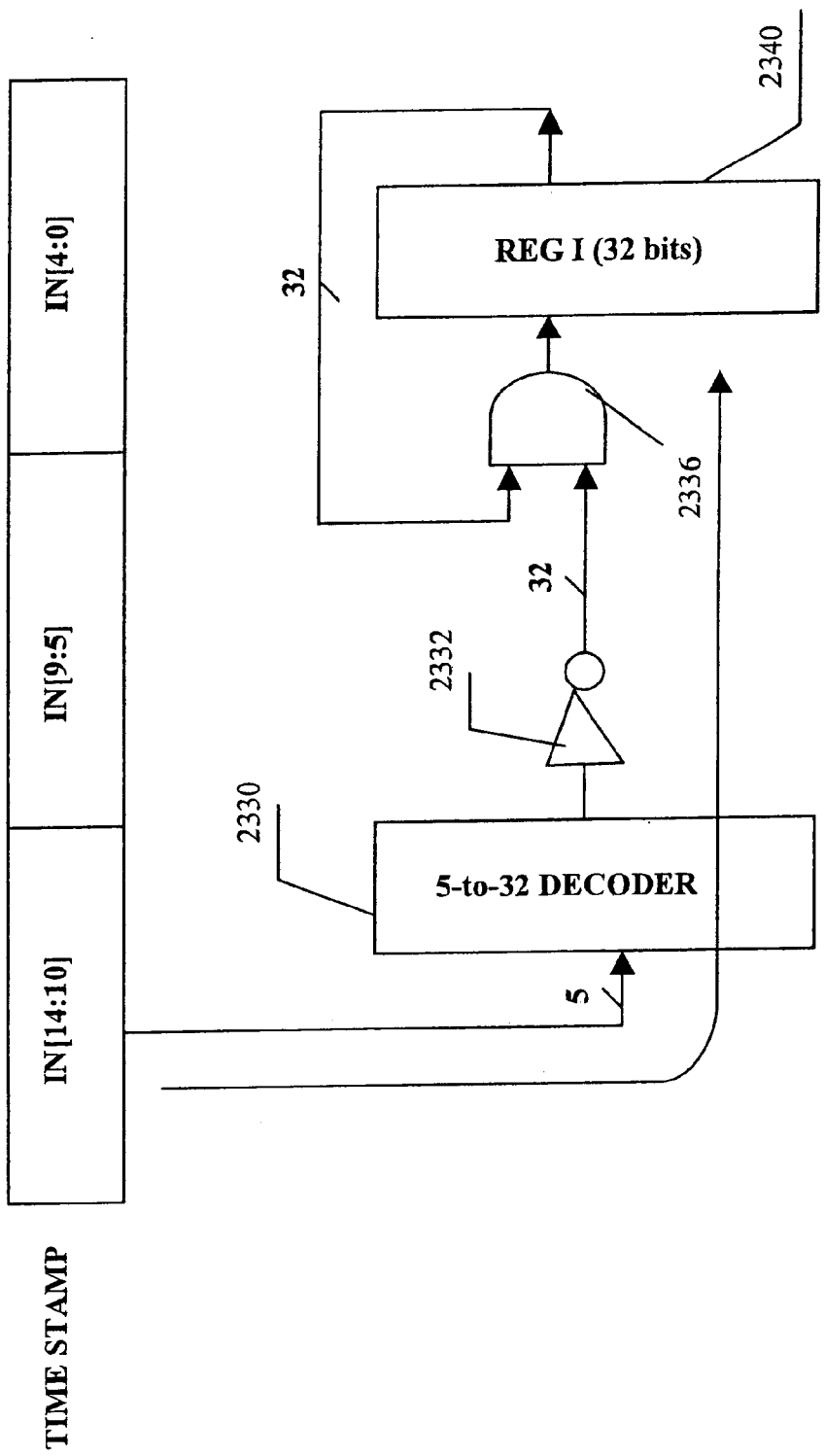

Further in the second phase, the new (level l=1) group of 32 bits are logically ORed by OR gate 2316 and the result is provided to the controller 2390. (Recall step 2045 of FIG. 20.) If the result is zero, meaning all bits of the group are zero, then processing proceeds to the third phase of the reset operation. If, on the other hand, the result is one, this indicates that at least one other bit in the group to which the reset bit belongs, is also one and that the reset operation will not "ripple" up and cause changes at bits at the highest (or higher) level(s) in the hierarchy. (Recall decision step 2050 of FIG. 20.) FIG. 26C illustrates the third phase of the RESET operation in the first embodiment of system 2300. The dashed line depicts a path from the 5 MSBs of the binary coded time stamp which are provided to the 5-to-32 bit decoder 2330. (Recall steps 2065 and 2070 of FIG. 20.) The output of the decoder 2330 is inverted using inverter 2332. (Recall step 2075 of FIG. 20.) The output of the inverter is logically ANDed, bit-by-bit, with the previous contents of the 32 bit register 2340, and the result replaces the previous contents of the 32 bit register. (Recall steps 2080 and 2085 of FIG. 20.)

4.3 Ram-Based Shaper-Scheduler

Figure 1:
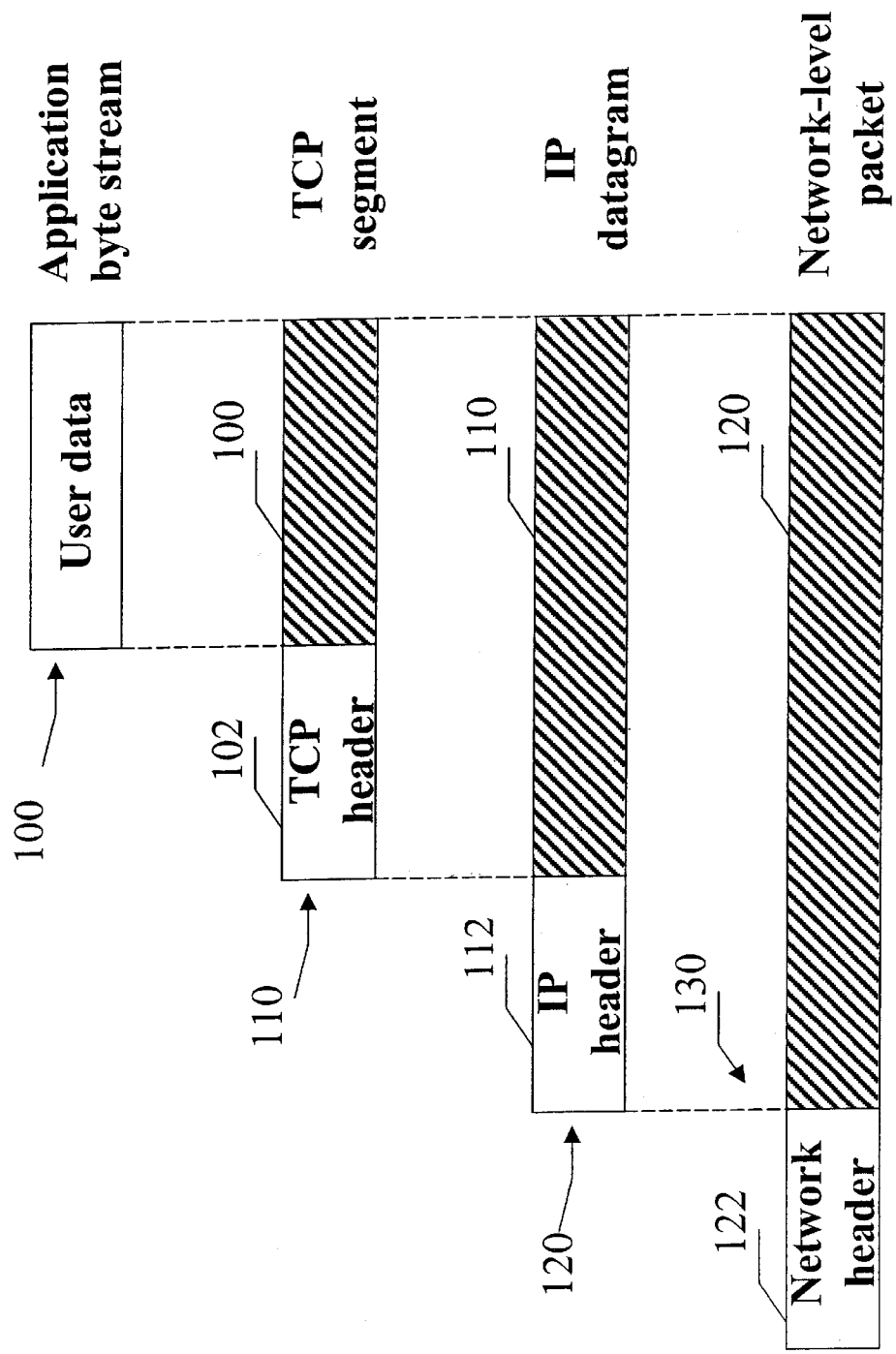
FIG. 1 illustrates the encapsulation of data in accordance with the TCP/IP protocol.
Figure 2:
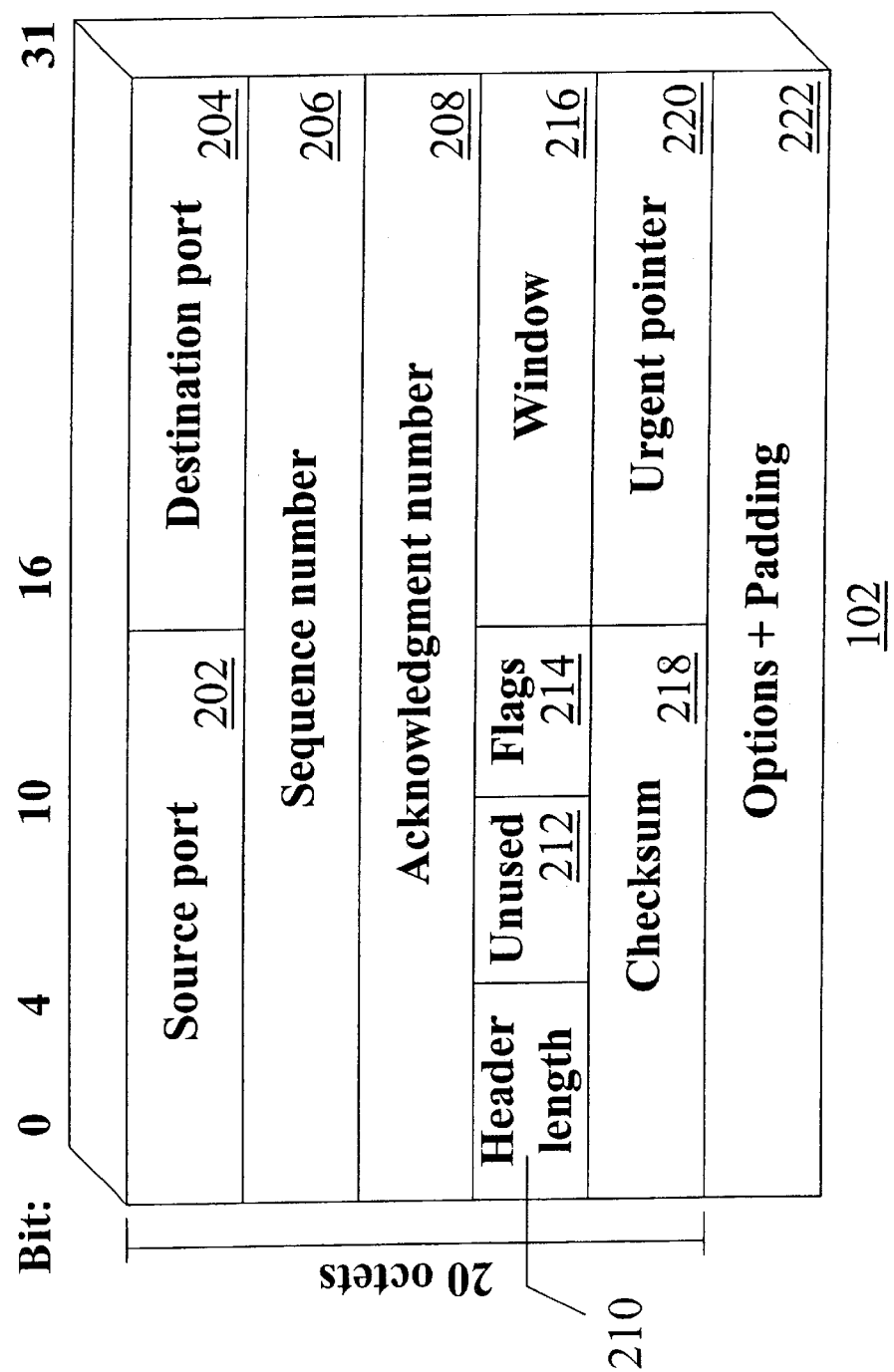
FIG. 2 is header data used in the TCP protocol.
Figure 3A:
FIGS. 3A and 3B are header data used in versions 4 and 6, respectively, of the internet protocol.
Figure 3B:
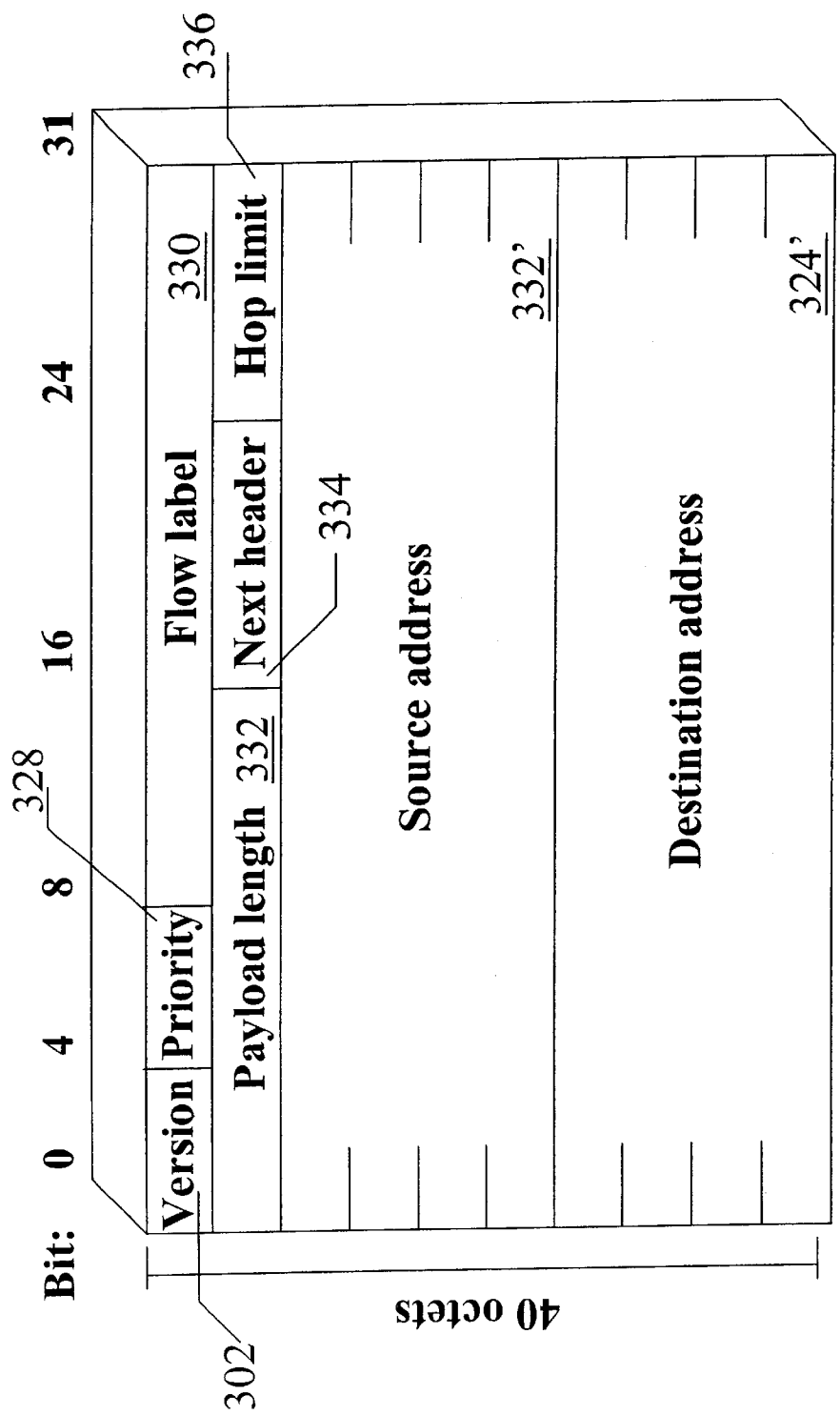
Figure 4A:
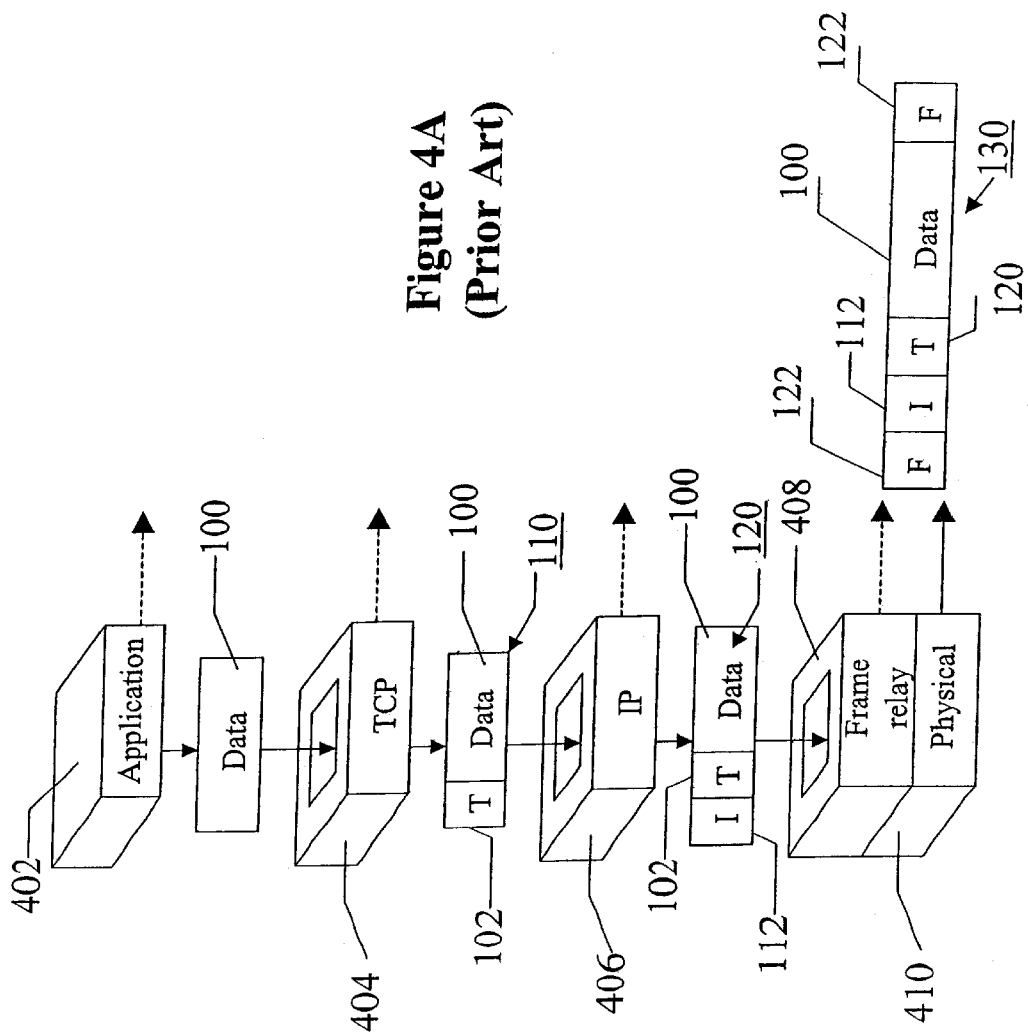
FIGS. 4A through 4C illustrate the processing of user data by various layers in the TCP/IP protocol stack, as the data is transmitted from a source application to a destination application, via a router.
Figure 4B:
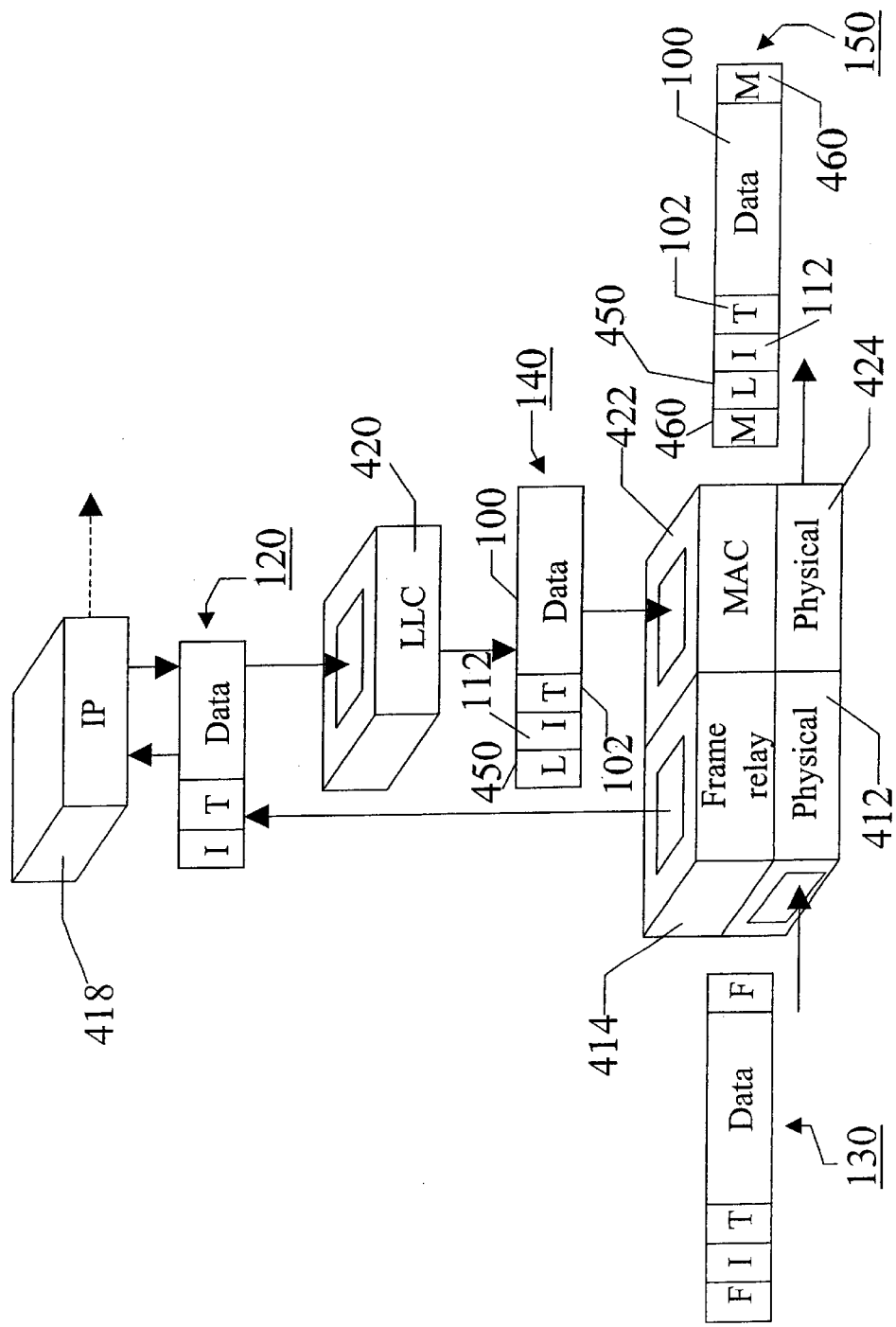
Figure 4C:
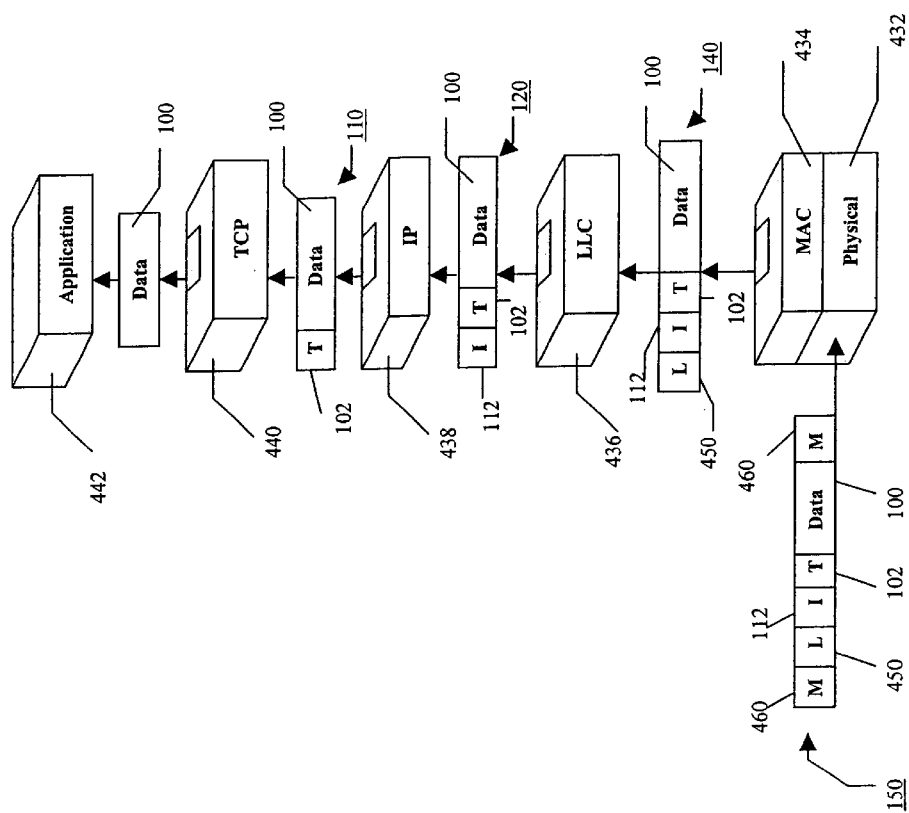
Figure 5:
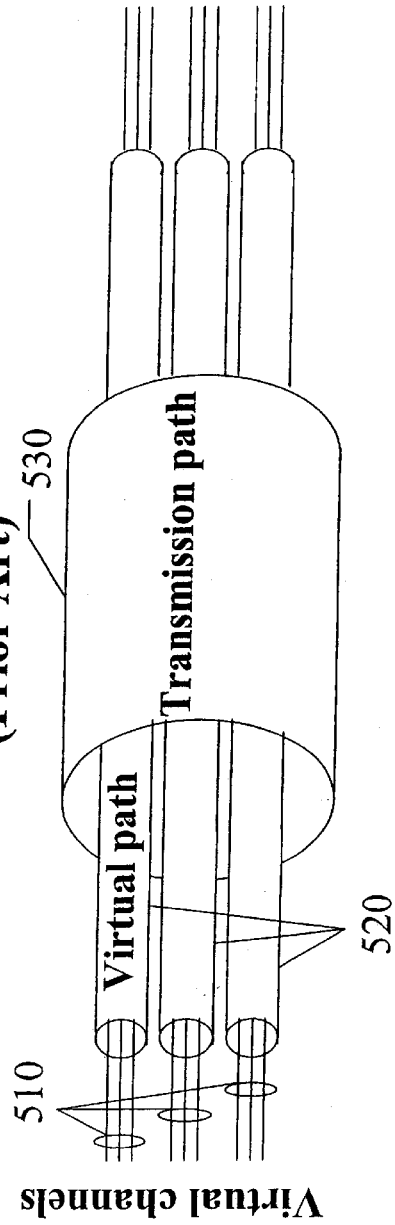
FIG. 5 illustrates the concept of virtual channels and virtual paths in ATM networks.
Figure 6:
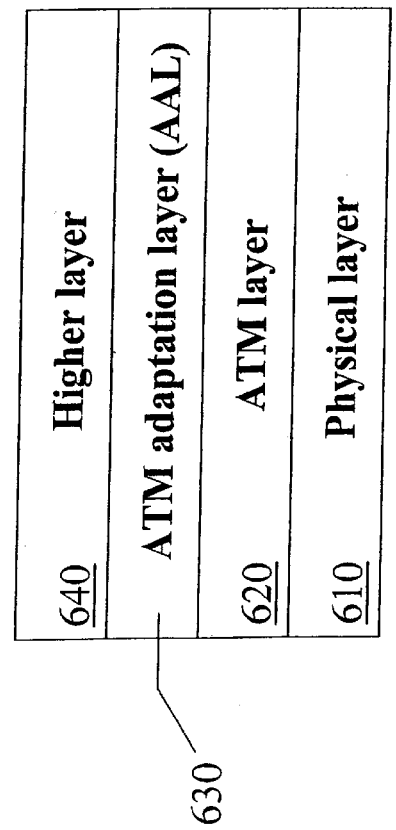
FIG. 6 illustrates the ATM protocol stack.
Figures 7A, 7B:
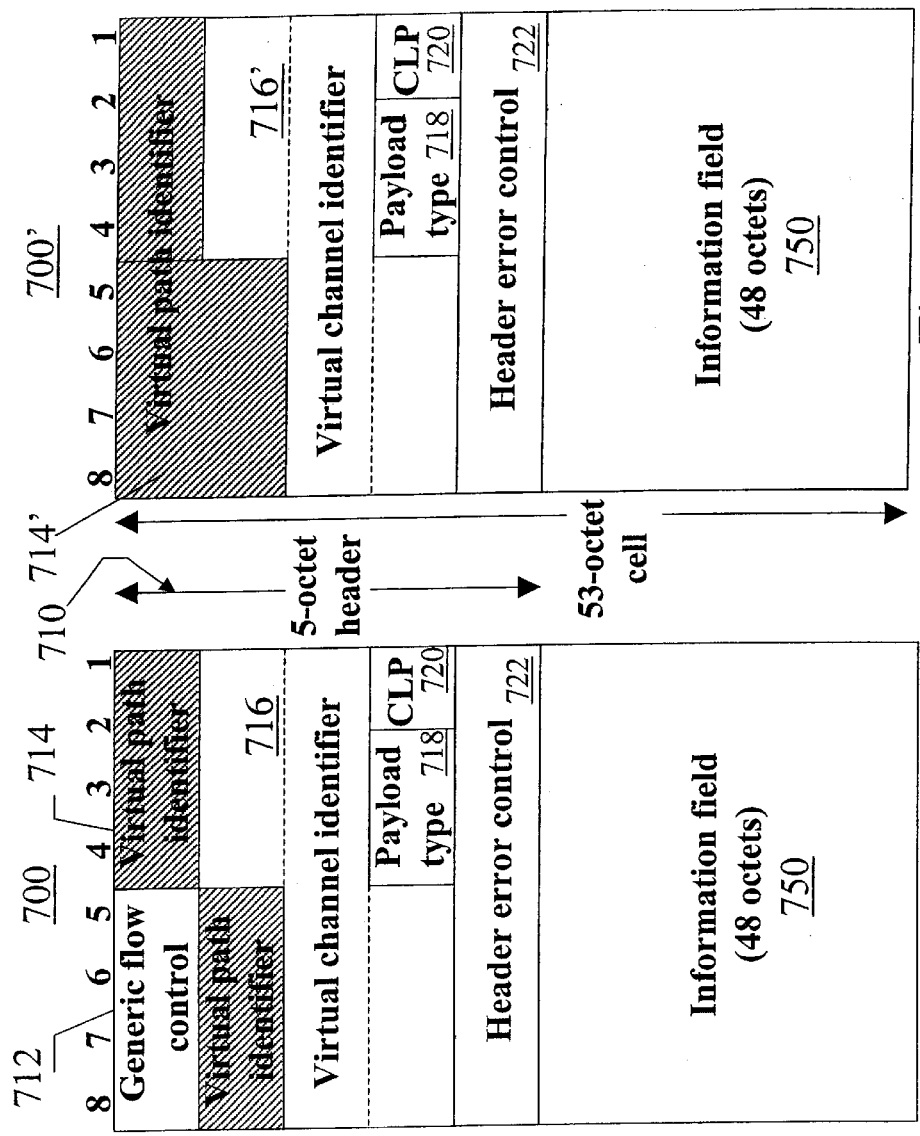
FIGS. 7A and 7B illustrate the structure of ATM cells at a user-network interface and within an ATM network, respectively.
Figure 8:
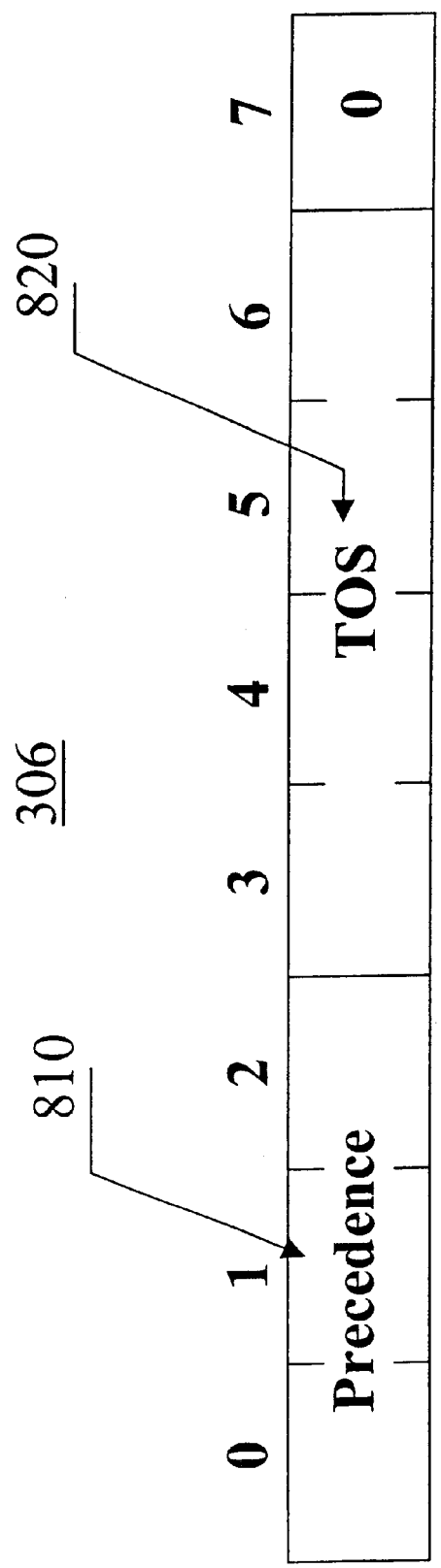
FIG. 8 illustrates sub-fields of a type of service field found in version 4 of the internet protocol header.
Figure 9:
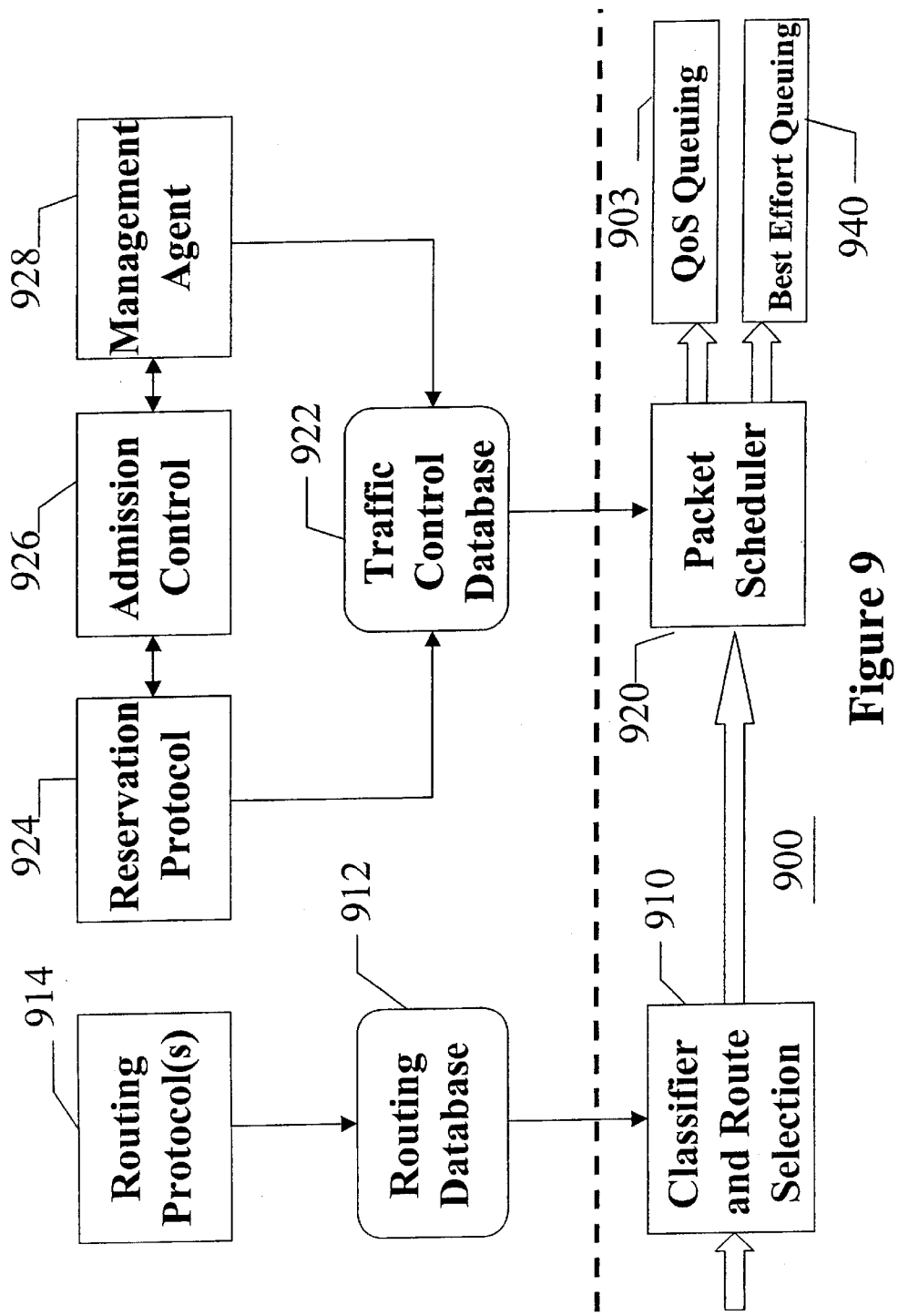
FIG. 9 is a block diagram of an integrated services architecture proposed to facilitate quality of service requirements in a TCP/IP based internet.
Figure 10:
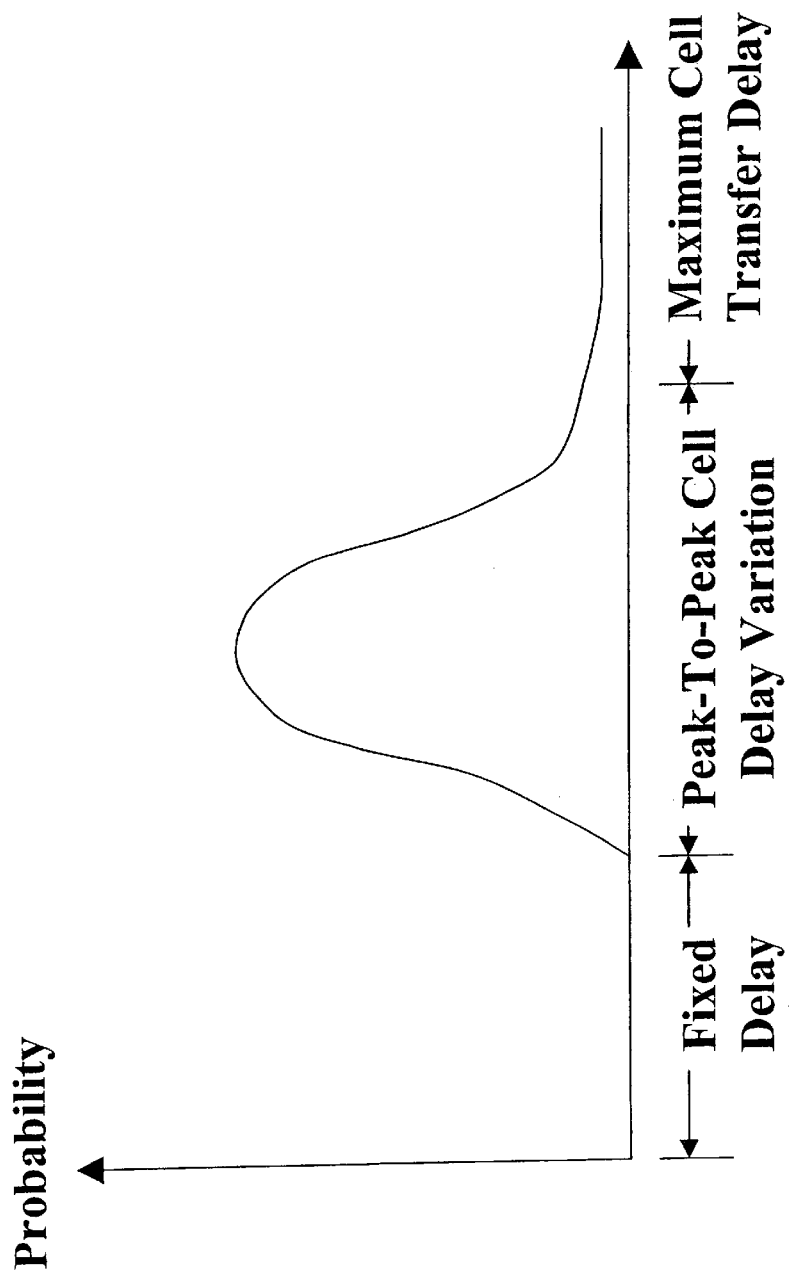
FIG. 10 is a graph of probability versus cell transfer delay which illustrates ATM quality of service parameters.
Figure 11:
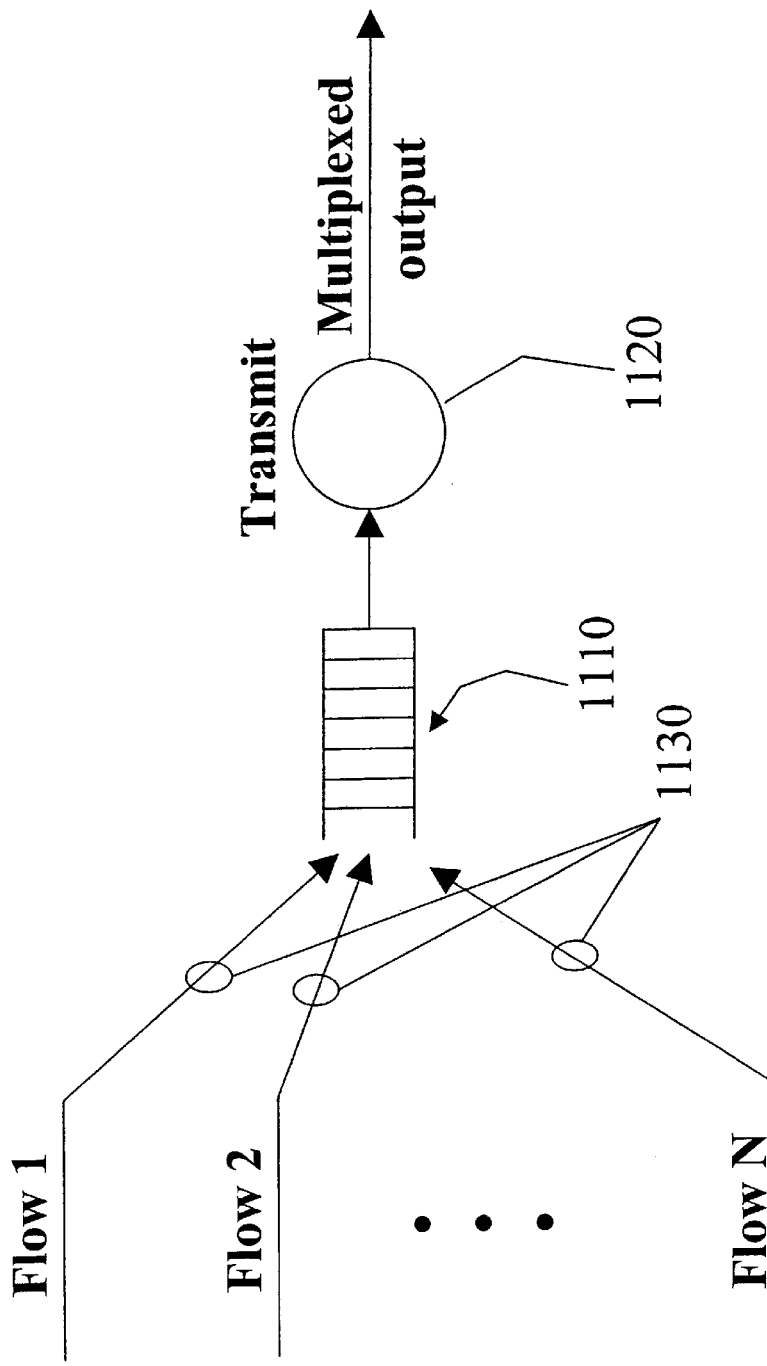
FIG. 11 is a block diagram which illustrates FIFO queuing at an output port of a router or switch.
Figure 12:
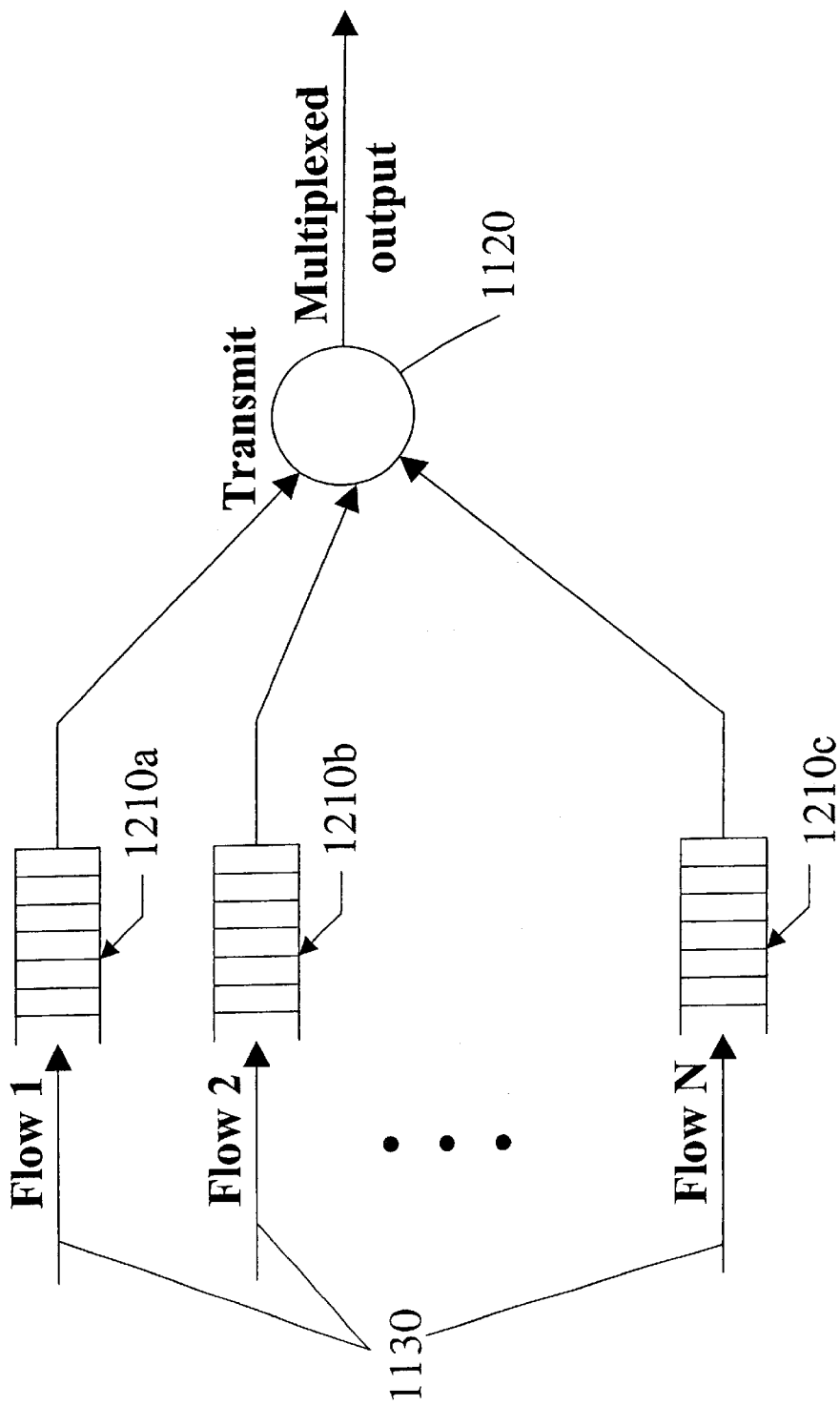
FIG. 12 is a block diagram which illustrates separately queuing various flows at an output port of a router or switch.
Figure 13:
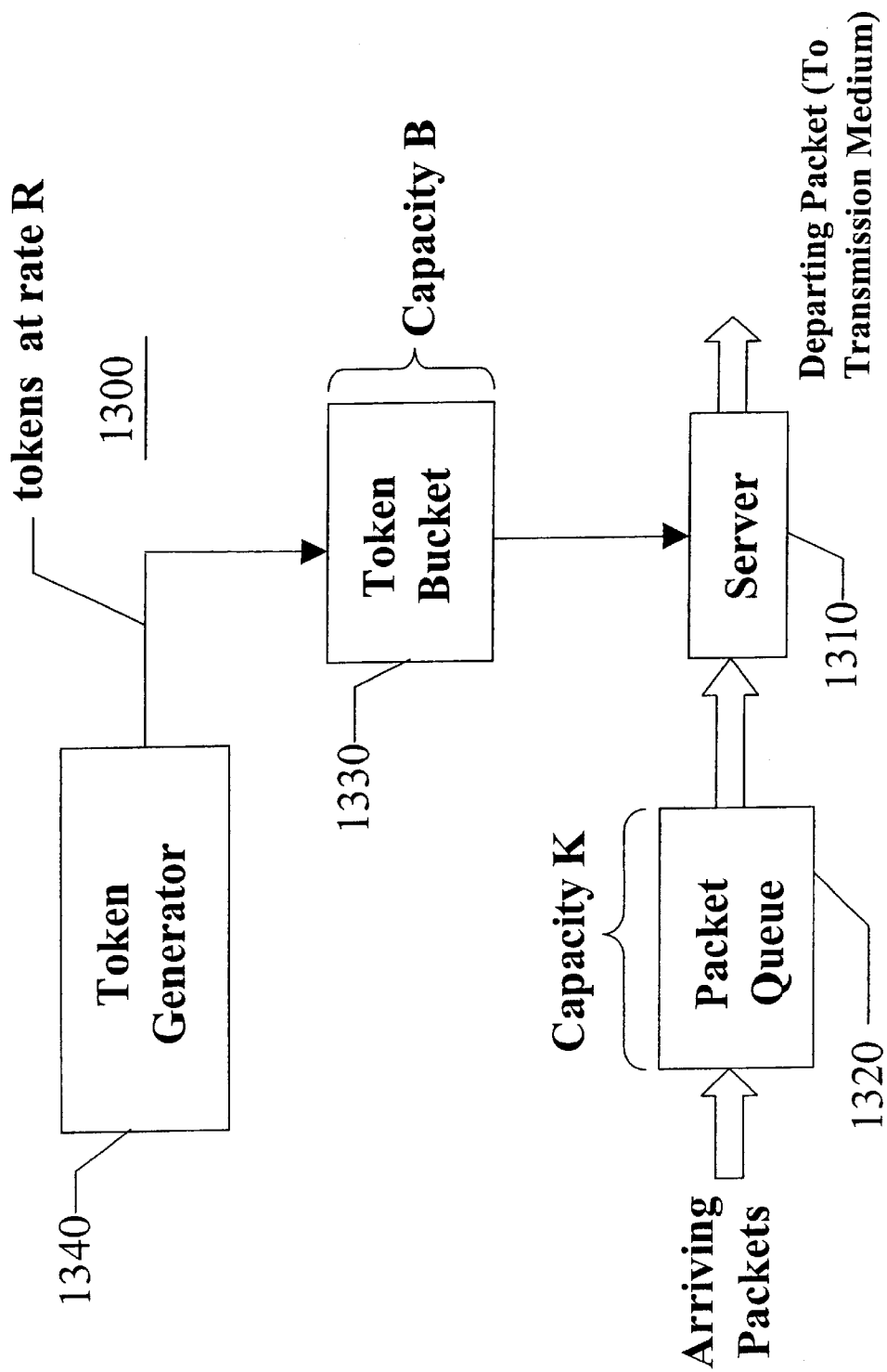
FIG. 13 is a block diagram which illustrates a shaper which employs a token bucket algorithm.

Referring back to FIG. 11, recall that a server 1120 associated with a transmission medium may service a number of queued 1210 flows 1130. In the foregoing example, the server 1120 (or a separate scheduler) performed a scheduling function. Recall from §1.2.2.3.2.5 above that a worst-case fairness index (or "WFI") has been introduced to measure how closely a packet-by-packet scheduler emulates the generalized processor sharing method. Recall also that shaper-schedulers have been proposed to minimize WFI. In the shaper-schedulers, all arriving packets are first linked in a shaper queue based on their starting potentials. Only packets whose stating potentials are less than or equal to a system potential are deemed "eligible" to join the scheduler. That is, a packet is eligible if:

$$S_i^k \leq v(t) \quad (12)$$

In the schedulers, packets are transmitted as usual, by increasing order of their time stamps.

Figure 27:
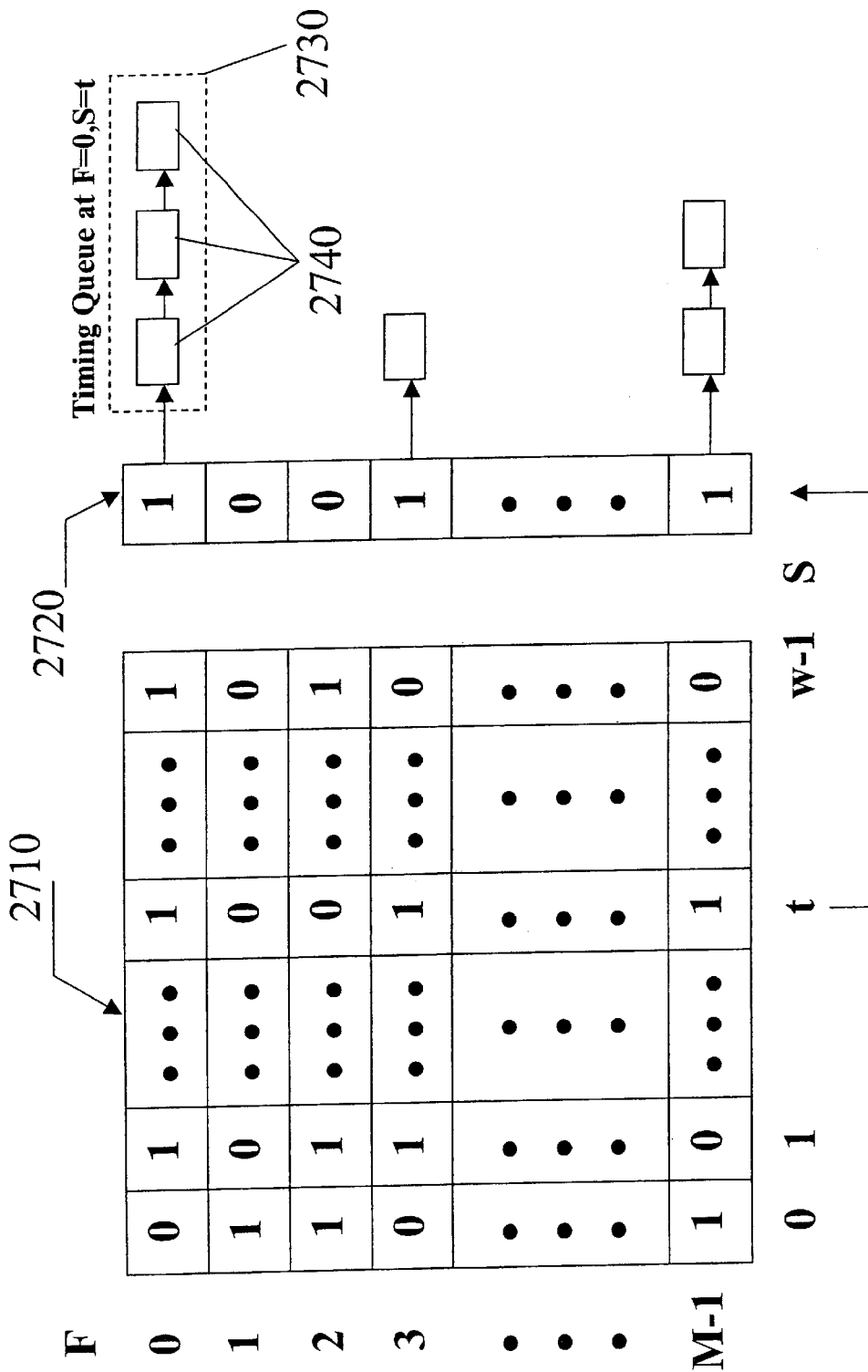
FIG. 27 illustrates a logical structure of a shaper queue used with a two-dimensional calendar queue.

To alleviate the complexity of transferring multiple eligible packets from a shaper queue to a scheduler in a short period of time, the article: D. Stiliadis et al, "A General Methodology for Design Efficient Traffic Scheduling and Shaping Algorithms," *Proc. IEEE INFOCOM*, Kobe, Japan (April 1997) (hereafter referred to as "the Stiliadis article") proposed an integrated shaper-scheduler. In that integrated shaper-scheduler, the shaper queue is implemented as a multitude of priority lists. Each priority list is associated with a distinct value of starting potential S common to all queued packets in the list. Thus, referring to FIG. 27, a two-dimensional calendar queue 2710 can be constructed based on the starting potential S of the queued packets. W is the maximum value of S. In the calendar queue 2710, all packets with the same starting potential are placed in the same column 2720 addressed by the value of S. Further, in each of the columns, the packets are sorted according to their time stamps F. As with the queue of FIG. 14, if the validity bit is "1", a linked list 2730 of flow queues 2740 having head-of-line packets with virtual time stamps corresponding to the virtual finish time F (and the same starting potential) is present.

Every validity bait, or V-bit, in a column can be located by its unique address (S,F). However, it has not been proven feasible to implement a large number of priority lists (large W). The hierarchical searching method and RAM-based architecture of the present invention is extended to the shaper queue using the calendar queue 2710 shown in FIG. 27.

§4.3.1 Exemplary Method for Ram-Based Shaper-Scheduler

Figure 28:
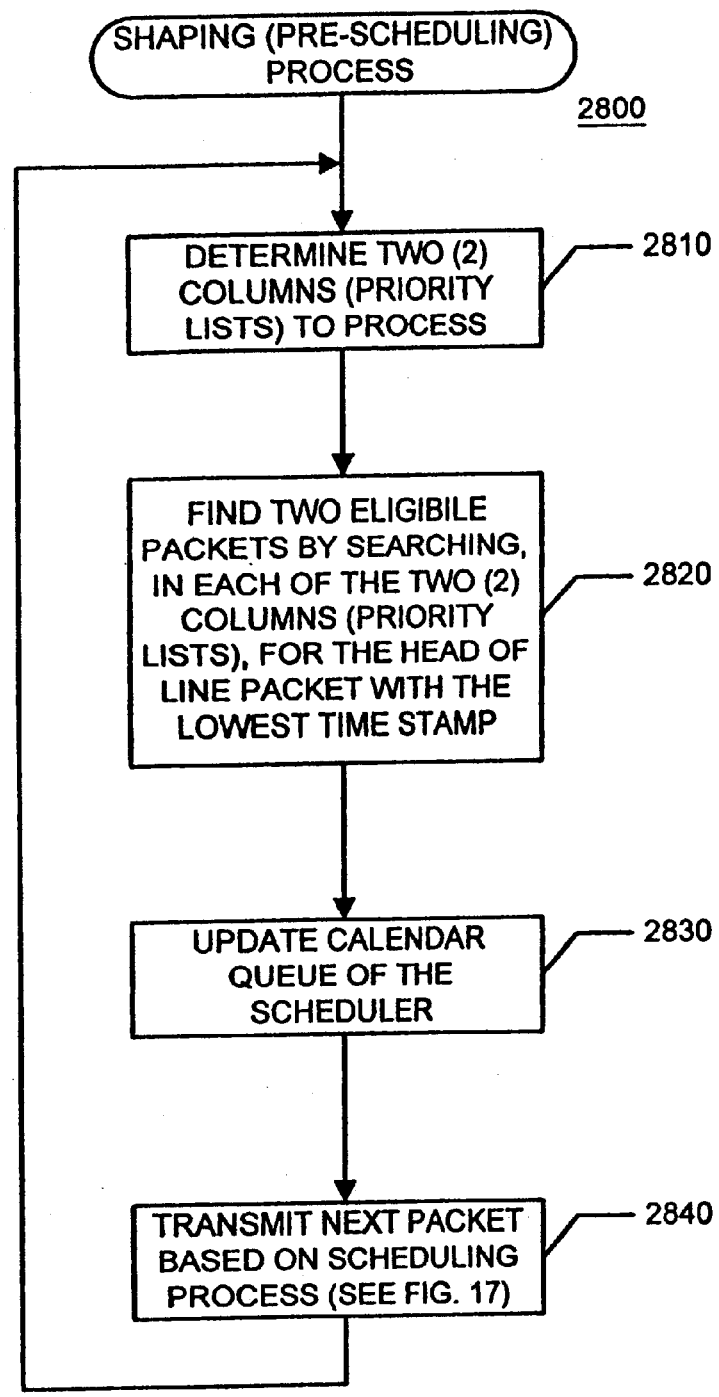
FIG. 28 illustrates an exemplary shaping and scheduling process.

FIG. 28 is a flow diagram of an exemplary process 2800 for providing shaping and scheduling functions. First, as shown in step 2810, two (2) columns (or priority lists) 2720 of the two-dimensional calendar queue 2710 to process are determined. More specifically, the system potential, which is maintained as an integer in the scheduler-shaper of the present invention, is advanced by one (1) after the servicing (transmission) of each packet. (See, e.g., step 2840, described below.) Thus, only two (2) columns (or priority lists) 2720 need be considered. That is, a first column (or priority list) 2720, having a starting potential equal to the updated system potential, is considered and a second column (or priority list) 2720, from which the previous packet was sent, is considered. Thus, two searches are performed during each time slot. More specifically, referring to step 2820, two eligible packets are found by searching, in each of the two (2) columns (priority lists) 2720, for the head-of-line packet with the lowest time stamp.

Next, as shown in step 2830, the calendar queue of the scheduler is updated with the two (2) packets. Finally, as shown in step 2840, the next packet is transmitted based on the scheduling process. (Recall, e.g., FIG. 17.) Each column (or priority list) of the two dimensional shaper is maintained (e.g., via WRITE and RESET operations) as described in §4.2.3 above with respect to the scheduler.

§4.3.2 Exemplary Apparatus for Implementing Ram-Based Shaper-Scheduler

As stated above, the SEARCH, RESET, and WRITE operations of each column (or priority list) of the shaper of the present invention are similar to those of the scheduler, discussed above.

Figure 29:
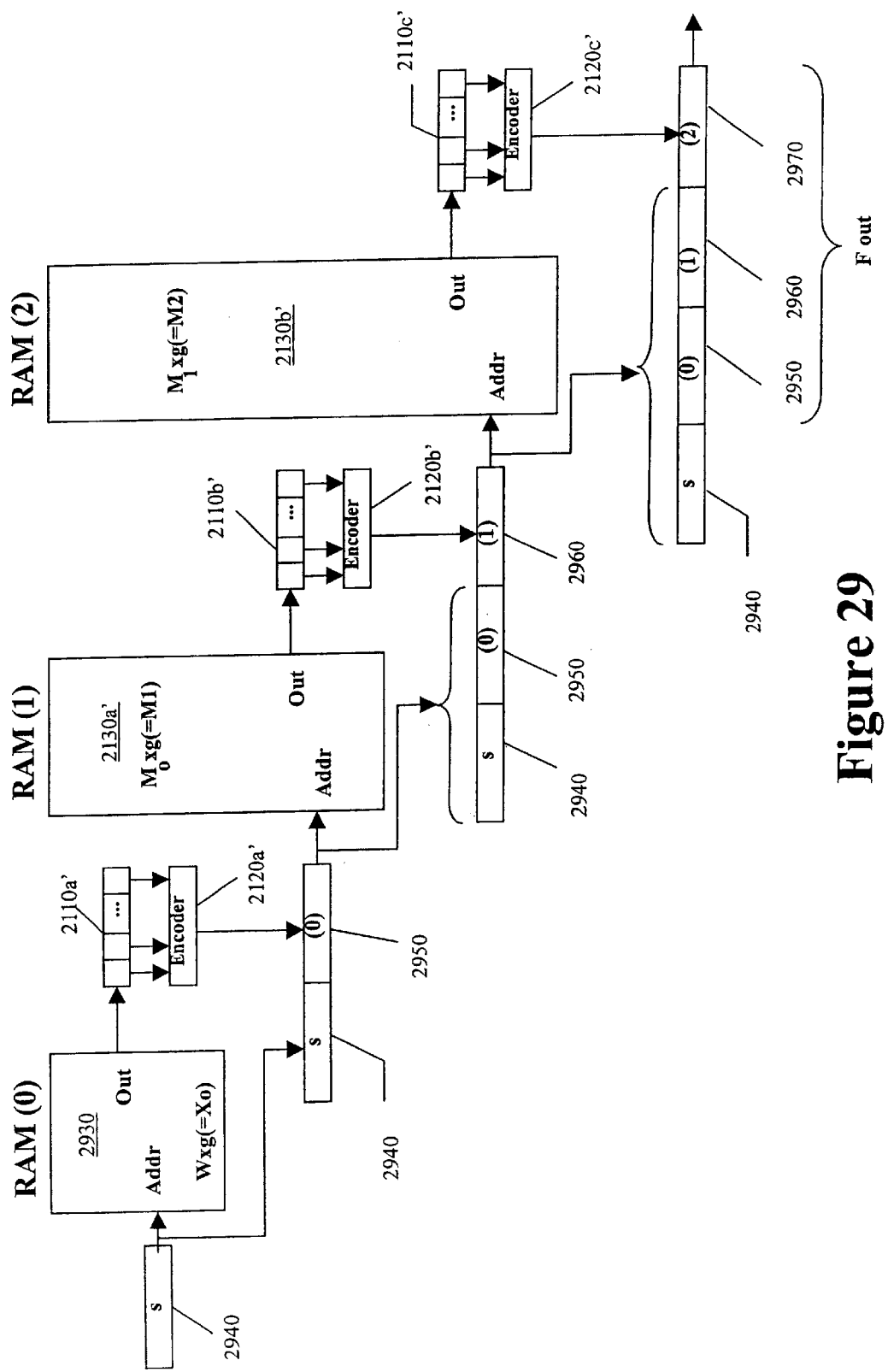
FIG. 29 illustrates search operation in an exemplary shaper/scheduler.

FIG. 29 is a high level block diagram of a shaper-scheduler which operates in accordance with the method 2800 discussed above. It is similar to the scheduler 2100 illustrated in FIG. 21 and described above. An eligibility bit may be set to "1" if the start potential is less than or equal to the system potential as discussed above. Thus, if there are W starting potentials and M time stamps, there will be W*M validity bit, eligibility bit pairs. The validity bits, in each column (or priority list) 2720, may be hierarchically grouped as discussed above. Thus, at the highest level, there will be W columns of $M_0$ bits (where $M_0 = M_1/g_1$). Thus, a W by $M_0$ memory 2930 is provided at level 0, as shown in FIG. 29. Otherwise, the architecture is similar to that of FIG. 21. The $\log_2 W$ address bits 2940 (Recall step 2810 of the process 2800) are used to address the appropriate column (or priority list), based on a system potential for example. As shown in FIG. 29, the $\log_2 W$ address bits 2940 are concatenated to each of the addresses used to address latter memories (i.e., RAM(1) 2130a' and RAM(2) 2130b'). The minimum time stamp (F out) determined by the system 2900 is used to address the head-of-line packet in the corresponding queue. The operation of the system 2900 inherently ensures that this time stamp (F out) is eligible.

§4.3.3 Time Stamp Overflow in Shaper-Scheduler

Recall from §4.2.2 above that two (2) memory banks 2210a and 2210b were used to store the validity bits of the non-overflow (i.e., those less than or equal to (M−1)) and the overflow (i.e., those greater than (M−1)) time stamps to address the problem of time stamp overflow. Recall also that a separate "zone indication bit" (Z) was used to indicate the zone (i.e., the memory bank 2210a or 2210b) in which the time stamp of a newly arriving head-of-line packet was to be stored. Finally, recall that a "current zone" bit (CZ) was used to indicate the zone of the packets currently being served. Thus, the zone bit (Z) is used for WRITING time stamp information while the current zone bit (CZ) is used for READING out time stamp information. When all of the validity bits in the current zone were zero (0), and there was at least one non-zero validity bit in the other zone, the CZ bit was toggled after servicing a packet from the other zone. In the shaper-scheduler, not only can the time stamp overflow, but the system potential (and start potential) can also overflow. A way in which the shaper-scheduler may address the potential overflows of these values is described below.

Recall from equation 4 above that the time stamp (F) is equal to a system potential (S) plus a delay (D) corresponding to a packet length over allocated bandwidth. In theory, F should always be greater than S since D>0. In the implementation set forth above, both F and S are represented by a finite number of bits (M and W, respectively). Thus, either F or S could overflow.

Figure 30:
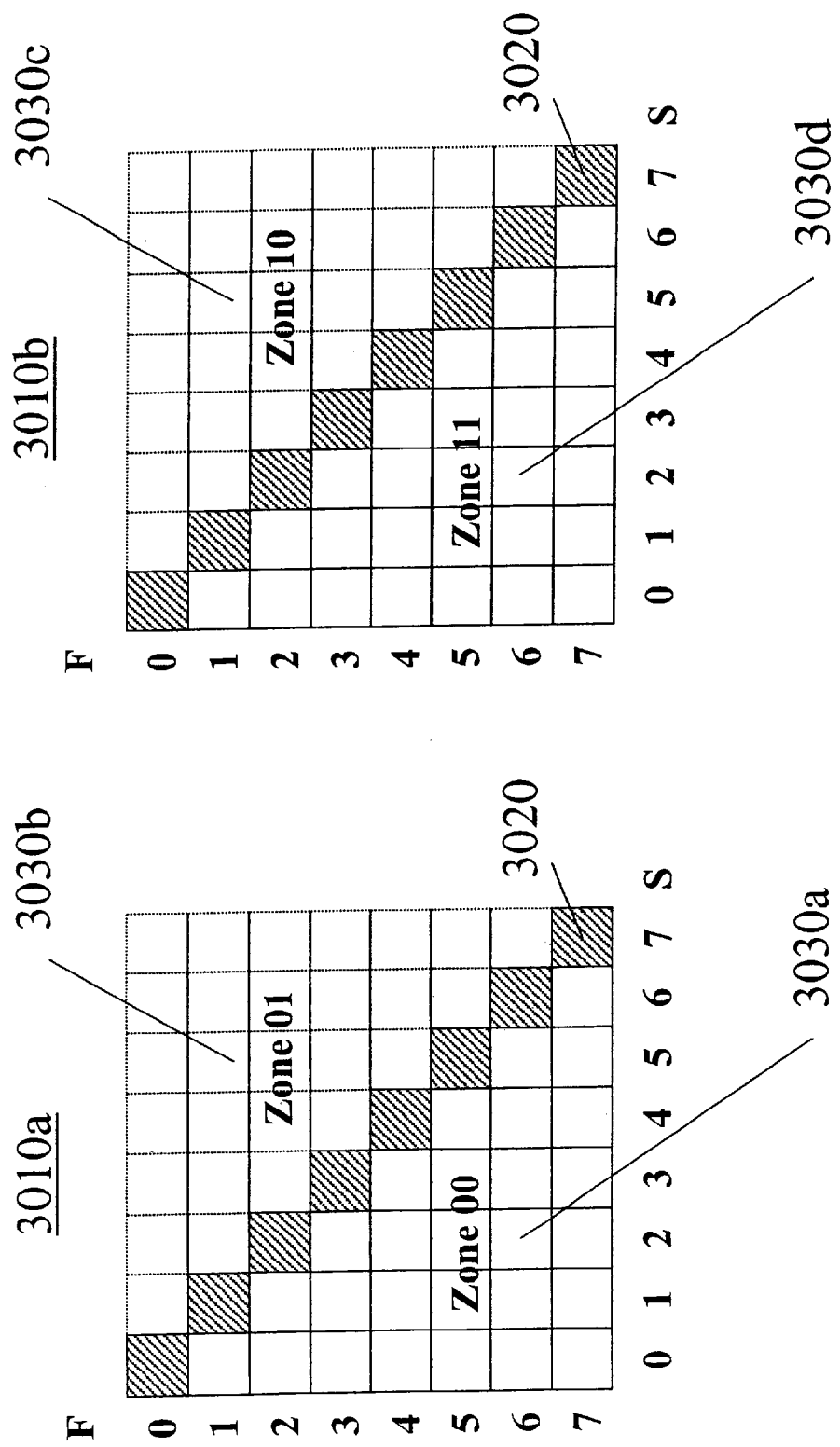
FIGS. 30 and 31 illustrate a first exemplary time stamp overflow control method which may be used in a shaper/scheduler.

In the following example, it will be assumed that F and S are represented by the same number of bits (i.e., M=W). Note however that F can overflow even when S does not, since F=S+D and D>0. Accordingly, where or not F is in overflow may be defined with respect to S. In the following example, is further assumed that M=W=8. Referring to FIG. 30, an overflow compensation memory 3000 includes two (2) banks of memory 3010 for indicating whether or not S is in overflow. Within each of the two (2) memory banks 3010, there are overflow and non-overflow zones for F. With respect to S (i.e., within a given memory bank 3010), F is defined as being in non-overflow if S<F, or as being in overflow if S>F. Recall that S≠F, since D>0. Accordingly, the row, column addresses where F=S are set to dummy values (depicted as hatched blocks in FIG. 30) in the calendar queue and are never used. Rather, these addresses simply define a boundary between the two zones of F in each of the memory banks 3010. Thus, as shown in FIG. 30, there are a total of four (4) zones (00, 01, 10, and 11). Each zone has M(W−1)/2=M(M−1)/2 bits.

A two (2) bit zone indication (Z) and a two (2) bit current zone indication (CZ) are used to compensate for time stamp F and system potential S overflow. Assuming that $m=\log_2 M$, $=\log_2 W$, an (m+1) bit word can be used to represent F or S, where the MSB is defined as an overflow bit. Thus, whenever S's MSB is equal to "1" (CZ=10 and 11), S is in overflow. (See, e.g., memory bank 3010b.) Otherwise, when S's MSB is "0" (CZ=00 and 01), S is in non-overflow. (See, e.g., memory bank 3010a.) Further, whenever F's MSB is different from S's MSB (CZ=01 and 10), F is in overflow, with respect to S. Otherwise, if F's MSB is the same as S's MSB (CZ=00 and 11), F is in non-overflow, with respect to S. Thus, the leftmost bit of Z or CZ will correspond to the overflow bit of S, while the rightmost bit of Z or CZ will correspond to the overflow bit of F.

Figure 31:
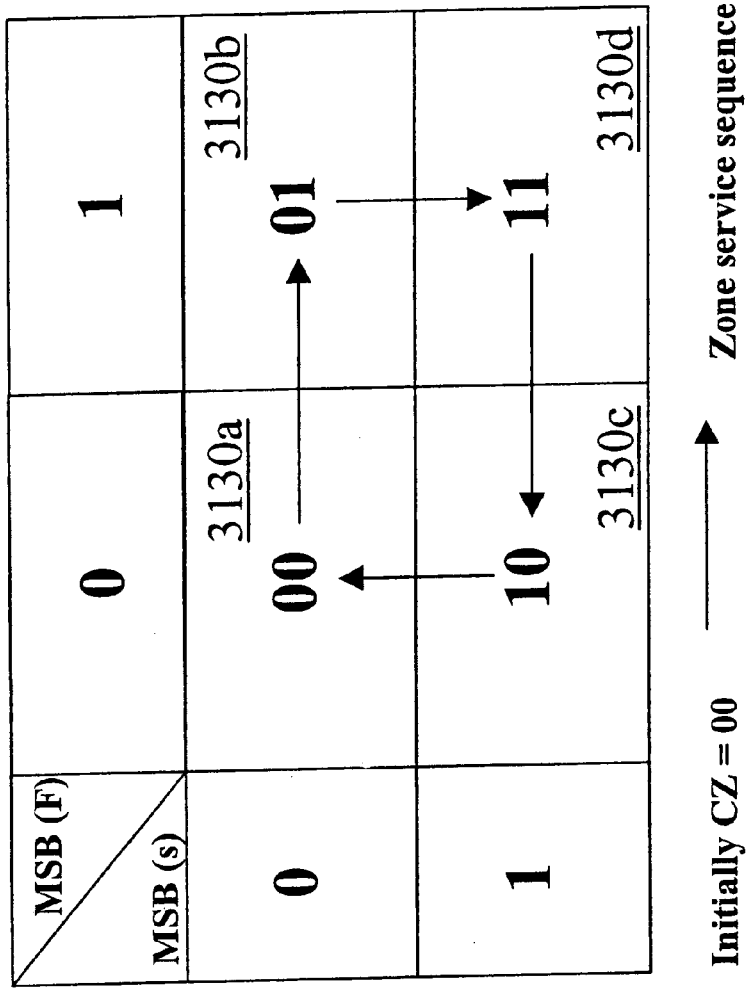

Referring now to FIG. 31, the four CZs (current zones) are served in the order 00, 01, 11, 10, etc. The CZ will be changed only after a packet from another zone is sent and the MSB of the address of S or F indicates a change in the service zone.

Note that if the overflow bit of F does not change more than once when the current zone is being served, no packet out-of-sequence problem will occurs. This is also true for S, since F=S+D.

Referring back to FIG. 30, in each memory bank 3010, the validity bits of each column that don't belong to the current zone should be "masked off" (i.e., ignored or not considered) so that the SEARCH, WRITE, and RESET operations described above may be performed properly. For example, assume that CZ=00 . When the column of S=1 is searched (top down) for the first validity bit (i.e., the bit associated with the smallest time stamp), only those bits with F=2 through 7 are possible candidates; the others F=0 or 1 are not in the current zone and should be "masked off." Assuming that CZ=01, when the column S=1 is searched (top down) for the first validity bit (i.e., the bit associated with the smallest time stamp), bit0 is the only possible candidate; the others, bits 1 through 7 are not in the current zone and should be masked off. An exemplary masking method is now described.

The result of logically XORing the two (2) bits of CZ can be used to determine a proper masking operation when a column of S is searched. More specifically, a result of "0" (i.e., zones 00 and 11) indicates that the validity bits F<S will be masked off when column S is searched. On the other hand, a result of "1" (i.e., zones 01 and 10) indicates that the validity bits F≧S will be masked off when column S is searched. To perform this masking operation, the boundary between the region to be masked and the un-masked region can be determined. Note that if W=M, the boundary will always be at S=F. In this regard, dividers or a table storing pre-computed results may be stored. Extra priority decoders and gates may also be used.

Figure 32:
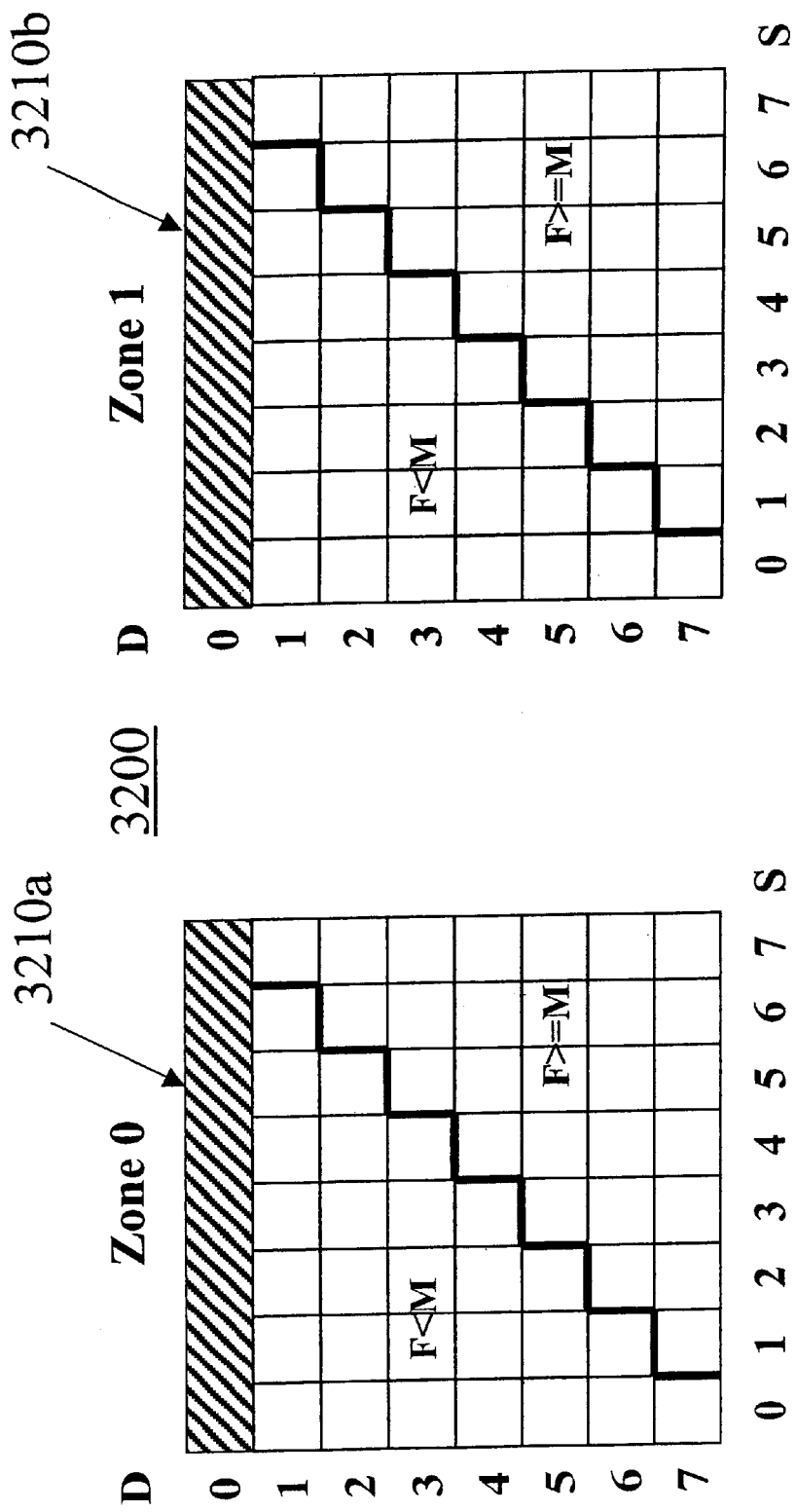
FIG. 32 illustrates a second exemplary time stamp overflow control method which may be used in a shaper/scheduler.

FIG. 32 illustrates an alternative memory scheme 3200 for addressing virtual finish time (or time stamp) F and virtual system time S overflow. In this technique, the D is considered (which does not overflow) rather than F. This is attractive since only the overflow of S need be considered. As shown in FIG. 32, there are still two (2) memory banks; one 3210a where S is not in overflow and another 3210b where S is in overflow. Recall from above that D>0. Thus, the first row (at D=0) is masked off. As will become apparent below, no masking operations are needed with this technique because each validity bit in a column is ranked by D, unambiguously.

As shown in FIG. 32, each memory bank 3210 can be divided into two areas for F; an overflow area if F (or S+D)>M, and a non-overflow area if F (or S+D) <M. One (1) bit (corresponding to the MSB of S) is used for both the zone Z and current zone CZ indicators.

This alternative technique uses an additional adding operation, to recover the value of F based on S and D. Further, the scheduler may itself handle time stamp overflow as discussed above. That is, time stamp F overflow can be moved from the shaper queue to a transmission queue of the scheduler. The two-dimensional RAM-based search engine ("2D RSE") is used to implement the shaper while another RAM-based search engine, which follows the 2D RSE, is used to implement the scheduler. Thus, to summarize, in each time slot, the shaper selects, at most, two eligible packets in the manner described above. Recall that each of the selected eligible packets has the smallest time stamp from its associated column (or priority list). Once these two packets join the scheduler (which follows the shaper), their time stamps are used to update the calendar queue (and any associated validity bits, and bits derived therefrom) of the scheduler. The scheduler then selects the packet having the smallest time stamp for service (e.g., transmission over the next transmission media of the network).

§4.3.3 Operating Example of Exemplary Ram-Based Shaper-Scheduler

The SEARCH, WRITE, and RESET operations of the shaper-scheduler are similar to those operations of the scheduler, described in §4.2.3 above. However, a column(s) (or priority list(s)) 2710 having an eligible starting potential are first determined. (Recall step 2810 of FIG. 28.) Further, if two (2) (or more) columns are processed during a SEARCH, one of the two (2) resulting packets is chosen, based on either (a) lowest time stamp (or finish potential) or lowest starting potential. (Recall step 2830 of FIG. 28.)

4.4 Considering Time Stamp Aging

In both the scheduler and the shaper-scheduler discussed above, as well as in any scheduler that considers a time stamp (or virtual finish time) based on generalized processor sharing, a time stamp (or virtual finish time) is determined. Recall also that the time stamp (or virtual finish time) F for the $k^{th}$ packet of session (or flow) i is based on equation 4, reprinted here:

$$F_i^k = S_i^k + \frac{P_i^k}{\phi_i} \quad (4)$$

Recall also that the starting potential S for the $k^{th}$ packet of session (or flow) i is defined in equation 3, reprinted here:

$$S_i^k = \max[F_i^{k-1}, v(a_i^k)] \quad (3)$$

The system potential v(t) is updated as follows:

$$v(t+\tau) = \max\{v(t)+\tau, \min S_j\} \quad (13)$$

where $B^\wedge$ (t) is a set of backlogged sessions in the real system at time t, and τ is the value of each time slot. When the $k^{th}$ packet of session i reaches the head of its flow queue at time $a_i^k$, the starting potential $S_i^k$ (and consequently, the finish time potential (or time stamp) $F_i^k$) is updated as follows:

$$S_i = \begin{cases} F_i & \text{if queue } i \text{ is non-empty at time } a_i^k, \\ \max\{F_i, v(a_i^k)\} & \text{otherwise.} \end{cases} \quad (14)$$

where $F_i$ is the time stamp of the previous head-of-line packet that has departed.

When an $k^{th}$ packet of session i is served (i.e., transmitted), the time stamp $F_i^k$ may be stored in a look-up table for later use (as $F_i^{k-1}$). The look-up table can be placed in memory for supporting a large number (N) of sessions (or flows), with the entry of $F_i^k$ addressed by i (where i=0,1, ..., N-1). Besides the time stamp $F_i^k$, other information related to session (or flow) i can also be stored at (or pointed to from) the same location. Later, when a new packet k of the session (or flow) i arrives at the head of the session queue, and thus becomes the head-of-line (or "HOL") packet, the stored time stamp $F_i^{k-1}$ is needed so that it may be compared with the system potential $v(a_i^k)$ for determining a new starting potential $S_i^k$ for the $k^{th}$ packet as discussed above.

A potential problem exists when updating the starting potential $S_i^k$. Recall from equation 3 that a component of the starting potential $S_i^k$ is the larger of the virtual finish time (or time stamp) of the last sent packet ($F_i^{k-1}$) and the system potential $v(a_i^k)$. Since the system potential $v(a_i^k)$ is represented by a finite number of bits in practice, it can "overflow". Given the possibility of system potential "overflow" it is impossible to decide, with certainty, which of the finish time potential (or time stamp) of the previous $(k-1)^{th}$ packet $F_i^{k-1}$ or the system potential $v(a_i^k)$ is greater without any previous history or certain constraints. The risk of this problem is especially great when the queue of the particular session (or flow) i has been empty for some time since the system potential may have overflowed a number of times. This problem may be referred to as "time stamp aging". An exemplary method for addressing the time stamp aging problem is now described.

As can be appreciated from equation 3 above, a previous time stamp $F_i^{k-1}$ becomes obsolete if the system potential $v(a_i^k)$ exceeds it. That is, once the system potential $v(a_i^k)$ is larger than $F_i^{k-1}$, it will remain so. (Naturally, updating will occur when the next packet of the $i^{th}$ session or flow is served.) Recall in §§4.2.2 and 4.3.3 above, that different zones were used to control time stamp overflow. A different approach may be used to deal with system potential overflow; a number of bits can be used to record (i) a number of overflow events of the system potential $v(a_i^k)$, and (ii) a time zone where the system potential $v(a_i^k)$ and the stored finish potential $F_i^{k-1}$, respectively, belong. A purging means may be used to purge all stored time stamps $F_i^{k-1}$ that have become obsolete. The purging means should run fast enough to check each of the stored time stamps and purge all obsolete ones before the history of the system potential $v(a_i^k)$ overflows due to its representation by a finite number of bits.

The system potential $v(a_i^k)$ is updated, per time slot, based on equation 13 above. Thus, a number of entries of the look-up table are checked to see if their $F^{k-1}$ becomes obsolete. In a given time slot, the system potential v(t) can be increased by a maximum of W–1. (Recall that the starting potential $S_i^k$ can be represented by W bits.) For example, the system potential v(t) could change from 0 to $S_j$=W–1 for some backlogged session j, while all other sessions are empty, thus generating a maximum of N–1 (wherein N is the number of sessions in the system) entries of the look-up table that would need to be checked.

Each purging operation has one, and perhaps two, memory accesses. The first is to read the time stamp $F_i^{k-1}$ of the last departed packet. If that time stamp $F_i^{k-1}$ is obsolete (i.e., less than the current system potential $v(a_i^k)$), the second memory access is a write operation to mark the time stamp as obsolete. Due to the limited speed of memory accesses, it might not be possible to complete all purging operations during a time slot, particularly when N is large. Since it might not be possible to perform all N purging operations during a time slot (i.e., it might take a number of time slots to perform all N purging operations), any time stamp or system potential overflow should be tracked while all purging operations are performed. As will be described below, a first counter variable $C_v(t)$ is used to track system potential overflow, another counter variable $C_i$ is used to track time stamp (or virtual finish time) overflow.

Assume that the exemplary purging means is to check A (where $A \geq N-1$) look-up table entries in T consecutive time slots. Note that A should be no less than N-1, rather than N, since when all session queues are empty, all N entries in the look-up table become obsolete; the system potential $v(t)$ is simply reset to zero. Thus, under the worst case, in the T time slots, there would be A purging operations, plus 2T regular memory accesses (i.e., WRITE $F_i$ after a current head-of-line packet of session i is served, and READ $F_j$ when a new packet from session j comes to the head of the queue). Accordingly, to guarantee that all A entries can be purged, if obsolete, within T time slots, the value of T must may be chosen to satisfy the condition, T×time slot$\geq$(2T+2A)×memory cycle. Note that 2T+2A is the maximum number of memory accesses of the look-up table during this time. These conditions are illustrated in the following example.

To illustrate the purging means, assume that a time slot is defined by the time needed to transmit a 64 byte packet (segment) at a speed of 10 Gbps; that is, 51.2 ns. Further assume that the memory cycle is 10 ns, and that the number of sessions N is 32,768. If A=N=32,768, it follows, from the foregoing condition, that T=21006. Thus, there will be A/T ($\approx$1.56) purging operations (or $\approx$3.12 memory accesses) per time slot.

Figure 33:
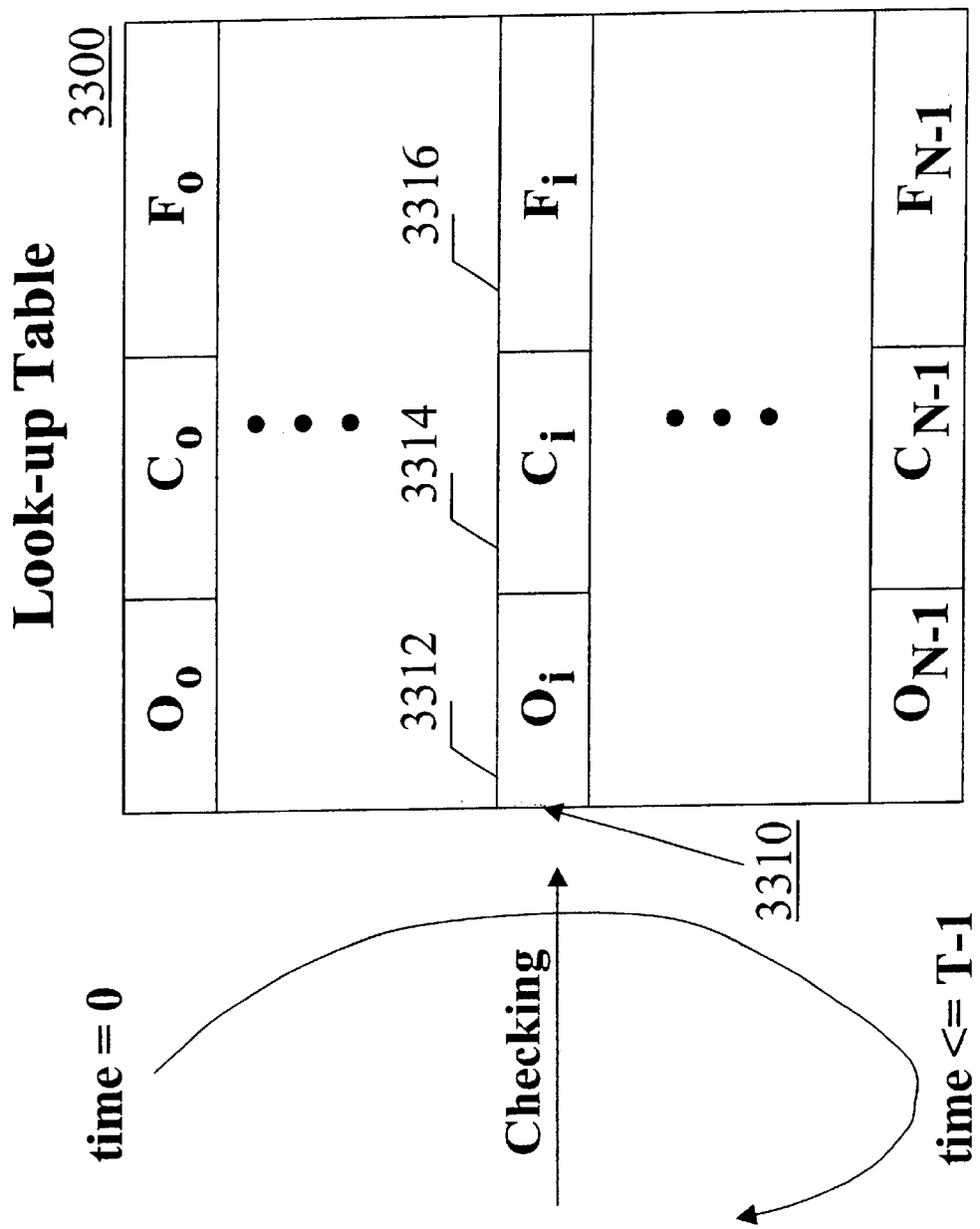
FIG. 33 illustrates a table used by a purging operation of a time stamp aging compensation process which may be used by the present invention.

As mentioned above, to ensure unambiguous comparisons between the system potential $v(t)$ and each stored time stamp F in any of the T time slots, the counter variable $C_v(t)$ should be able to record at least T+1 times of overflow. In this example, the counter variable $C_v(t)$ is $\log_2(T+1)=\log_2(21007)$, which is rounded up to 15 bits. The counter variable $C_v(t)$ is incremented by 1 each time the system potential $v(t)$ overflows. To facilitate purging, an "obsolete" bit $O_i$, and another $[\log_2(T+1)]$ bit counter variable $C_i$ is defined for each entry $F_i$ in the look-up table. Thus, referring to FIG. 33, an exemplary look-up table 3300 may have N records 3310, each record having a field 3312 storing the obsolete bit $O_i$, a field 3314 having the bit string $C_i$ encoding the number of time stamp overflows, and a field 3316 having a bit string $F_i$ encoding the time stamp of the previously served packet of the $i^{th}$ session (or flow). Accordingly, assuming that both $F_i^{k-1}$ and $v(a_i^k)$ are represented by the same number of bits, $v(t)$ and F can be compared directly if they are both in the same time zone (i.e., if $C_v(t)=C_i$). Otherwise, again assuming that both $F_i^{k-1}$ and $v(a_i^k)$ are represented by the same number of bits, simply comparing the time zones (i.e., $C_v(t)$ and $C_i$) indicates which of $F_i^{k-1}$ and $v(a_i^k)$ is larger. In this example, if there are M=32,768 time stamps, the width of each entry 3310 of the look-up table 3300 will be 31 bits. That is, 1 bit for the obsolete bit $O_i$, 15 bits ($=\log_2(T+1)=\log_2 21006$) for the overflow counter $C_i$, and 15 bits ($=\log_2 M=\log_2 32,768$) for the time stamp.

Figure 34A:
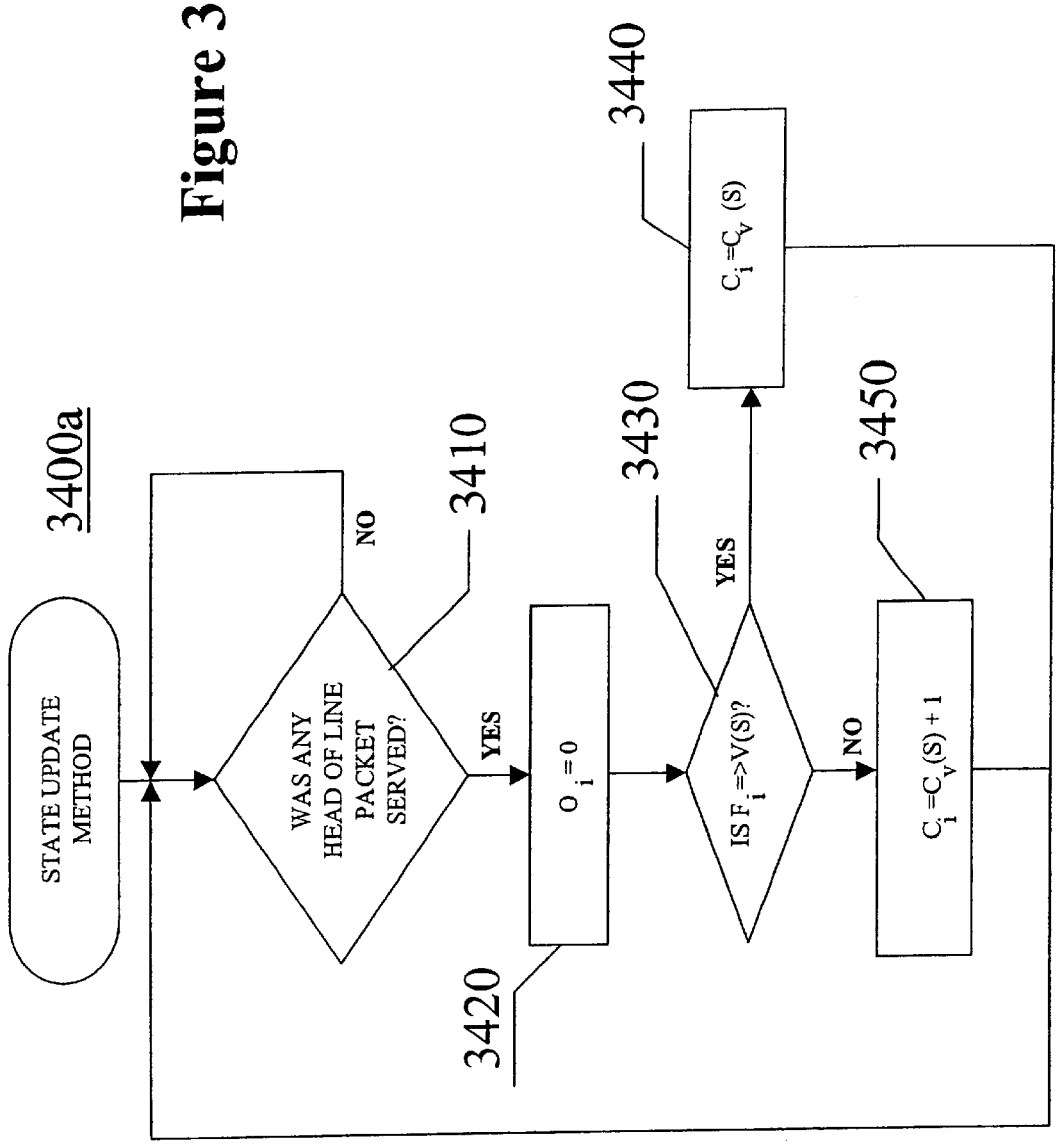
FIG. 34a is a flow diagram of a state update method which may be used by a purging operation.
Figure 34B:
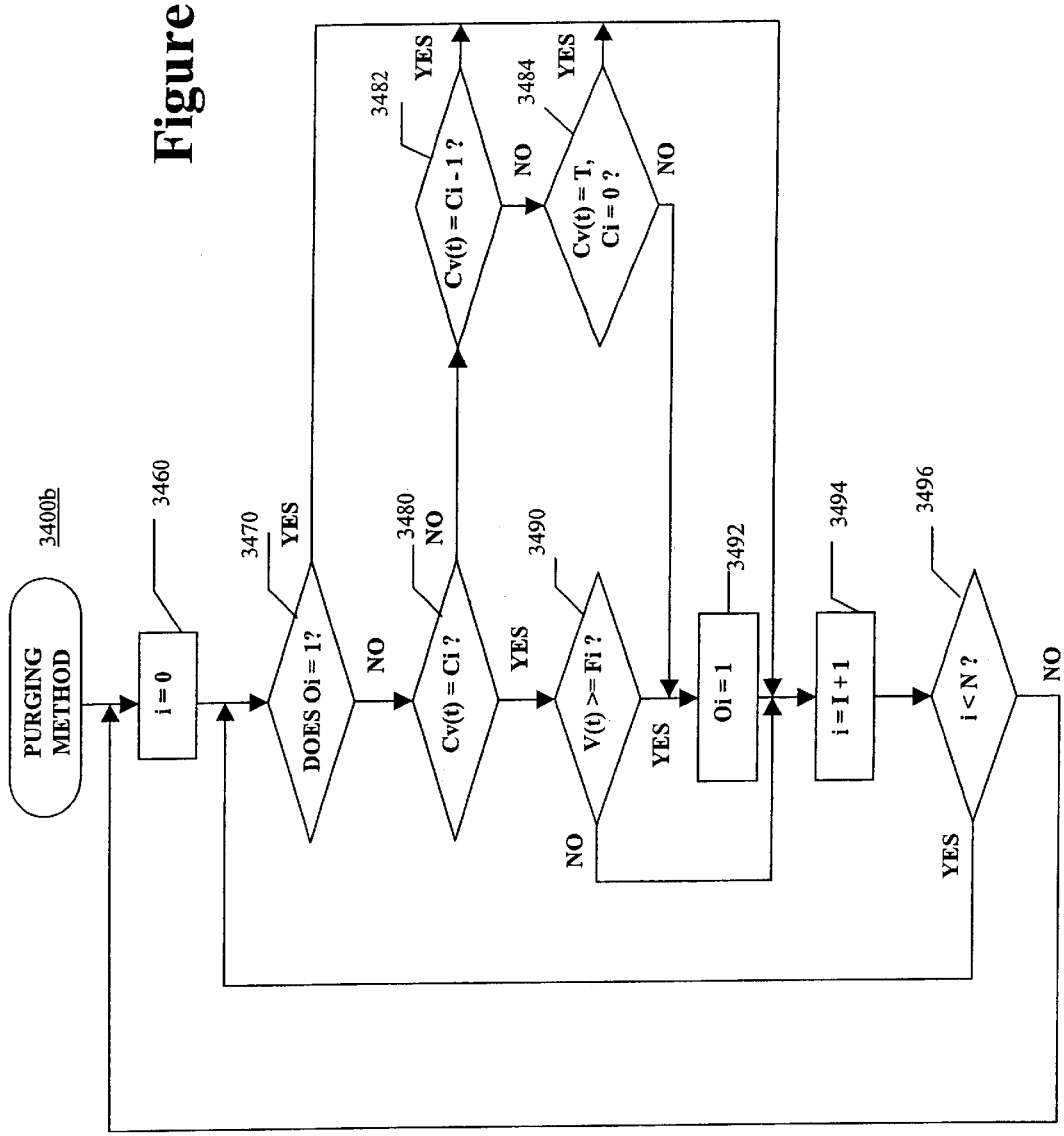
FIG. 34b is a periodic purging method which may be used by the present invention.

FIGS. 34a and 34b are flow diagrams of methods that may be used by the purging means. More specifically, FIG. 34a is a flow diagram of a method 3400a for maintaining the state(s) of variables used by the purging means. FIG. 34b is a flow diagram of a purging method 3400b. Each of these methods is described below.

Referring first to FIG. 34a, as shown in decision step 3410, it is determined whether a packet is served (i.e., transmitted) at current time slots. This determination is repeated for each time slot. Returning to decision step 3410, if the head-of-line packet of any of the flows i is served, as shown in step 3420, the obsolete bit for that flow $O_i$ is set to zero, since it is not obsolete at that time. Referring back to FIG. 33, this value is stored in field 3312. (The value for $F_i$ is stored in field 3316.)

Next, the value of the time stamp's time zone is determined and stored. Note that $C_i$ could be $C_v(s)+1$ since the virtual finish time F is typically greater than (Recall equation 2 above.) the virtual start time $v(t)$ and may therefore overflow without $v(t)$ overflowing. Consequently, $C_i$ may be one time zone ahead of $C_v(t)$. Referring to decision step 3430 of FIG. 34a, it is determined whether or not $F_i \geq v(s)$. If so, as shown in step 3440, $C_i$ is set to $C_v(s)$ and processing continues to decision step 3410. If not, as shown in step 3450, $C_i$ is set to $C_v(s)+1$ and processing continues to decision step 3410. In either case, the value of $C_i$ is stored in field 3314. As discussed in §4.2.2 above, since $F_i$ cannot overflow more than once when the system is serving the current zone, no packet out-of-sequence problems will occur. In view of the foregoing, process 3400a maintains the state of the values and variables used by the purging process.

FIG. 34b is a flow diagram of a purging method 3400b. First, a session (or flow) counter is initialized (e.g., i=0) as shown in step 3460. Next, in decision step 3470, it is determined whether or not $O_i$ is "1". If so, the time stamp is obsolete and processing continues at step 3494 which increments the session (or flow) counter i. If, on the other hand, the time stamp was not obsolete, it needs to be determined if the time stamp is now obsolete. This is done by comparing the stored time stamp $F_i^{k-1}$ (and any overflow count) with the system potential $v(a_i^k)$ (and any overflow count). There are three (3) types of possible comparisons.

Since $A \geq N-1$ sessions can be checked within T time slots, $F_i$ can be checked (and purged, if obsolete) at least once between the time s when it is first stored, and a time t, inclusive with $t-s \leq T$. The $v(t)$ can overflow, at most, T times during this period (from time s to time t), while $C_v(t)$ can overflow (i.e., wrap around) once, at most. The issue is whether, under the above assumptions, it can guaranteed that the $C_v(t)$ exceeding the $C_i$, if wrapped around, will never be about $C_v(s)-1$. If this is not true, unsuccessful purging operations may result. If $C_i=C_v(s)$, this is worse than if $C_i=C_v(s)+1$ since it would be closer to the wrapped around $C_v(t)$. Since $C_v(t)=[C_v(s)+(t-s)]$ modulo (T+1) if wrapped around, $C_v(t)$ will be $C_v(s)-1$ when t-s=T, which ensures correct purging operations. This is why the counter variables $C_v(t)$ and $C_i$ are at least $\log_2(T+1)$ bits wide.

In the first case, if $C_v(t)=C_i$, indicating that both $v(a_i^k)$ and $F_i^{k-1}$ are in the same time zone, then they are compared directly, as shown in decision steps 3482 and 3494. Referring to decision step 3490 if $v(a_i^k) \geq F_i^{k-1}$, then the stored time stamp $F_i^{k-1}$ is obsolete and $O_i$ is set to "1" as shown in step 3492. Processing then continues to step 3494 where the session (or flow) counter i is incremented. Otherwise, processing continues directly to step 3494 (i.e., the time stamp $F_i^{k-1}$ is still not obsolete).

In the second case, (i) if $C_i=C_v(t)+1$, or (ii) if $C_v(t)=T$, as shown in decision steps 3482 and 3484, then (i) the time stamp $F_i^{k-1}$ is one zone ahead of $v(a_i^k)$, or (ii) $C_i=[C_v(s)+1]$ modulo(T+1)=0, respectively. In either case, the time stamp $F_i^{k-1}$ is still not obsolete. Thus, processing continues to step 3494 where the session (or flow) counter i is incremented.

In the third case, if $C_v(t)>C_i$, but $C_v(t)$ does not equal T, with $C_i=0$, then $C_v(t)$ must exceed $C_i$. Consequently, the time stamp $F_i^{k-1}$ is obsolete and the bit $O_i$ is set to "1". This case is shown in decision steps 3480, 3482 and 3484, as well as step 3492. The session (or flow) counter i is then incremented as shown in step 3494.

In each of the foregoing cases, after the session (or flow) counter i is incremented in step 3494, it is determined whether i<N in decision step 3496. If so, processing continues to decision step 3470. Otherwise, since the purging operation was performed on all of the sessions (or flows), the session (or flow) count i is reinitialized at step 3460 before processing continues to decision step 3470.

§4.5 CONCLUSIONS

In view of the foregoing, the present invention provides methods and apparatus for quickly scheduling the service of queued packets using a hierarchical search technique. In this way, large numbers of flow queues can be serviced. This concept may be extended to a shaper, which precedes the scheduler, for improving a worst case fairness index. Finally, the present invention provides methods and apparatus for tracking the overflow of binary encoded time stamp and system potential values so that time stamp aging does not cause problems.

What is claimed is:

1. In a system having a calendar queue for referencing queues based on time stamps of their respective head-of-line packets, and having a validity bit associated with each of M time stamps for indicating whether any of the head-of-line queued packets have that time stamp, a method for shaping the head-of-line packets based on their starting potentials, the method comprising steps of:
   a) for each of a number W of staring potentials, defining a priority list, each priority list defined by a hierarchy of L levels from the validity bits, the hierarchy generated via sub-steps of,
      i) grouping the M validity bits into groups of $g_{L-1}$ bits,
      ii) logically ORing the $g_{L-1}$ validity bits in each of the groups,
      iii) defining bits of a next level by concatenating the OR results thereby generating $M/g_{L-1}$ bits,
      iv) storing the bits of the next level in an addressable memory, and
      v) at each remaining level l, except a highest level l=0, repeatedly
         A) grouping $M_l$ bits into groups of $g_l$ bits,
         B) logically ORing the $g_l$ bits in each of the groups,
         C) concatenating the OR results thereby generating $M_l/g_l$ bits which define bits of a next level, and
         D) if the next level is not the highest level l≠0, storing the bits of the next level in a next addressable memory and if the next level is the highest level l=0, storing the bits of the next level in a storage device;
   b) determining two of the W priority lists to consider;
   c) determining two eligible packets by searching, in each of the determined two priority lists, for a head-of-line packet having a minimum time stamp; and
   d) updating the calendar queue based on the determined two eligible packets.

2. The method of claim 1 wherein the time stamp values are represented by $log_2 M+1$ bits and the system potential values are represented by $log_2 W+1$ bits,
   wherein the priority lists are divided into two memory banks, each of the two memory banks having two zones,
   wherein a most significant bit of a system potential value of a newly arriving packet indicates which of the memory banks is to identify a flow queue of the newly arriving packet, and
   wherein a most significant bit of a time stamp value of a newly arriving packet indicates which zone of the indicated memory bank is to identify a flow queue of the newly arriving packet.

3. The method of claim 1 wherein the time stamp values are represented by $log_2 M+1$ bits and the system potential values are represented by $log_2 W+1$ bits,
   wherein the priority lists are divided into two memory banks, each of the two memory banks having two zones,
   wherein a first of two current zone bits is used to indicate which of the memory banks is currently being used for shaping, and
   wherein a second of two current zone bits is used to indicate which zone of the memory bank current being used for shaping, is currently being used for shaping.

4. The method of claim 3 wherein if all validity bits in a zone of a memory bank currently being used for shaping become zero, and if there is at least one non-zero validity bit in another zone, then the current zone bits will be changed.

5. The method of claim 4 wherein the current zone bits are changed in accordance with the sequence 00, 01, 11, 10.

6. The method of claim 1 wherein the time stamp values are represented by $log_2 M+1$ bits and the system potential values are represented by $log_2 W+1$ bits,
   wherein the priority lists are divided into two memory banks, each of the two memory banks having two zones, and
   wherein a most significant bit of a system potential value of a newly arriving packet indicates which of the memory banks is to identify a flow queue of the newly arriving packet.

7. The method of claim 6 wherein each of the memory banks includes a first zone defined by time stamps less than M and a second zone defined by time stamps greater than or equal to M.

8. The method of claim 1 wherein the time stamp values are represented by $log_2 M+1$ bits and the system potential values are represented by $log_2 W+1$ bits,
   wherein the priority lists are divided into two memory banks, each of the two memory banks having two zones, and
   wherein a current zone bit is used to indicate which of the memory banks is currently being used for shaping.

9. The method of claim 8 wherein each of the memory banks includes a first zone defined by time stamps less than M and a second zone defined by time stamps greater than or equal to M.

10. The method of claim 1 wherein the step of determining two eligible packets by searching, in each of the determined two priority lists, for a head-of-line packet having a minimum time stamp includes sub-steps of:
    i) encoding the contents of the storage device at level l=0 to generate a bit string;
    ii) for each lower level of the hierarchy, from second highest to lowest;
       A) reading contents of the addressable memory at the present level, as addressed by the bit string,
       B) encoding the contents of the addressable memory read out to generate a further bit string, and
       C) concatenating the bit string and the further bit string to form a bit string; and
    iii) if the level number is greater than a maximum level, then using the bit string to update the calendar queue.

11. The method of claim 1 wherein the step of determining two of the S priority lists to consider includes sub-steps of:
    i) determining a priority list associated with a starting potential equal to an updated system potential; and ii) determining a priority list associated with a starting potential equal to a starting potential of a packet selected by a scheduler.

12. In a system having a calendar queue for referencing queues based on the time stamps of their respective head-of-line packets, and having a validity bit associated with each of M time stamps for indicating whether any of the packet have that time stamp, an apparatus for shaping the packets based on their starting potentials, the apparatus comprising:

a) at least two addressable memories;

b) a storage device;

c) at least two encoders; and d) means for concatenating bit strings, wherein the storage device stores a selected starting potential, wherein the at least two addressable memories define a hierarchy having L levels, in which, i) the M validity bits are grouped into groups of $g_{L-1}$ bits, ii) the $g_{L-1}$ validity bits of each of the groups are logically ORed, iii) results of the logical ORing are concatenated to define $M/g_{L-1}$ bits of a next level which are stored in one of the at least one addressable memory, and iv) at each of the remaining levels l, except the highest level l=0, A) $M_l$ bits are grouped into groups of $g_l$ bits, B) the $g_l$ bits in each of the groups are logically ORed, C) the OR results are concatenated thereby generating $M_l/g_l$ bits which define bits of a next level, and D) if the next level is not the highest level l≠0, the bits of the next level are stored in a next one of the at least one addressable memory and if the next level is the highest level l=0, the bits of the next level are stored in one of the at least two addressable memories at an address defined by a starting potential, wherein each of the at least two encoders is associated with one of the at least two addressable memories and is adapted to encode contents of the associated one of the at least two addressable memories, and wherein the means for concatenating bit strings concatenates outputs of the at least two encoders to form addresses to the at least two addressable memories.

13. The apparatus of claim 12 further comprising at least one decoder adapted to update validity-based bits of all but one of the at least two addressable memories when a flow queue has a new head of line packet.

14. The apparatus of claim 12 wherein the packets are head-of-line packets of flow queues, and further comprising at least one decoder adapted to update validity-based bits of the all but one of the at least two addressable memories when a session queue becomes empty.

15. A network element having a plurality of output ports, each of the plurality of output ports comprising:

a) a plurality of queues for buffering packets, each of the packets having an associated time stamp;

b) for each of a plurality of starting potentials, a priority list queue for referencing queues based on the time stamps of their respective head-of-line packets, and having a validity bit associated with each of M time stamps for indicating whether a head-of-line packet at any of the plurality of queues has that time stamp and that starting potential;

c) a shaper for i) determining two of the priority list queues to be searched, and ii) determining a minimum time stamp value in each of the determined two priority lists;

d) a calendar queue for referencing queues based on the time stamps of their respective head-of-line packets, and having a validity bit associated with each of M time stamps for indicating whether a head-of-line packet at any of the plurality of queues has that time stamp, wherein the contents of the calendar queue are updated by the shaper; and e) a search engine for searching for a minimum time stamp value of the calendar queue.

16. The network element of claim 15 wherein each of the plurality of queues is associated with one of a flow and a session.

\* \* \* \* \*